US007445852B2

(12) United States Patent
Maruko et al.

(10) Patent No.: US 7,445,852 B2
(45) Date of Patent: *Nov. 4, 2008

(54) MAGNETIC SUBSTRATE, LAMINATE OF MAGNETIC SUBSTRATE AND METHOD FOR PRODUCING THEREOF

(75) Inventors: Nobuhiro Maruko, Sodegaura (JP); Mitsunobu Yoshida, Sodegaura (JP); Hiroshi Watanabe, Sodegaura (JP); Takashi Ono, Sodegaura (JP); Hidenobu Nogi, Sodegaura (JP); Tomoyuki Nakata, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 10/883,735

(22) Filed: Jul. 6, 2004

(65) Prior Publication Data

US 2005/0089708 A1 Apr. 28, 2005

Related U.S. Application Data

(63) Continuation-in-part of application No. PCT/JP03/00290, filed on Jan. 15, 2003.

(30) Foreign Application Priority Data

| | | |
|---|---|---|
| Jan. 16, 2002 | (JP) | 2002-007023 |
| Jan. 24, 2002 | (JP) | 2002-017609 |
| Mar. 27, 2002 | (JP) | 2002-089931 |
| Apr. 12, 2002 | (JP) | 2002-111018 |

(51) Int. Cl.

| | |
|---|---|
| ***B32B 15/00*** | (2006.01) |
| ***B32B 7/10*** | (2006.01) |
| ***C08G 18/20*** | (2006.01) |
| *H01F 1/00* | (2006.01) |

(52) U.S. Cl. .................... 428/611; 428/692.1; 336/233; 528/418

(58) Field of Classification Search .............. 428/842.1, 428/842.3, 611, 655, 666, 678, 692.1, 844.6, 428/844.7, 844.71, 844.8, 844.9, 845.5, 845.7, 428/831, 831.2, 840.1, 840.2, 846.9, 846.3, 428/697, 64.5, 64.1, 450, 836, 836.1, 836.2; 340/572.6; 336/234, 233; 148/108; 310/216; 528/481

See application file for complete search history.

(56) References Cited

U.S. PATENT DOCUMENTS 4,067,732 A 1/1978 Ray (Continued)

FOREIGN PATENT DOCUMENTS

EP 0 074 640 A1 3/1983

(Continued)

OTHER PUBLICATIONS

Magnetic Materials, Spaldin, Cambridge University Press, (2003) p. 66 to p. 71.*

(Continued)

*Primary Examiner*—Carol Chaney
*Assistant Examiner*—Louis Falasco
(74) *Attorney, Agent, or Firm*—Buchanan Ingersoll & Rooney PC

(57) ABSTRACT

A heat treatment was carried out in a pressurized condition on an amorphous metal ribbon containing Fe and Co as main components and being represented by the general formula: $(Co_{(1-c)}Fe_c)_{100-a-b}X_aY_b$. (In the formula, X represents at least one species of element selected from Si, B, C and Ge, Y represents at least one species of element selected from Zr, Nb, Ti, Hf, Ta, W, Cr, Mo, V, Ni, P, Al, Pt, Rh, Ru, Sn, Sb, Cu, Mn and rare earth elements, c, a and b satisfy $0 \leqq c \leqq 1.0$, $10 < a \leqq 35$ and $0 \leqq b \leqq 30$, respectively, and a and b are represented in terms of atomic %.) By carrying out a heat treatment in a pressurized condition in the same manner on a magnetic substrate comprising an amorphous metal ribbon and a heat resistant resin or a laminate of the substrates, not only the magnetic properties but also the mechanical properties and the processability are improved. The substrates can be used in antennas, which are devices that convert an electric wave to an electric signal, rotors and stators of electric motors and so on.

15 Claims, 5 Drawing Sheets

U.S. PATENT DOCUMENTS

| | | | | | |
|---|---|---|---|---|---|
| 4,217,135 | A | | 8/1980 | Luborsky et al. | |
| 4,225,339 | A | | 9/1980 | Inomata et al. | |
| 4,385,944 | A | | 5/1983 | Hasegawa | |
| 4,437,907 | A | | 3/1984 | Sato et al. | |
| 4,484,184 | A | * | 11/1984 | Gregor et al. | 428/928 |
| 5,567,537 | A | | 10/1996 | Yoshizawa et al. | |
| 5,804,282 | A | * | 9/1998 | Watanabe et al. | 428/141 |
| 6,057,766 | A | * | 5/2000 | O'Handley et al. | 340/572.6 |
| 6,359,563 | B1 | * | 3/2002 | Herzer | 340/572.6 |
| 6,873,239 | B2 | * | 3/2005 | Decristofaro et al. | 148/108 |
| 6,917,275 | B2 | * | 7/2005 | Ono et al. | 336/234 |
| 2002/0034621 | A1 | * | 3/2002 | Shida et al. | 428/692.1 |

FOREIGN PATENT DOCUMENTS

| | | | | |
|---|---|---|---|---|
| GB | 1 547 461 | A | | 6/1979 |
| JP | 56-036336 | A | | 4/1981 |
| JP | 58-147543 | A | | 9/1983 |
| JP | 58-148419 | A | | 9/1983 |
| JP | 58-175654 | A | | 10/1983 |
| JP | 60-233904 | A | | 11/1985 |
| JP | 61-180413 | A | | 8/1986 |
| JP | 62-226603 | A | | 10/1987 |
| JP | 63-045043 | A | | 2/1988 |
| JP | 63-170030 | | | 7/1988 |
| JP | 02-081495 | A | | 3/1990 |
| JP | 02-251439 | A | | 10/1990 |
| JP | 05-267922 | A | | 10/1993 |
| JP | 06-091778 | A | | 4/1994 |
| JP | 07-278763 | A | | 10/1995 |
| JP | 09-102656 | A | | 4/1997 |
| JP | 11-214209 | A | | 8/1999 |
| JP | 11-312604 | A | | 11/1999 |
| JP | 2001-307936 | A | | 11/2001 |
| JP | 2001-319807 | | * | 11/2001 |
| JP | 2001-319807 | A | | 11/2001 |
| JP | 2002-164224 | A | | 6/2002 |
| JP | 2003-110340 | A | | 4/2003 |
| WO | 00/28556 | A1 | | 5/2000 |

OTHER PUBLICATIONS

Translation JA 2001-319807.*

Official Action issued by the Japanese Patent Office on Jul. 11, 2006 in corres. JP Appln. No. 2002-276333, and English translation thereof.

Official Action issued by the Japanese Patent Office on Jul. 11, 2006 in JP Appln. No. 2002-276333, and English translation thereof.

Official Action issued by the Japanese Patent Office on Aug. 22, 2006 in JP Appln. No. 2002-254394.

* cited by examiner

MAGNETIC SUBSTRATE, LAMINATE OF MAGNETIC SUBSTRATE AND METHOD FOR PRODUCING THEREOF

CROSS-REFERENCE TO RELATED APPLICATIONS

This application is a continuation-in-part of PCT/JP03/00290 filed on Jan. 15, 2003, which claims the benefit of Japanese Patent Application No. 2002-7023 filed on Jan. 16, 2002, Japanese Patent Application No. 2002-17609 filed on Jan. 25, 2002, Japanese Patent Application No. 2002-89931 filed on Mar. 27, 2002, and Japanese Patent Application No. 2002-111018 filed on Apr. 12, 2002, the contents of which are incorporated by reference.

TECHNICAL FIELD

The present invention relates to a magnetic substrate produced using a ribbon comprising an amorphous metal magnetic material and a heat resistant resin, a laminate of the substrate and a method for producing thereof. The present invention further relates to a member or a part of applied magnetic products using the magnetic substrate or the laminate.

DESCRIPTION OF RELATED ART

An amorphous metal ribbon is an amorphous solid produced by rapidly cooling the starting material that is selected from various types of metals from its molten state. The ribbon usually has a thickness of from about 0.01 mm to 0.1 mm. The amorphous metal ribbon has a random atomic structure that does not have regularity in the atomic ordering, thereby exhibiting excellent properties as a soft magnetic material.

In order to elicit its excellent magnetic properties, the amorphous metal ribbon is usually subjected to a heat treatment of predetermined conditions. Although the conditions for the heat treatment can vary depending on properties to be elicited and type of the amorphous metal, generally the treatment is conducted in an inert atmosphere at a high temperature such as from about 300 to 500° C. and for a long period of time such as from about 0.1 to 100 hr. While excellent magnetic properties are elicited by the heat treatment, the treatment makes the ribbon extremely brittle and makes its handling physically difficult.

As the electronics and communication industries grow significantly, the demands for applied magnetic products used in electric or electronic instruments rapidly grow thereby causing a rapid increase in the variety of the types of the products. Although the amorphous ribbons are planned to be used in various utilities because of their excellent magnetic properties, they are actually used only in such an application as a wound iron core, since the heat treatment, which makes the ribbon brittle, is necessary to improve the magnetic properties.

In order to solve the challenge described above, a method to laminate and adhere the amorphous metal ribbons, using as an adhesive, a heat resistant polymer compound such as a polyimide that resists the temperature at which the heat treatment for the purpose of improving the magnetic properties of the amorphous metal is proposed in Japanese Patent Laid-Open Publication No. 175654/1983. According to the method, the technical challenge of handling brittle ribbons is solved, because the adhesion and lamination using the heat resistant resin are accomplished simultaneously with the heat treatment. However the magnetic properties deteriorate in comparison with the case of not using the resin, because of unnecessary inner stresses caused by the heat resistant resin.

Recently, further higher efficiencies and higher performances (high magnetic permeability and miniaturization) are demanded in various electric or electronic parts and products that utilize magnetic materials. That causes a high demand for the higher magnetic properties (low loss, high magnetic permeability and high magnetic flux density) of the magnetic materials used in them.

A magnetic material that has excellent magnetic properties, which is potentially possessed by amorphous metal ribbon and mechanical strength has not been developed, and its development has been desired in view of the above-mentioned situation.

Conventionally, amorphous metal ribbons were used in a form of a laminate to achieve sufficient mechanical strength, and it necessitated the usage of an adhesive. The adhesive had to be heat resistant with regard to the heat treatment to improve the magnetic properties. For examples; Japanese Patent Laid-Open Publication No. 36336/1981 describes a method for producing a laminate in which an adhesive is coated on an amorphous ribbon to improve the punchability; Japanese Patent Laid-Open Publication No. 175654/1983 describes a method in which a heat resistant resin is coated on an amorphous metal ribbon previously and then a heat treatment to improve the magnetic properties is conducted in a magnetic field; and Japanese Patent Laid-Open Publication No. 45043/1988 describes a method in which ribbons are laminated with a resin that covers not more than 50% of the area to be adhered. In each of the described methods, neither a method of selecting an appropriate combination of a magnetic metal and a heat resistant resin nor a method for producing a laminate suitable for the combination is sufficiently described. Furthermore, the occurrence of delamination or fracture during the processing of the laminate after the lamination has not been completely prevented.

With respect to the application for an antenna using an amorphous metal ribbon, Japanese Patent Laid-Open Publication No. 233904/1985 describes an antenna apparatus using an amorphous magnetic core. Japanese Patent Laid-Open Publication No. 267922/1993 describes an automotive antenna used in a frequency range of from 10 kHz to 20 kHz. According to the publication, a core material obtained by laminating amorphous metal ribbons is subjected to a heat treatment at from 390° C. to 420° C. for about from 0.5 hr to 2 hr, then an epoxy resin or so is impregnated into it. Furthermore, Japanese Patent Laid-Open Publication No. 278763/1995 describes an antenna core obtained by laminating amorphous metal ribbons. In the publication, an antenna having a high Q value (Quality factor: $Q=\omega L/R$; $\omega=2\pi f$; f: frequency, L: inductance, R: resistance including estimated loss of coil), which represents performance as an antenna coil, at a frequency of 100 kHz or more is proposed. However, detailed explanations on an actual antenna are not described. According to the latter two of the publications, epoxy or silicone resin is impregnated in the core after the heat treatment for the purpose of improving the magnetic properties. Therefore, another heat treatment at a temperature of lower than 300° C., more specifically lower than 200° C., is necessary to harden the resin. It is inevitable that the magnetic properties deteriorate in comparison with those right after the first heat treatment.

In order to deal with the depletion of energy resources, electric motors and electric generators widely used in electronic instruments are demanded to be more highly efficient. Losses in electric motors or electric generators are caused mainly by iron loss, copper loss and mechanical loss. From the viewpoint of reducing eddy current loss, a magnetic thin plate having the smallest thickness as possible has been desired. In this respect, a silicon steel, a soft magnetic iron or a parmalloy is widely used these days. These poly-crystalline metals are cast to form ingots and then hot-worked and cold-worked to form a sheet of desired thickness. In case of using silicon steel, the thickness of the sheet is limited to about 0.1 mm or more owing to the brittleness of the material or so on.

Magnetic materials such as amorphous metal ribbons comprising Fe or Co as their main component are considered to be hopeful material for a magnetic core, which is a key part to improve the efficiency of an electric motor. However, as described above, the magnetic materials such as amorphous metal ribbons comprising Fe or Co as their main component require a heat treatment at a high temperature of from 200° C. to 500° C. to elicit the magnetic properties. The heat treatment makes the ribbons brittle, and when a stress is applied on the material, cracks or chips are generated. Therefore, it is difficult to obtain a laminate having the shape of electric motor core using the materials.

As a method for producing a laminate of amorphous metal ribbons used for an electric motor or an electric generator, Japanese Patent Laid-Open Publication No. 312604/1999 describes a method in which a laminate is produced using an amorphous metal as the ribbon and an epoxy resin, a bisphenol A type epoxy resin, a partially saponificated montanic ester wax, a modified polyester resin, phenolic butyral resin or so on as the resin. However each of the resins is considered to have insufficient heat resistance at the heat treatment temperature of the magnetic core (from 200° C. to 500° C.). Therefore, the heat treatment, even if it is conducted after the lamination, makes the amorphous metal ribbons brittle, and stresses caused by loads applied during the lamination generate cracks or chips in the amorphous metal ribbons. These phenomena are considered to be problems in the practical use.

SUMMARY OF THE INVENTION

The inventors reviewed the composition of the known magnetic metals and reviewed the processes of lamination, adhesion and heat treatment. And, as a result of intensive researches, the inventors found out that it is possible to produce a material having desired mechanical properties and excellent magnetic properties, by using amorphous metal ribbons, using a substrate, wherein a heat resistant resin that resists the heat treatment in order to improve the magnetic properties of the magnetic material is applied, and by subjecting the materials to a treatment in a pressurized condition.

It was made clear that one can provide a substrate or a laminate, wherein a laminate prepared by heat-treating after stacking and adhering amorphous metal ribbons has a small deterioration in magnetic properties. It was also made clear that one can provide a magnetic core that has a high Q value, which is a performance index as the inductance of a laminate obtained by laminating amorphous magnetic ribbons, and has been stiffly unified by using the magnetic substrate.

As a result of an intensive research, the inventors have found out that in a magnetic substrate comprising a resin and an amorphous metal ribbon and a laminate of the substrate, when an amorphous metal ribbon having Fe or Co as its main component is used as the amorphous metal ribbon, by carrying out a laminate-adhesion between the resin and the amorphous metal or between the amorphous metal and the amorphous metal through the resin and a heat treatment for the purpose of improving the magnetic properties simultaneously in a specific condition, or by firstly carrying out a laminate-adhesion in a specific condition and secondly carrying out a heat treatment for the purpose of improving the magnetic properties in a specific condition, it is possible to provide a magnetic substrate comprising an amorphous metal ribbon and a heat resistant resin and having both excellent magnetic properties, which the amorphous metal ribbon having Fe or Co as its main component originally possessed, and intended mechanical properties and a laminate of the magnetic substrate, to complete the present invention.

The inventors have found out that, in a magnetic substrate comprising an amorphous metal ribbon containing more Fe than a specific amount and a heat resistant resin or a laminate of the magnetic substrates, a material having low iron loss and high tensile strength by carrying out a pressurized heat treatment can be obtained. The inventors have also found that the material is preferable for a stator or a rotor of an electric motor or an electric generator to complete the present invention.

In short, the present invention provides a magnetic substrate characterized by the fact that a heat resistant resin and/or a precursor thereof is applied on at least a part of a side or on at least a part of both sides of an amorphous metal ribbon represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 1.0$, $10 < a \leqq 35$ and $0 \leqq b \leqq 30$, and a and b are represented in terms of atomic %.

The present invention also provides a magnetic substrate characterized by the fact that a heat resistant resin and/or a precursor thereof is applied on at least a part of a side or on at least a part of both sides of an amorphous metal ribbon represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 0.2$, $10 < a \leqq 35$ and $0 \leqq b \leqq 30$, and a and b are represented in terms of atomic %.

The present invention further provides a laminate of the magnetic substrate, wherein the amorphous metal ribbons described above are laminated with a heat resistant resin and/or a precursor thereof.

In the laminate of magnetic substrates of the present invention, which is characterized by the fact that a heat resistant resin and/or a precursor thereof is applied on at least a part of a side or on at least a part of both sides of an amorphous metal ribbon represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 0.3$, $10 < a \leqq 35$ and $0 \leqq b \leqq 30$, and a and b are represented in terms of atomic %, the laminate of amorphous metal ribbons has a relative magnetic permeability, p, of 12,000 or more and core loss Pc of 12 W/kg or less, which are measured in a closed magnetic path at a frequency of 100 kHz, and a tensile strength of 30 MPa or more.

In another aspect of the present invention, it provides a magnetic substrate characterized by the fact that a heat resistant resin and/or a precursor thereof is applied on at least a part of a side or on at least a part of both sides of an amorphous metal ribbon, wherein the heat resistant resin comprises a resin that satisfies the following five characteristics:

(1) the weight loss rate owing to the thermal decomposition in a thermal history of 2 hr in a nitrogen atmosphere at 350° C., measured using a DTA-TG is 1% by weight or less;

(2) the tensile strength after a thermal history of 2 hr in a nitrogen atmosphere at 350° C. is 30 MPa or more;

(3) the glass transition temperature, measured using a DSC in a nitrogen flow at a heating rate of 10° C. per 1 mm is from 120° C. to 250° C.;

(4) the temperature at which the melt viscosity, measured using a Koka-type flowtester, is 1,000 Pa·s or less is not lower than 250° C. and not higher than 400° C.; and (5) the heat of fusion owing to crystals in the resin, which has been cooled from 400° C. to 120° C. at a rate of 0.50° C./min, measured using a DSC in a nitrogen flow at a heating rate of 10° C. per 1 min is 10 J/g or less.

The heat resistant resin used in the present invention preferably is an aromatic polyimide resin that has one type or more types of repeating unit selected from the group consisting of those represented by the chemical formulae (1) to (4) in the main chain skeleton and having a ratio of aromatic rings having bonds in meta position to the total aromatic rings in the repeating unit is from 20 to 70 mol %.

In the formulae (1) to (4), each of X represents a bivalent bonding group selected from a group consisting of direct bond, ether bond, isopropylidene bond and carbonyl bond and can be the same or different; and each of R is a tetravalent bonding group selected from a group consisting of groups represented by chemical formulae (5) to (10) and can be the same or different.

(formula 5)

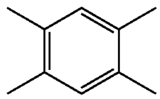

(formula 6)

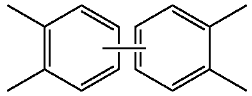

(formula 7)

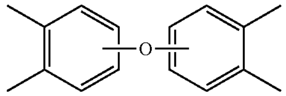

(formula 8)

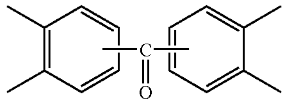

(formula 9)

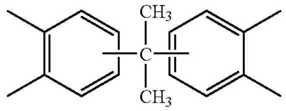

(formula 10)

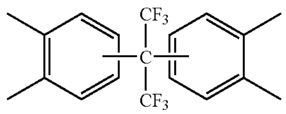

(Formula 1)

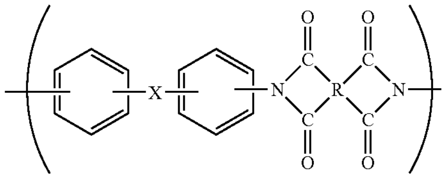

(Formula 2)

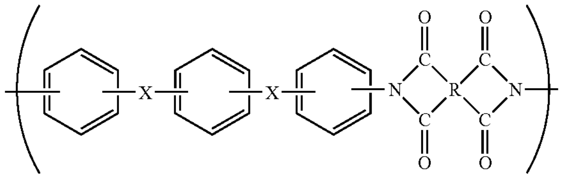

(Formula 3)

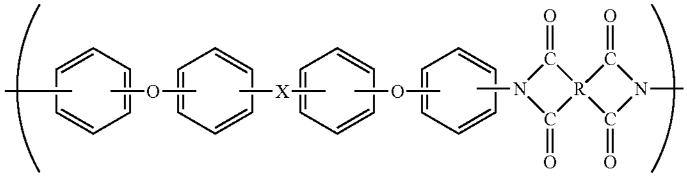

(Formula 4)

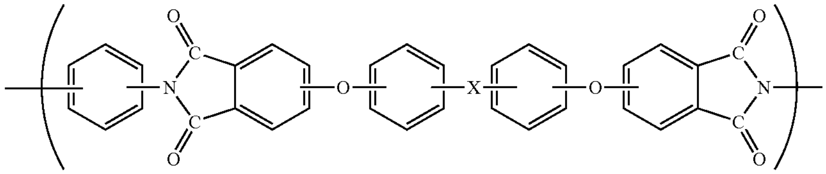

Furthermore, the heat resistant resin preferably is an aromatic polyimide resin having a repeating unit represented by the chemical formula (11) or (12) in the main chain skeleton.

(formula 11)

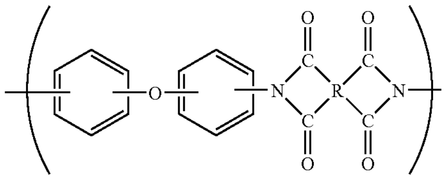

(formula 12)

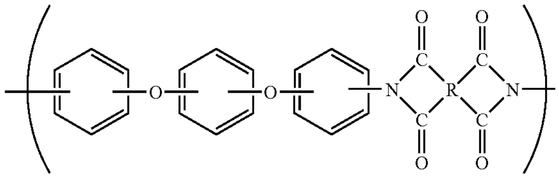

In the formulae (11) and (12), each R preferably is a tetravalent bonding group selected from the chemical formulae (5) to (10) and can be the same or different.

The heat resistant resin used in the present invention is preferably a resin comprising an aromatic polyimide resin having a repeating unit represented by the chemical formula (13) in the main chain skeleton.

In another aspect of the present invention, it also provides a process for producing a magnetic substrate comprising an amorphous metal ribbon and a heat resistant resin characterized by the fact that the heat resistant resin is applied on the amorphous metal ribbon and then they are subjected to a heat treatment in a pressurized condition.

A process for producing a magnetic substrate of the present invention is characterized by the fact that an amorphous metal ribbon is subjected to a heat treatment in a pressurized condition.

In the process for producing a magnetic substrate of the present invention, the heat treatment is preferably carried out under an applied pressure of from 0.01 to 500 MPa and at a temperature of from 200 to 500° C.

The heat treatment in a pressurized condition can be carried out in more than one step and the conditions of the steps can be different from each other.

It is one of the preferred embodiments of the present invention to produce a magnetic laminate by carrying out a heat treatment under the conditions of an applied pressure of from 0.01 to 100 MPa, a temperature of from 350 to 480° C. and a time period of from 1 to 300 min after applying a resin on a side or on both sides of an amorphous metal ribbon represented by the general formula:

$$(Co_{(1-c)}Fe_c)_{100-a-b}X_aY_b$$

(formula 13)

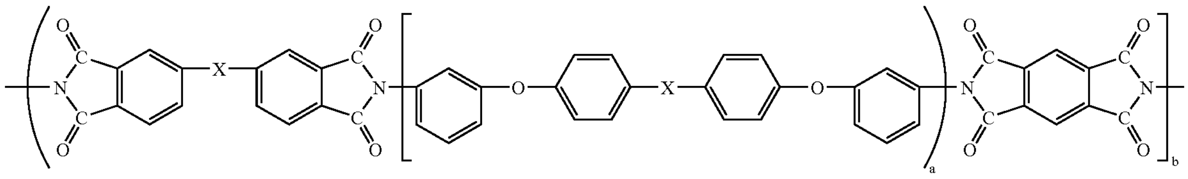

In the formula (13) above, each of X represents a bivalent bonding group selected from the group consisting of direct bond, ether bond, isopropylidene bond and carbonyl bond and can be the same or different. In the formula (13), a and b are numbers that fulfill the relationships: a+b=1, 0<a<1 and 0<b<1.

As the heat resistant resin of the present invention, an aromatic polysulfone resin having one type or two or more types of repeating unit selected from the repeating units represented by the chemical formula (14) or (15) in the main chain skeleton is preferably used.

(formula 14)

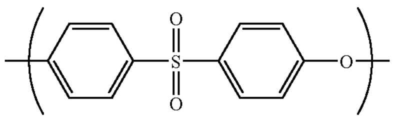

(formula 15)

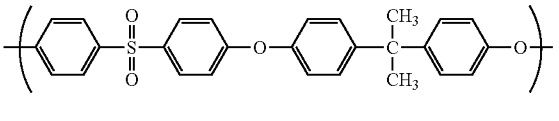

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 0.3$, $10 < a \leqq 35$ and $0 \leqq b \leqq 30$, and a and b are represented in terms of atomic %.

It is also one of the preferred embodiments of the present invention to produce a magnetic laminate by applying a resin on a side or on both sides of the amorphous metal ribbons described above, stacking the ribbons and then subjecting them to the first heat treatment under the conditions of an applied pressure of from 0.01 to 500 MPa, a temperature of from 200 to 350° C. and a time period of from 1 to 300 min and subjecting them to a second heat treatment under the conditions of an applied pressure of from 0 to 100 MPa, a temperature of from 350 to 480° C. and a time period of from 1 to 300 min.

A method for producing a magnetic laminate comprising more than one magnetic substrate wherein a heat resistant resin layer or a precursor of the heat resistant resin is formed on a part or the whole area of a side or on both sides of an amorphous metal ribbon that is represented by a general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0.3<c\leqq 1.0$, $10<a\leqq 35$ and $0\leqq b\leqq 30$, and a and b are represented in terms of atomic %, and obtained by a pressurized heat treatment under a press on an applied pressure at not less than 0.2 MPa and not more than 5 MPa at a temperature in the range of from 300° C. to 450° C. for 1 hr or more is one of the preferred embodiments of the present invention.

The laminate of magnetic substrates described above is preferably characterized by having the properties:

(1) the iron loss, W10/1000, defined in JIS C2550 is 15 W/g or less;

(2) the maximum magnetic flux density, Bs, is not less than 1.0 T and not more than 2.0 T; and (3) the tensile strength defined in JIS Z2241 is 500 MPa or more.

In producing the laminate of magnetic substrates of the present invention, a process characterized by putting a highly heat resistant resin sheet between a flat plate of a press and a magnetic laminate can be preferably utilized.

The magnetic substrate and the laminate thereof of the present invention can be used in applied magnetic parts.

A thin antenna, whose core comprises the magnetic substrate or the laminate thereof of the present invention, having coated conducting wire wound on the core characterized by having a insulating member on at least a part of the core on which the wire is wound is one of the preferred embodiments of the present invention.

Also, a thin antenna, whose core comprises the magnetic substrate or the laminate thereof of the present invention, having coated conducting wire wound on the core characterized by having a insulating member on at least a part of the core on which the wire is wound and having a bobbin at the end of the laminate is one of the preferred embodiments of the present invention.

An antenna for RFID to be built in planar RFID tags comprising a wound coil and a plate core of a ferromagnetic material, in which the plate core penetrates the wound coil, wherein the magnetic substrate or the laminate thereof of the present invention is used as the ferromagnetic plate core is one of the preferred embodiments of the present invention.

Furthermore, the antenna for RFID, in which the plate core described above is shape-preserving in the process of bending, is one of the preferred embodiments of the present invention.

Furthermore, in another aspect of the present invention, it provides an electric motor or an electric generator, in which the magnetic laminate is used in a part of or the whole the rotor or the stator comprising a soft magnetic material.

In another aspect of the present invention, it also provides an electric motor or an electric generator having a rotor or a stator comprising a magnetic material, characterized by the fact that at least a part of the magnetic material in the rotor or the stator is constituted of a laminate comprising an amorphous metal magnetic ribbon and the laminate comprising an amorphous metal magnetic ribbon is formed by laminating layers of a heat resistant adhesive resin and layers of the amorphous metal magnetic ribbon alternately.

In the antenna of the present invention, a magnetic substrate comprising an amorphous metal ribbon, in which the amorphous metal described above is represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0\leqq c\leqq 0.2$, $10<a\leqq 35$ and $0\leqq b\leqq 30$, and a and b are represented in terms of atomic %, can be preferably used.

In the electric motor or the electric generator of the present invention, it is preferable to use a magnetic substrate, wherein the amorphous metal described above is represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0.3<c\leqq 1\ 0$, $10<a\leqq 35$ and $0<b\leqq 30$, and a and b are represented in terms of atomic %, and the heat resistant resin described above, comprises a resin that satisfies all of the five characteristics:

(1) the weight loss rate owing to the thermal decomposition in a thermal history of two hr in a nitrogen atmosphere at 350° C. is 1% by weight or less;

(2) the tensile strength after a thermal history of two hr in a nitrogen atmosphere at 350° C. is 30 MPa or more;

(3) the glass transition temperature is from 120° C. to 250° C.;

(4) the temperature at which the melt viscosity is 1,000 Pa·s or less is not lower than 250° C. and not higher than 400° C.; and (5) the heat of fusion owing to crystals in the resin after being cooled from 400° C. to 120° at a ratio of 0.50° C./min is 10 J/g or less.

In another aspect of the present invention, the core used in the electric motor or the electric generator of the present invention is constituted of a laminate comprising an amorphous metal magnetic ribbon, and the laminate comprises an amorphous metal magnetic ribbon described above that it is formed by alternatively, laminating layers of heat resistant resin, whose weight loss rate owing to a thermal decomposition in a thermal history of 1 hr in a nitrogen atmosphere at 300° C. is 1% by weight or less, and layers of the amorphous metal magnetic ribbon and is comprising an amorphous metal layer having a tensile strength of 500 MPa or less and an amorphous metal layer having a tensile strength of 500 MPa or more.

BRIEF DESCRIPTION OF THE DRAWINGS

In FIG. 4, 411 is a frame for the purpose of preventing slippage, 412 is a flat mold, 413 is a magnetic laminated plate, 421 is a heat resistant elastic sheet and 431 is a heating plate of the press facility.

In FIG. 6, 611 is a rotor, 612 is a stator, 613 is a coil, 621 is a rotating shaft, 622 is a shaft bearing and 630 is a case.

Figure 1:
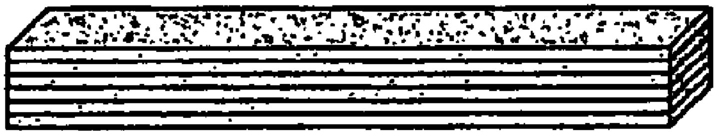
FIG. 1 is an example of a laminate for antenna formed by alternately laminating amorphous metal ribbons and heat resistant resin.

BEST MODES FOR CARRYING OUT THE INVENTION (Amorphous Metal Ribbon)

The chemical composition of the amorphous metal ribbon used in the magnetic substrate of the present invention has Fe or Co as its main component and is represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 1.0$, $10 < a \leqq 35$ and $0 \leqq b \leqq 30$, and a and b are represented in terms of atomic %.

In one aspect of the present invention, an amorphous metal that satisfies $0 \leqq c \leqq 0.2$ or $0 \leqq c \leqq 0.3$ is also referred to as "Co based amorphous metal" or "amorphous metal whose main component is Co" and an amorphous metal that satisfies $0.3 < c \leqq 1.0$ is also referred to as "Fe based amorphous metal" or "amorphous metal whose main component is Fe".

In the amorphous metal ribbon used in the present invention, the ratio of Co to Fe tends to contribute to increase the saturation magnetization of the amorphous metal. If the saturation magnetization is important depending on the utility, the amount of substitution, c, preferably is in the range of $0 \leqq c \leqq 0.2$. More preferably, it is in the range of $0 \leqq c \leqq 0.1$.

The element X is an element that tends to be effective in reducing the crystallization speed for the purpose of amorphizing to produce the amorphous metal ribbon used in the present invention. If the amount of the element X is not more than 10% by atom, the noncrystallinity may be easy to deteriorate to partly contain crystalline metal. If the amount of the element X is more than 35% by atom, the mechanical strength of the alloy ribbon may be easy to deteriorate, although amorphous structure can be obtained, and a continuous ribbon may be difficult to be obtained. Therefore, a, the amount of the element X is preferably is in the range of $10 < a \leqq 35$, and preferably is in the range of $12 \leqq a \leqq 30$.

The element Y tends to be effective in improving the corrosion resistance of the amorphous metal ribbon used in the present invention. The most effective elements among those are, Zr, Nb, Ti, Hf, Ta, W, Cr, Mo, V, Ni, P, Al, Pt, Rh, Ru, Sn, Sb, Cu, Mn an rare earth elements. If the amount of the element Y added is 30% or more, the mechanical strength of the ribbon may be easy to deteriorate, although the effect of improving corrosion resistance still exists. Therefore, it is preferable that $0 \leqq b \leqq 30$. More preferable range is $0 \leqq b \leqq 20$.

Furthermore, the amorphous metal ribbon used in the present invention is, for example, obtained by melting a mixture of metals in the intended chemical composition using a high-frequency melting furnace to make a homogeneous melt, and then quenching the melt by casting it on a cooling roll using an inert gas or the like to make it flow. The thickness is usually from 5 to 100 μm, preferably from 10 to 50 μm. More preferably, a ribbon having a thickness of from 10 to 30 μm is used.

The amorphous metal ribbon used in the present invention can form a laminate to be used in a member or a part of applied magnetic products of various types by being laminated. As the amorphous metal ribbon used in the magnetic substrate of the present invention, an amorphous metal material formed in sheet-like shape by liquid quench method or so on can be used. Also, a material obtained by molding a powder amorphous metal material to form a sheet like shape by press molding or so on can be used. Furthermore, as the amorphous metal ribbon used in the magnetic substrate, a single amorphous metal ribbon can be used and more than one type of amorphous metal ribbons laminated together can also be used.

Furthermore, a magnetic substrate, wherein a heat resistant resin or a precursor of the heat resistant resin is formed on at least a part of the amorphous metal ribbon described above or a magnetic substrate wherein the precursor has been resinified can be obtained.

The magnetic substrate has a good processability in press working, cutting and so on in comparison with a ribbon on which no heat resistant resin is formed.

As the Fe based amorphous metal material of the present invention, Fe-semi metal system amorphous metal materials such as Fe-Si-B system, Fe-B system and Fe-P-C system and Fe-transition metal amorphous metal materials such as Fe-Zr system, Fe-Hf system and Fe-Ti system can be preferably cited. As the Co based amorphous metal material, amorphous metal materials such as Co-Si-B system and Co-B system can be preferably cited.

As the Fe based amorphous metal material preferably used in a member or a part of an applied magnetic product that handles high power electricity, such as an electric motor or a transformer, Fe-semi metal system amorphous metal materials such as Fe-B-Si system, Fe-B system and Fe-P-C system and Fe-transition metal system amorphous metal materials such as Fe-Zr system, Fe-Hf system and Fe-Ti system can be cited. As the Fe-Si-B system, for example, $Fe_{78}Si_9B_{13}$ (at %), $Fe_{78}Si_{10}B_{12}$ (at %), $Fe_{81}Si_{3.5}B_{13.5}C_2$ (at %), $Fe_{77}Si_5B_{16}Cr_2$ (at %), $Fe_{66}Co_{18}Si_1B_{15}$ (at %) and $Fe_{74}Ni_4Si_2B_{17}Mo_3$ (at %) can be cited. Among these, $Fe_{78}Si_9B_{13}$ (at %) and $Fe_{77}Si_5B_{16}Cr_2$ (at %) are preferably used. Using $Fe_{78}Si_9B_{13}$ (at %) is especially preferable. However, the amorphous material in the present invention is not limited to these.

(Heat Resistant Resins)

Although the heat treatment temperature for the magnetic substrate varies depending on the chemical composition of the amorphous metal ribbon and magnetic properties to be obtained, the temperature that elicits good magnetic properties tends to be within the range of approximately from 300 to 500° C. Since the heat resistant resin has been formed on the amorphous metal ribbon, it is subjected to a heat treatment at a temperature appropriate to elicit magnetic properties of the magnetic substrate.

In another aspect of a heat resistant resin used in the present invention, it preferably comprises a resin that satisfies all of the following requirements:

(1) the weight loss rate owing to a thermal decomposition in a thermal history of 2 hr in a nitrogen atmosphere at 350° C. is 1 % by weight or less;

(2) the tensile strength after a thermal history of 2 hr in a nitrogen atmosphere at 350° C. is 30 MPa or more;
(3) the glass transition temperature is from 120° C. to 250° C.;
(4) the temperature at which the melt viscosity is 1,000 Pa·s or less is not lower than 250° C. and not higher than 400° C.; and
(5) the heat of fusion owing to crystals in the resin after being cooled from 400° C. to 120° C. at a ratio of 0.5° C./min is 10 J/g or less.

For example, the weight loss rate of the heat resistant resin in the present invention when kept in a nitrogen atmosphere at 350° C. for 2 hr after a drying at 120° C. for 4 hr as a pre-treatment, measured using a differential thermal analyzer and thermogravimeter, DTA-TG, is preferably 1% or less, more preferably 0.3% or less. The effect of the invention can be fully displayed in these ranges. Using a resin having a greater weight loss is not preferable as a breaking off or swelling of the laminate may happen.

The tensile strength test is for example, carried out according to ASTM D-638 on a predetermined type of specimen made of a resin that have been heat treated in a nitrogen atmosphere at 350° C. for 2 hr. The tensile strength is usually 30 MPa or more, preferably 50 MPa or more. If the tensile strength is out of the range, effects, such as good shape stability, may not be easy to be displayed.

The glass transition temperature, Tg, of the heat resistant resin in the present invention is for example, determined from a point of inflection on the endothermic curve that shows glass transition measured using a differential scanning calorimeter, DSC. The Tg is not less than 120° C. and not more than 250° C., preferably not more than 220° C. When the Tg is too high, it may be difficult to prevent from deterioration of the magnetic properties.

In one aspect, it is important that the heat resistant resin of the invention shows thermoplasticity. When it is applied for the present invention in a form of varnish, a resin that can be melted by heating is used, even when it is apparently used like a thermosetting resin.

The temperature, at which the melt viscosity measured for example, using a Koka-type flow tester is 1,000 Pa·s or less, is usually 250° C. or more and usually 400° C. or less, preferably 350° C. or less, more preferably 300° C. or less. When the temperature, at which the melt viscosity is 1,000 Pa·s or less, is in the range like this, heat press adhesion of the present invention can be carried out at low temperatures and the effect of excellent adhesion properties can be displayed. When the temperature at which the melt temperature goes down is too high, adhesion failure may occur.

Preferably, the heat of fusion owing to crystalline constituents existing in the resin after cooling the heat resistant resin from 400° C. to 120° C. at a constant rate of 0.5° C./min is 10 J/g or less, more preferably 5 J/g or less, much more preferably 1 J/g or less. When it is in the range like this, an excellent adhesion property, which is one of the effects of the present invention, can be fully displayed.

Although no particular limitation is imposed on the molecular weight and the molecular weight distribution of the heat resistant resin to be used, it is preferable that the value of logarithmic viscosity measured after dissolving the resin in a solvent that is capable of dissolving the resin at a concentration of 0.5 g/100 ml at 35° C. be 0.2 dl/g or more, since there is a concern that the strength of the resin coating of the coated substrate and the adhesive strength are adversely influenced in case that the molecular weight is extremely low.

(Type of the Heat Resistant Resin)

As examples of the resin which is suitable for the condition described above but not limited, polyimide resins, ketone resins, polyamide resins, nitrile resins, thioether resins, polyester resins, arylate resins, sulfone resins, imide resins and amide-imide resins can be cited. In the present invention, it is preferable to use a polyimide resin, a ketone resin or a sulfone resin.

The heat resistant resin used in the present invention is preferably an aromatic polyimide resin that has one or more types of repeating units selected from the group consisting of those represented by the chemical formulae (1) to (4) in the main chain skeleton and having a ratio of aromatic rings having bonds in meta position to total aromatic rings in the repeating unit is from 20 to 70 mol %.

(Formula 1)

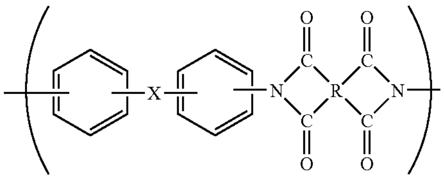

(Formula 2)

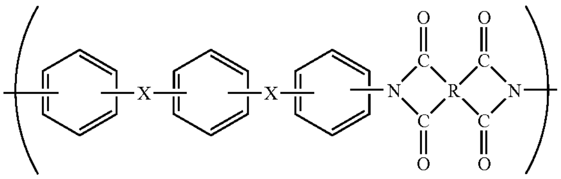

(Formula 3)

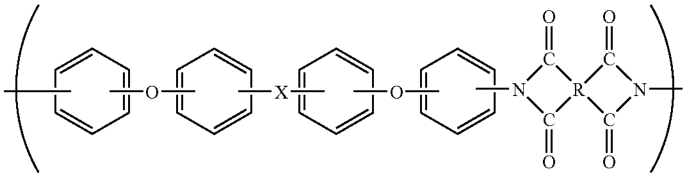

(Formula 4)

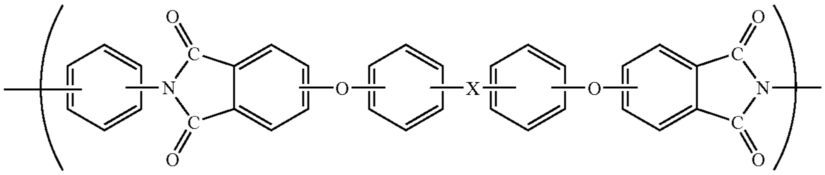

In the formulae (1) to (4), each of X represents a bivalent bonding group selected from a group consisting of direct bond, ether bond, isopropylidene bond and carbonyl bond and can be the same or different; and each of R is a tetravalent bonding group selected from a group consisting of the groups represented by chemical formulae (5) to (10) and can be the same or different.

(formula 5)

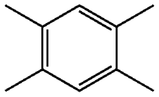

(formula 6)

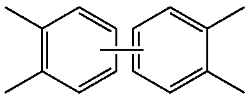

(formula 7)

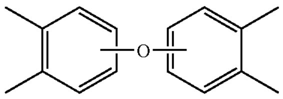

(formula 8)

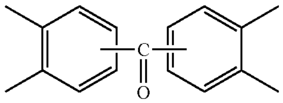

(formula 9)

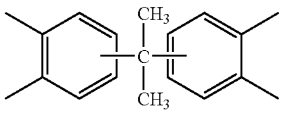

(formula 10)

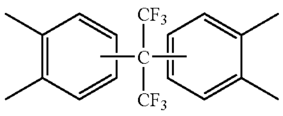

One of the methods of preparing for polyimides but not limited, is described below. These polyimides can be prepared from an aromatic diamine and an aromatic tetracarboxylic acid by polycondensation.

As the aromatic diamine, a dinuclear compound having two aromatic rings is used to obtain a polyimide represented by the chemical formula (1); a trinuclear compound having three aromatic rings is used to obtain a polyimide represented by the chemical formula (2); a tetranuclear compound having four aromatic rings is used to obtain a polyimide represented by the chemical formula (3); and a mononuclear compound having one aromatic ring is used to obtain a polyimide represented by the chemical formula (4).

(i) As the mononuclear compound, p-phenylenediamine, m-phenylenediamine and so on;

(ii) as the dinuclear compound, 3,3'-diaminodiphenyl ether, 3,4'-diaminodiphenyl ether, 4,4'-diaminodiphenyl ether, 3,3'-diaminodiphenyl sulfide, 3,4'-diaminodiphenyl sulfide, 4,4'-diaminodiphenyl sulfide, 3,3'-diaminodiphenyl sulfone, 3,4'-diaminodiphenyl sulfone, 4,4'-diaminodiphenyl sulfone, 3,3'-diaminobenzophenone, 3,4'-diaminobenzophenone, 4,4'-diaminobenzophenone, 3,3'-diaminodiphenylmethane, 3,4'-diaminodiphenylmethane, 4,4'-diaminodiphenylmethane, 2,2-bis(3-aminophenyl) propane, 2,2-bis(4-aminophenyl)propane, 2-(3-aminophenyl)-2-(4-aminophenyl)propane, 2,2-bis(3-aminophenyl)-1,1,1,3,3,3-hexafluoropropane, 2,2-bis(4-aminophenyl)-1,1,1,3,3,3-hexafluoropropane, 2-(3-aminophenyl)-2-(4-aminophenyl)-1,1,1,3,3,3-hexafluoropropane and so on;

(iii) as the trinuclear compound, 1,1-bis(3-aminophenyl)-1-phenylethane, 1,1-bis(4-aminophenyl)-1-phenylethane, 1-(3-aminophenyl)-1-(4-aminophenyl)-1-phenylethane, 1,3-bis(3-aminophenoxy)benzene, 1,3-bis(4-aminophenoxy)benzene, 1,4-bis(3-aminophenoxy)benzene, 1,4-bis(4-aminophenoxy)benzene, 1,3-bis(3-aminobenzoyl)benzene, 1,3-bis(4-aminobenzoyl)benzene, 1,4-bis(3-aminobenzoyl)benzene, 1,4-bis(4-aminobenzoyl) benzene, 1,3-bis(3-amino-α,α-dimethylbenzyl)benzene, 1,3-bis(4-amino-α,α-dimethylbenzyl)benzene, 1,4-bis(3-amino-α,α-dimethylbenzyl)benzene, 1,4-bis(4-amino-α,α-dimethylbenzyl)benzene, 1,3-bis(3-amino-α,α-ditrifluoromethylbenzyl)benzene, 1,3-bis(4-amino-α,α-ditrifluoromethylbenzyl)benzene, 1,4-bis(3-amino-α,α-ditrifluoromethylbenzyl)benzene, 1,4-bis(4-amino-α,α-ditrifluoromethylbenzyl)benzene, 2,6-bis(3-aminophenoxy)benzonitrile, 2,6-bis(3-aminophenoxy) pyridine and so on; and (iv) as the tetranuclear compound, 4,4'-bis(3-aminophenoxy) biphenyl, 4,4'-bis(4-aminophenoxy)biphenyl, bis[4-(3-aminophenoxy)phenyl]ketone, bis[4-(4-aminophenoxy) phenyl]ketone, bis[4-(3-aminophenoxy)phenyl]sulfide, bis[4-(4-aminophenoxy)phenyl]sulfide, bis[4-(3-aminophenoxy)phenyl]sulfone, bis[4-(4-aminophenoxy)phenyl]sulfone, bis[4-(3-aminophenoxy)phenyl]ether, bis[4-(4-aminophenoxy)phenyl]ether, 2,2-bis[4-(3-aminophenoxy)phenyl]propane, 2,2-bis[4-(4-aminophenoxy)phenyl]propane, 2,2-bis[3-(3-aminophenoxy)phenyl]-1,1,1,3,3,3-hexafluoropropane, 2,2-bis[4-(4-aminophenoxy)phenyl]-1,1,1,3,3,3-hexafluoropropane and so on; can be cited, respectively. However it is not limited to the diamines cited. The bond between the aromatic rings of the dinuclear or trinuclear compound of the aromatic diamine is preferably a ether bond.

Among the aromatic diamines described above, 4,4'-bis(3-aminophenoxy)biphenyl, bis[4-(3-aminophenoxy)phenyl] ketone, bis[4-(3-aminophenoxy)phenyl]sulfide, bis[4-(3-aminophenoxy)phenyl]sulfone, bis[4-(3-aminophenoxy) phenyl]ether, 2,2-bis[4-(3-aminophenoxy)phenyl]propane and 2,2-bis[3-(3-aminophenoxy)phenyl]-1,1,1,3,3,3-hexafluoropropane are used as particularly preferable species.

Concrete examples of the tetracarboxylic dianhydride for preparing the polyimide resin used in the present invention include, for example, pyromellitic dianhydride, 3,3',4,4'-benzophenone tetracarboxylic dianhydride, 2,3',3,4'-benzophenone tetracarboxylic dianhydride, 3,3',4,4'-biphenyl tetracarboxylic dianhydride, 2,3',3,4'-biphenyl tetracarboxylic dianhydride, 2,2-bis(3,4-dicarboxyphenyl)propane dianhydride, bis(3,4-dicarboxyphenyl)ether dianhydride, bis(3,4-dicarboxyphenyl)sulfone dianhydride, bis(3,4-dicarboxyphenyl)sulfone dianhydride, 1,1-bis(3,4-dicarboxyphenyl) ethane dianhydride, bis(2,3-dicarboxyphenyl)methane dianhydride, bis(3,4-dicarboxyphenyl)methane dianhydride, 2,2-bis(3,4-dicarboxyphenyl)-1,1,1,3,3,3-hexafluoropropane dianhydride, 2,3,6,7-naphthalenetetracarboxylic dianhydride, 1,4,5,8-naphthalenetetracarboxylic dianhydride, 1,2,5,6-naphthalenetetracarboxylic dianhydride, 1,2,3,4-benzenetetracarboxylic dianhydride, 3,4,9,10-perylenetetracarboxylic dianhydride, 2,3,6,7-anthracenetetracarboxylic dianhydride, 1,2,7,8-phenanthrenetetracarboxylic dianhydride, 2,2-bis{4-(3,4-dicarboxyphenoxy)phenyl}propane dianhydride, 1,3-bis(3,4-dicarboxyphenoxy)benzene dianhydride, 1,4-bis(3,4-dicarboxyphenoxy)benzene dianhydride and so on. However, it is not limited to the tetracarboxylic dianhydrides cited.

Among these, pyromellitic dianhydride and one or more species of tetracarboxylic dianhydride selected from the followings can be preferably used in combination. As the preferable tetracarboxylic dianhydride can be combined, 3,3',4,4'-benzophenone tetracarboxylic dianhydride, 3,3',4,4'-biphenyl tetracarboxylic dianhydride, 2,2-bis(3,4-dicarboxyphenyl)propane dianhydride, bis(3,4-dicarboxyphenyl)ether dianhydride, bis(3,4-dicarboxyphenyl)sulfone dianhydride, 1,1-bis(3,4-dicarboxyphenyl)ethane dianhydride, bis(3,4-dicarboxyphenyl)methane dianhydride and 2,2-bis(3,4-dicarboxyphenyl)-1,1,1,3,3,3-hexafluoropropane dianhydride can be preferably used. The combination of the diamine and the tetracarboxylic dianhydride above can be the same combination or different combinations.

Among combinations of the diamine and the tetracarboxylic dianhydride, such a combination that a ratio of aromatic rings having bonds in meta position to total aromatic rings in a repeating unit is from 20 to 70 mol % is preferably employed. The ratio of aromatic rings having bonds in meta position to total aromatic rings in a repeating unit can be calculated in the following manner. In the chemical formula (25), for example, the repeating unit has totally 4 aromatic rings and two of them in the diamine part are bonded in meta position, so the ratio of aromatic rings having bonds in meta position is calculated to be 50%. Bonding positions of aromatic rings can be confirmed using nuclear magnetic resonance spectra or infrared absorption spectra.

The heat resistant resin of the present invention is preferably an aromatic polyimide resin characterized by comprising a repeating unit represented by the chemical formula (11) or (12) in the main chain skeleton.

(formula 11)

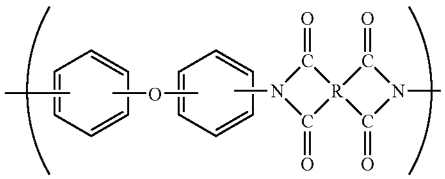

(formula 12)

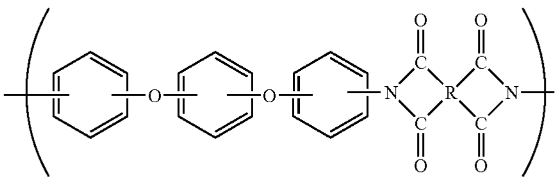

In the formula (11) and (12) above, a tetravalent bonding group selected from the formulae (5) to (10), which can be the same or different, is preferably used as R.

A resin comprising an aromatic polyimide resin having a repeating unit represented by the chemical formula (13) in the main chain skeleton is preferable as the heat resistant resin used in the present invention.

In the formula (13) above, X is a divalent bonding group selected from direct bond, ether bond, isopropylidene bond or carbonyl bond and can be the same or different. Also in the formula (13), a and bare numbers that satisfy the relationships, a+b=1, 0<a<1 and 0<b<1.

No limitation is imposed on the process for producing the heat resistant resin used in the present invention and any publicly known method can be used. No limitation is imposed on the repeating structure of the constituent units of the heat resistant resin used in the resin composition of the present invention and any of the alternating structure, random structure and block structure is applicable. Graft structure is also applicable.

The polymerization reaction is preferably carried out in an organic solvent. As the organic solvent used for the reaction like this, N,N-dimethylformamide, N,N-dimethylacetamide, N,N-diethylformamide, N,N-diethylacetamide, N,N-dimethoxyacetamide, N-methyl-2-pyrrolidone, 1,3-dimethyl-2-imidazolidinone, N-methylcaprolactam, 1,2-dimethoxyethane, bis(2-methoxyethyl)ether, 1,2-bis(2-methoxyethoxy)ethane, bis[2-(2-methoxyethoxy)ethyl] ether, tetrahydrofuran, 1,3-dioxane, 1,4-dioxane, pyrroline, picoline, dimethylsulfoxide, dimethylsulfone, tetramethylurea, hexamethylphosphoramide, phenol, o-cresol, m-cresol, p-chlorophenol, anisole, benzene, toluene, xylene and so on can be cited. These organic solvents can be employed solely or as a mixture of two or more species.

In the step of application the polyimide in the present invention on an amorphous metal ribbon, although the polyimide itself can be appropriately applied, it can be for example, applied as a resin solution. Also a precursor of the polyimide can be applied in the step of application. When using a soluble polyimide resin, the resin can be dissolved in a solvent to form a liquid. The viscosity can be adjusted to an appropriate value. The solution can be applied on an amorphous metal ribbon and then be heated to vaporize the solvent to form the resin.

In the polyamide used in the present invention, the molecular weight can be adjusted for example, by shifting the molar ratio between the diamine and the aromatic tetracarboxylic dianhydride used from the theoretically equivalent value, as far as it does not adversely affect the properties of the polyimide itself, when preparing a polyamic acid prior to the imidization. Although no particular limitation is imposed on the molecular weight and the molecular weight distribution of the heat resistant resin used in the present invention, for example, the value of the logarithmic viscosity measured after dissolving the resin in a solvent that can dissolve the resin at a concentration of 0.5 g/100 ml at 35° C. is preferably not less than 0.2 dl/g and not more than 2.0 dl/g.

In the polyamide used in the present invention, the molecular weight can be adjusted by shifting the molar ratio between the diamine and the aromatic tetracarboxylic dianhydride used from the theoretically equivalent value, as far as it does (formula 13)

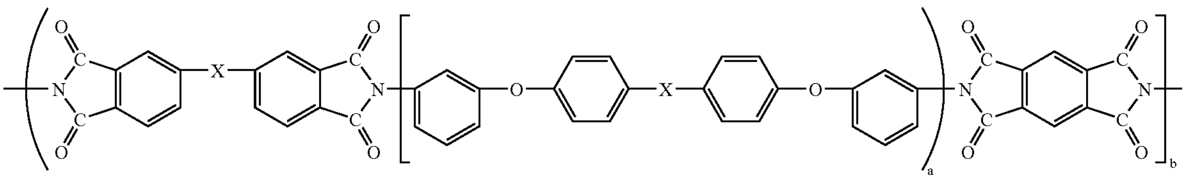

not seriously affect the properties of the polyimide itself, when preparing a polyamic acid prior to the imidization. In this case, the surplus amino group or acid anhydride group can be deactivated by being reacted with an aromatic dicarboxylic anhydride or an aromatic monoamine whose amount is not less than the theoretical equivalent of the surplus amino group or acid anhydride group.

Although no particular limitation is imposed on the amount and the type of the impurity contained in the resin, it is preferable that the total amount be 1 wt % or less and the total amount of the ionic impurities such as sodium or chlorine be 0.5 wt % or less, since the impurity may adversely affect the effect of the invention in some applications.

Furthermore, it is preferable to use an aromatic polysulfone resin (formula) having one type or two or more types of repeating unit(s) selected from the repeating units represented by the chemical formulae (14) to (15) in the main chain skeleton in the heat resistant resin of the present invention.

(formula 14)

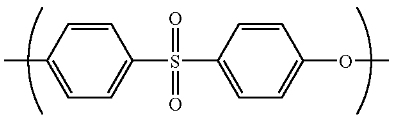

(formula 15)

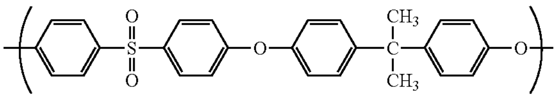

The value of the logarithmic viscosity measured after dissolving the resin in a solvent that can dissolve the resin at a concentration of 0.5 g/100 ml at 35° C. is preferably not less than 0.2 dl/g and not more than 2.0 dl/g. For example, a polyethersulfone manufactured by Mitsui Chemicals, Inc. such as E1010, E2010 and E3010 and those manufactured by Amoco Engineering such as UDEL P-1700 and P-3500 can be used.

(Application of Heat Resistant Resin)

In the present invention, the heat resistant resin is applied on at least a part of a side or at least a part of both sides of the amorphous metal ribbon. In this step, it is preferable that the resin be coated homogeneously and without unevenness on the side to be applied. For example, in case of making a magnetic substrate laminate, in which magnetic substrates are laminated, the structure of the laminate can be designed freely by stacking using a method, such as multi-layer lamination, heat press, heat roll or high frequency welding. When applying the heat resistant resin on at least a part of a side or the both sides of the amorphous metal ribbon, the resin can be in the form of a powder resin, a solution in which the resin is dissolved in a solvent or a paste. When a solution in which the resin is dissolved is used, it is a typical way to apply it on the amorphous metal ribbon using a roll coater or the like. In the case of the application using a solution in which the resin is dissolved in a solvent, the viscosity of the resin solution used in the application step is ordinarily but not limited, in the concentration range of from 0.005 to 200 Pa·s, preferably from 0.01 to 50 Pa·s, more preferably from 0.05 to 5 Pa·s. If the viscosity is 0.005 Pa·s or less, the viscosity is so low that the solution flows out of the amorphous metal ribbon, the amount of the coating on the ribbon may be not enough, and then the coating may become extremely thin. Furthermore, if the application is carried out at an extremely low speed in order to make the coating thick enough in this case, it is necessary to carry out several times of recoating, which makes the production efficiency low, namely not so practical. On the other hand, if the viscosity is 200 Pa·s or more, it is not easy to control the film thickness in order to form a thin coated film on an amorphous metal film because of the high viscosity.

As examples of the method for applying liquid resin in the present invention, methods using a coater such as roll coater method, gravure coater method, air doctor coater method, blade coater method, knife coater method, bar coating method, rod coater method, kiss coater method, bead coater method, cast coater method and rotary screen method; dip coating method, in which coating is carried out while an amorphous metal ribbon is dipped in liquid resin; and slot orifice coater method, in which liquid resin is dropped from an orifice on an amorphous metal ribbon; and so on can be used. Furthermore, any method that is capable of applying a heat resistant resin on an amorphous metal ribbon such as spray coating method in which liquid resin is sprayed on an amorphous metal ribbon using the principle of the spray, spin coating method, electrodeposition coating method, physical deposition method such as sputtering method and gas phase method such as CVD method can be used.

Furthermore, application of the heat resistant resin on a part can be carried out for example, by gravure coater method using a gravure head whose slot of the coating pattern has been processed.

A resin in a form of paste is preferably used as the resin to be applied on at least a part of a side or on at least a part of both sides of the amorphous metal ribbon of the present invention, mainly in such cases that amorphous metal ribbons that have been cut are laminated. For this purpose, the resin preferably has such a viscosity that makes temporal fixing or temporal adhesion possible rather than the flowability possessed by a solution in which a resin is dissolved in a solvent. The paste can be applied according to methods such as potting and brushing. In this case, the viscosity of the resin is preferably 5 Pa·s or more. On the other hand, as an example of the case in which resin powder is used, such a process that a laminate of amorphous metal ribbons is prepared using a mold, wherein resin powder or pellet is filled in or dispersed and then a laminate of amorphous metal ribbons are prepared by means of heat press, can be cited.

In the present invention, a magnetic substrate means an article wherein a resin is applied on an amorphous metal ribbon. The amorphous metal ribbon can be one that has been subjected to a heat treatment for the purpose of improving properties as a magnetic material or one that has not been subjected to the heat treatment. The magnetic substrate of the present invention can be subjected to a heat treatment for the purpose of eliciting properties as a magnetic material even after the application of the heat resistant resin. When a precursor of the heat resistant resin is applied on the amorphous metal ribbon, a heat treatment must be carried out to form the heat resistant resin. Although this heat treatment is usually carried out at a temperature lower than that of the heat treatment to improve magnetic properties, both treatments can be carried out simultaneously. That is, in one aspect of the magnetic substrate of the present invention, it can be produced according to any method of the following methods.

(a) a method, in which a heat resistant resin is applied on an amorphous metal ribbon that has not been subjected to a heat treatment for the purpose of improving magnetic properties;

(b) a method, in which a precursor of a heat resistant resin is applied on an amorphous metal ribbon that has not been subjected to a heat treatment for the purpose of improving magnetic properties and then a heat resistant resin is formed chemically or thermally (step A);

(c) a method, in which a heat resistant resin is applied on an amorphous metal ribbon that has been subjected to a heat treatment for the purpose of improving magnetic properties;

(d) a method, in which a precursor of a heat resistant resin is applied on an amorphous metal ribbon that has been subjected to a heat treatment for the purpose of improving magnetic properties and then a heat resistant resin is formed chemically or thermally (step A); and (e) a method, in which a laminate is produced according to one of the methods of (a) to (d) and then the laminate is further subjected to a heat treatment for the purpose of improving magnetic properties, can be cited. Preferably, methods defined in (a) and (b) are employed, and it is preferable to carry out the heat treatment of (e) after the treatment defined in (a) or (b) is carried out.

In the methods of (a) and (b), the amorphous metal ribbon is not subjected to a heat treatment, so the ribbon has not become brittle. Therefore it is possible to wind the ribbon. Furthermore, since the heat resistant resin is applied on the amorphous metal ribbon, the progress of a crack is suppressed even if the ribbon has a pinhole, the winding speed can be high, and thus the industrial mass-productivity is excellent.

In the case of preparing a laminate having a multi-layered structure wherein a heat resistant resin is applied on amorphous metal ribbons, multi-layer coating method is applied or single-layer coated or multi-layer coated substrates are laminated by pressurizing using, for example, a heat press or a heat roll. Although the temperature in the pressurizing step varies depending on the type of the heat resistant resin, it is generally preferable to laminate at a temperature not less than the glass transition temperature (Tg) of the cured resin and close to the temperature at which the resin softens or melts.

(Laminate)

In one aspect of the magnetic substrate of the present invention, it is an article wherein a heat resistant resin is applied on an amorphous metal ribbon. Although it can be used as a single layer article, it can also be used as in a laminate of magnetic substrates by laminating it.

In preparing the laminate of a magnetic substrate, the laminate of a structure that has been freely designed can be prepared by stacking and adhering utilizing multi-layer coating method, heat press method, heat roll method, high frequency welding method and so on.

For the preparation of the laminated magnetic substrate, utilization of the following steps can be considered depending on whether a heat treatment for the purpose of improving magnetic properties has been carried out, type of the heat resistant resin, whether a precursor of the heat resistant resin is used, when the heat resistant resin is formed from the precursor thereof and when the heat treatment for the purpose of improving magnetic properties is carried out. The magnetic substrate of the present invention is prepared by one of the following steps or a combination of two or more of them.

(1) Step A: A precursor of a heat resistant resin is applied on an amorphous metal ribbon and the intended resin is formed by a heat treatment or a chemical method such as a method in which a chemical-reactive substituent is used.

(2) Step B: This is a step of lamination in which the lamination is carried out by pressure bonding using a press or so on. It can be used as obtained, or the ribbons can be fusion-bonded each other by melting the resin applied on the amorphous ribbons to further proceed to the next step. Furthermore, a heat treatment can be carried out in order to improve magnetic properties of the amorphous metal ribbons. In any case, a heat resistant resin exists between the amorphous metal ribbons, and the "laminate" means a status like this.

(3) Step C: Amorphous metal ribbons can be unified with each other more firmly by melting the resin applied on the metal ribbons. The heat treatment is usually carried out at from 50 to 400° C., preferably from 150 to 300° C. Step B and Step C are usually carried out simultaneously by heat-press method or the like.

(4) Step D: This step is a heat treatment for the purpose of improving magnetism, more specifically is a heat treatment which is carried out for the purpose of improving magnetic properties of the amorphous metal ribbons. Although the heat treatment temperature of the amorphous metal ribbon varies depending on the composition constituting the amorphous metal ribbon and the intended magnetic properties, the treatment is usually carried out in an inert gas atmosphere or in vacuum, and the temperature that improves the magnetic properties is from about 300 to 500° C., preferably from 350 to 450° C.

By combining the steps till Step D including Step A, in which the heat resistant resin or the precursor is applied, described above, a laminate wherein the magnetic substrate of the present invention is used and laminated can be produced.

As the concrete examples of the combination, the combined methods represented by the followings can be cited. More than one of the steps described above can be carried out simultaneously. The examples are:

(i) a method, in which magnetic substrates that have not been subjected to a heat treatment for the purpose of improving magnetic properties are stacked, and then a laminate is formed by fusion bonding (In the method, Step B and Step C are carried out simultaneously.);

(ii) a method, in which magnetic substrates that have been subjected to a heat treatment for the purpose of improving magnetic properties are stacked and then are fusion bonded to form a laminate (In the method, Step B and Step C are carried out simultaneously.);

(iii) a method, in which a precursor of a heat resistant resin is used, and magnetic substrates that have not been subjected to a heat treatment for the purpose of improving magnetic properties are laminated and then formation of the heat resistant resin and formation of the laminate are carried out simultaneously (In the method, Step B and Step C are carried out simultaneously.);

(iv) a method, in which a precursor of a heat resistant resin is used, and magnetic substrates that have been subjected to a heat treatment for the purpose of improving magnetic properties are stacked and then formation of the heat resistant resin and formation of the laminate are carried out simultaneously (In the method, Step B and Step C are carried out simultaneously.);

(v) a method, in which a heat treatment for the purpose of improving magnetic properties is further carried out after the laminated magnetic substrates are produced according to any of the methods described in (i) to (iv) above (Step D); and (vi) a method, in which magnetic substrates on which a heat resistant resin or a precursor of a heat resistant resin is applied are stacked and then a heat treatment to improve magnetic properties and laminate-adhesion are carried out simultaneously (In the method, Step C and Step D are carried out simultaneously.), can be cited. Among these, a method, in which (iii) is carried out after (i) being carried out, or a method, in which (vi) is carried out after both of (i) and (iii) are carried out, is preferably employed.

In making a laminate, the needed number of single-layer substrates can be laminated to form the laminate, or laminates can be laminated to form the laminate. In the case that a precursor of a heat resistant resin is used, formation of the laminate can be carried out simultaneously with the formation of the heat resistant resin.

A laminate having an appropriate number, which varies depending on the intended application, of layers is used. Each layer of the laminate can be the same type of magnetic substrate, and can be the different type of magnetic substrate.

(Method for Pressurized Heat Treatment)

It is a characteristic of the present invention that a resin is applied in some way on a side or on both sides of an amorphous metal ribbon that is represented by a general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 1.0$, $10 < a \leqq 35$ and $0 \leqq b \leqq 30$, and a and b are represented in terms of atomic %, and then the ribbon is pressurized and heated treated to improve the magnetic properties.

The pressurized heat treatment is usually carried out under an applied pressure of from 0.01 to 500 MPa and at a temperature of from 200 to 500° C. The treatment can be carried out at a single time or can be carried out in two or more steps. When it is carried out in two or more steps, the conditions of the steps can be different.

(Process for Producing a Magnetic Substrate Whose Main Component is Co)

As a process for producing a magnetic substrate whose main component is Co, a process, in which magnetic substrates obtained by applying a resin on a side or on both sides of an amorphous metal ribbon having an element composition represented by the formula $(Co_{(1-c)}Fe_c)_{100-a-b}X_aY_b$ (In the formula X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 0.3$, $10 < a \leqq 35$ and $0 \leqq b \leqq 30$.) are stacked, and then adhesion of the amorphous metal ribbon with the resin and a heat treatment for the purpose of improving magnetic properties are usually carried out simultaneously under the condition of an applied pressure of from 0.01 to 100 MPa, a temperature of from 350 to 480° C. and time period of from 1 to 300 min, is preferably employed.

The laminate-adhesion of the magnetic laminate and the heat treatment for the purpose of improving the magnetic properties are explained below. When the laminate is used in a form of a closed magnetic path or a semiclosed magnetic path, such as a small gap, the condition of an applied pressure is preferably from 0.01 to 100 MPa, more preferably from 0.03 to 20 MPa, further preferably from 0.1 to 3 MPa. A pressure of 0.01 MPa or less is not preferable, as insufficient adhesion, which may cause for example, easy-deterioration of the tensile strength of the laminate may take place. A pressure exceeding 100 MPa is not also preferable, as insufficient magnetic properties including decrease in the relative magnetic permeability and increase in the core loss may take place. The temperature condition for carrying out the laminate-adhesion and the heat treatment for the purpose of improving the magnetic properties simultaneously is preferably from 350 to 480° C., more preferably from 380 to 450° C., further preferably from 400 to 440° C. If it is less than 350° C. or more than 480° C., problems, such as insufficient magnetic properties, may take place owing to the fact that an appropriate heat treatment to improve magnetic properties can not be carried out. The time condition for carrying out the laminate-adhesion and the heat treatment for the purpose of improving the magnetic properties simultaneously is preferably from 1 to 300 min, more preferably from 5 to 200 min, further preferably from 10 to 120 min. If the time is less than 1 min or more than 300 min, it is not preferable as insufficient magnetic properties owing to the fact that an appropriate heat treatment to improve magnetic properties can not be carried out or deterioration of the tensile strength of the laminate owing to insufficient adhesion may take place.

If it is used in the form of open magnetic path on the other hand, the pressure condition to be applied is not less than 1 MPa and not more than 500 MPa, preferably not less than 3 MPa and not more than 100 MPa, more preferably not less than 5 MPa and not more than 50 MPa. If an applied pressure is too low, Q value decreases or the effect of increasing Q value is not enough, and if it is greater than 500 MPa, Q value may deteriorate. Particularly, if the effective magnetic permeability as a result of a shape effect is not more than ½, preferably not more than 1/10, more preferably not more than 1/100, that of the magnetic permeability of the material in case of closed magnetic path, Q value is improved in such a condition that an applied pressure is too high.

Furthermore, the temperature condition that improves the magnetic properties of the amorphous metal ribbon is usually from 300° C. to 500° C. Although the condition varies depending on the composition that constitutes the amorphous metal ribbon and the intended magnetic properties, it is usually carried out in an inert gas atmosphere or in vacuo. And the temperature that improves the magnetic properties to excellent values is usually from about 300° C. to 500° C., preferably is from 350° C. to 450° C.

The treatment time at the heat treatment temperature is usually from 10 min to 5 hr, preferably from 30 min to 2 hr.

No particular limitation is imposed on the process in which laminate-adhesion of the magnetic substrates and the heat treatment for the purpose of improving the magnetic properties are carried out simultaneously. For example, a method in a heat press, a method in which lamination and fixation is carried out using a device and then a heat treatment is carried out and so on are cited as preferable methods. Furthermore, when the laminate-adhesion of the magnetic substrates and the heat treatment for the purpose of improving the magnetic properties are carried out simultaneously, the process is preferably carried out in an inert gas, such as nitrogen, atmosphere.

(Process in Which Heat Treatments are Carried Out Twice)

A method in which the magnetic substrates described above, on which a resin is applied on a side or on both sides, are stacked, and laminate-adhesion is usually carried out under the condition of an applied pressure of from 0.01 to 500 MPa at a temperature of from 200 to 350° C. for a time period of from 1 to 300 min, and then a heat treatment for the purpose of improving the magnetic properties are usually carried out under the condition of an applied pressure of from 0 to 100 MPa at a temperature of from 300 to 500° C. for a time period of from 1 to 300 min is preferably used.

The applied pressure condition of laminate-adhering the magnetic substrates is preferably from 0.01 to 500 MPa, more preferably from 0.03 to 200 MPa, further preferably from 0.01 to 100 MPa. If the pressure is less than 0.01 MPa, it is not preferable as the deterioration of the tensile strength of the laminate owing to an insufficient adhesion may take place. If the pressure is more than 500 MPa, it is not also preferable as insufficient magnetic properties including decrease in the relative magnetic permeability and increase in the core loss may take place. The temperature condition of laminate-adhering the magnetic substrates is preferably from 200 to 350° C., more preferably from 250 to 300° C. If it is less than 200° C., problems, such as the deterioration of the tensile strength of the laminate owing to an insufficient adhesion, may take place. If the temperature is more than 350° C. and the applied pressure is too high, it is not preferable as insufficient magnetic properties including decrease in the relative magnetic permeability and increase in the core loss may take place. The time condition of laminate-adhering the magnetic substrates is preferably from 1 to 300 min, more preferably from 5 to 200 min, further preferably from 10 to 120 min. If it is less than 1 min or more than 300 min, problems, such as the deterioration of the tensile strength of the laminate owing to an insufficient adhesion, may take place.

In the second heat treatment for the purpose of improving the magnetic properties of the magnetic substrate or the laminate of magnetic substrates, if the laminate is to be used in a form of a closed magnetic path or a semiclosed magnetic path, such as a small gap, the condition of an applied pressure is preferably from 0 to 100 MPa, more preferably from 0.01 to 20 MPa, further preferably from 0.1 to 3 MPa. Exceeding 100 MPa, it is not preferable as insufficient magnetic properties including decrease in the relative magnetic permeability and increase in the core loss may take place. The temperature condition for carrying out the heat treatment on the laminate-adhered laminate for the purpose of improving magnetic properties is preferably from 350 to 480° C., more preferably from 380 to 450° C., further preferably from 400 to 440° C. If the temperature is less than 350° C. or more than 480° C., it is not preferable as insufficient magnetic properties may take place owing to the fact that an appropriate heat treatment to improve magnetic properties can not be carried out or so on. The time condition for carrying out the heat treatment on the laminate-adhered laminate for the purpose of improving the magnetic properties is preferably from 1 to 300 min, more preferably from 5 to 200 min, further preferably from 10 to 120 min. Being less than 1 min or more than 300 min, it is not preferable as insufficient magnetic properties owing to the fact that an appropriate heat treatment to improve magnetic properties can not be carried out or so on may take place.

In the second heat treatment, if the laminate is to be used in the form of an open magnetic path on the other hand, the pressure condition to be applied is usually not less than 1 MPa and not more than 500 MPa, preferably not less than 3 MPa and not more than 100 MPa, more preferably not less than 5 MPa and not more than 50 MPa. If the applied pressure is too low, it is not preferable, as it may occur that Q value decreases or the effect of increasing Q value is not enough. If the applied pressure is greater than 500 MPa, it is also not preferable, as it may occur that Q value deteriorates. Particularly, If the effective magnetic permeability as a result of the shape effect is usually not more than 1/2, preferably not more than 1/10, more preferably not more than 1/100, of the magnetic permeability of the material in case of a closed magnetic path, Q value is improved in such a condition that an applied pressure is too high.

Furthermore, the temperature condition that improves the magnetic properties of the amorphous metal ribbon is usually from 300° C. to 500° C. Although the condition varies depending on the composition that constitutes the amorphous metal ribbon and the intended magnetic properties, it is usually carried out in an inert gas atmosphere or in vacuo. And the temperature to improve the magnetic properties to excellent values is usually from about 300° C. to 500° C., preferably is from 350° C. to 450° C.

The treatment time at the heat treatment temperature is usually from 10 min to 5 hr, preferably from 30 min to 2 hr.

The process is not limited to those for producing a magnetic substrate, in which a resin is applied on a side or on both sides of an amorphous metal ribbon. For example, a process, wherein a solution in which a resin or a precursor of the resin is dissolved is thinly applied on an amorphous metal ribbon, and then the solvent is dried off, can be preferably used.

In the magnetic substrate of amorphous metal ribbons whose main component is Co of the present invention, a thermoplastic heat resistant resin is preferably used as the resin to be used as a medium for laminate-adhesion. Although no limitation is imposed on the resin as far as the effect of the invention is displayed, a thermoplastic resin having the properties of the tensile strength measured at 30° C. after a thermal history of two hr in a nitrogen atmosphere at 365° C. of 30 MPa or more and the weight loss rate owing to a thermal decomposition in a thermal history of 2 hr in a nitrogen atmosphere at 365° C. of 2% by weight or less can be preferably used. Particularly, polyimide resins, polyetherimide resins, poly amide-imide resins, polyamide resins, polysulfone resins and polyetherketone resins are preferably used. More particularly, a resin having a repeat unit represented by one of the chemical formulae (14) to (23) can be preferably used. In the formulae (16) and (21), variables represented by a, b, c and d, each satisfies $0 \leqq a \leqq 1$, $0 \leqq b \leqq 1$, $a+b=1$, $0 \leqq c \leqq 1$, $0 \leqq d \leqq 1$, $a+b=1$. And X, Y and Z represented in the formulae (16) and (17) are individually same as the definition of X represented in the formulae (1) to (4).

(Formula 16)

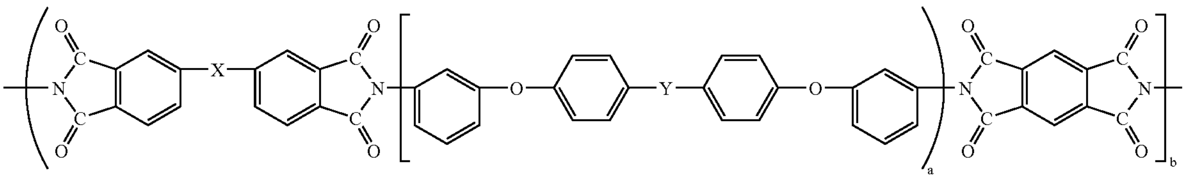

(Formula 17)

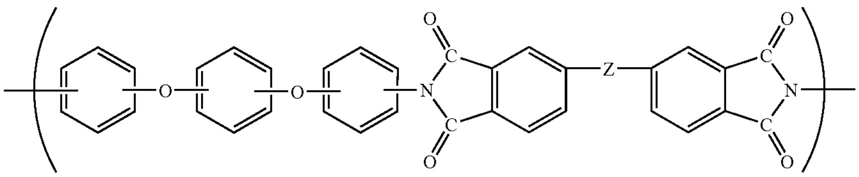

-continued (Formula 18)

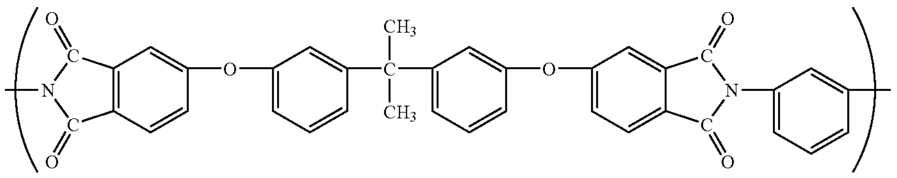

(Formula 19)

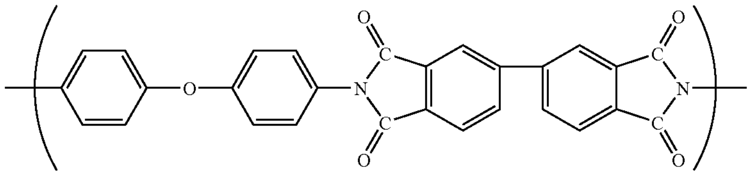

(Formula 20)

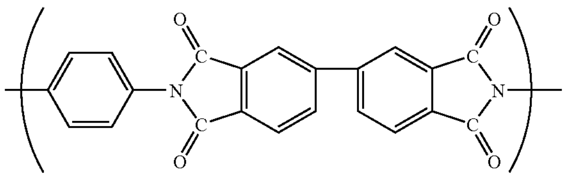

(Formula 21)

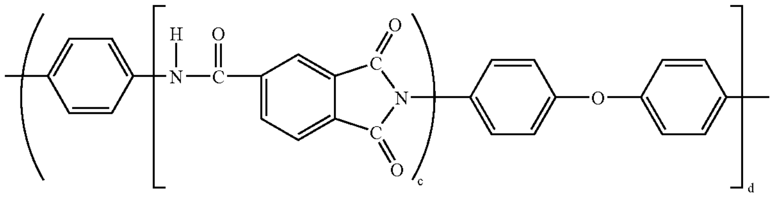

(Formula 22)

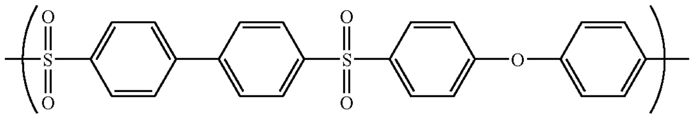

(Formula 23)

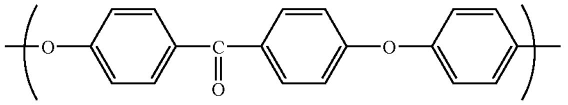

(Process for Producing a Magnetic Substrate Whose Main Component is Fe)

Although the conditions vary depending on the composition constitutes the amorphous metal ribbon and the intended magnetic properties, the process is usually carried out in an inert gas atmosphere or in vacuum, and the temperature at which magnetic properties are excellently improved is usually about from 300 to 500° C., preferably from 350 to 450° C. More preferably, from 360° C. to 380° C. is preferable. In one aspect of the present invention, the laminate can be subjected to a pressurized heat treatment, in a temperature range of from 300° C. to 500° C., and the applied pressure in this step is not more than 0.2 MPa and not less than 5 MPa. More preferably, it is subjected to a pressurized heat treatment at not more than 0.3 MPa and not less than 3 MPa. In another aspect of the present invention, by carrying out a pressurized heat treatment under an applied pressure of from 0.2 MPa to 5 MPa in a temperature range of from 300° C. to 500° C., surprisingly, the magnetic properties (magnetic permeability, iron loss) of the laminate are significantly improved, and a laminate whose mechanical properties (tensile strength) are significantly improved in comparison with those laminated and unified at 300° C. or less can be obtained.

Particularly, in applications in rotating machines such as electric motors and electric generators, improvement in performances such as increase in rotation frequency is possible owing to the improvement in mechanical strength. Therefore, significant improvement in the properties of electric motor (output power) in practice is expected.

Although the inventors do not intend to stick to a particular theory, the following can be considered to be one of the reasons of the improvement in the magnetic properties described above. At first, an amorphous metal is usually prepared by rapidly cooling a molten metal, and the residual stress in the metal originated in the cooling process impairs the magnetic properties. So, a heat treatment at from 300° C. to 500° C. is usually carried out, which is a measure to relax the internal stress, to improve the magnetic properties. In cases wherein lamination and unification are carried out by applying an external pressure and a heat treatment is usually carried out in a temperature range of from 300° C. to 500° C. as in the present invention, if the external applied pressure is too high, the internal stress in the metal owing to the pressure remains to impair the magnetic properties when the temperature of the laminate is reset to room temperature after the heat treatment. In one aspect of the present invention therefore, an applied pressure in the heat treatment process that does not impair properties of the amorphous metal has been intensively investigated, and as a result, we consider that the magnetic properties can be significantly improved with out reducing the lamination factor by carrying out a heat treatment under the applied pressure condition of not less than 0.2 MPa and not more than 5 MPa, preferably not less than 0.3 MPa and not more than 3 MPa, more preferably not less than 0.3 MPa and not more than 1.5 MPa.

Furthermore, fluctuation in the magnetic properties in the laminate after the heat treatment can be significantly improved by inserting a heat resistant elastic sheet having a thickness greater than the thickness tolerance of the laminate in the step of press pressurizing between the magnetic laminate and a planar mold used in the step of laminate-unification. In the heat resistant elastic sheet, if the sheet is made of a resin, the resin preferably has a glass transition temperature that is not less than the heat treatment temperature of the amorphous metal and higher than the glass transition temperature of the resin applied on the amorphous metal ribbon used in the magnetic substrate. As examples of the material for the heat resistant elastic sheet, polyimide resins, silicon-containing resins, ketone resins, polyamide resins, liquid crystal polymers, nitrile resins, thioether resins, polyester resins, arylate resins, sulfone resins, imide resins and amide-imide resins can be cited. Among these, polyimide resins, sulfone resins and amide-imide resins are preferably used. However, the material for the heat resistant elastic resin is not limited to those described above, and it is possible to use an elastic material, such as metal, ceramic and glass.

(Applied Magnetic Products)

The magnetic substrate or the laminate of magnetic substrates of the present invention can be used as a member of a part of various types of applied magnetic products.

As an example of an antenna made of the magnetic substrate of the present invention or used thereof as a core wound by coated conducting wire, can be cited; a thin antenna characterized by having an insulation on at least a part of the core where the wire is wound; a thin antenna characterized by having an insulation on at least a part of the core where the wire is wound and further having a bobbin at the end of the laminate; an antenna for RFID to be built in planar RFID tags comprising a wound coil and the ferromagnetic plate core made of the magnetic substrate of the present invention or the laminate thereof, which penetrates a wound coil; an antenna for RFID wherein the plate core is shape-preserving in the process of bending and so on.

An electric motor or an electric generator, wherein the magnetic substrate or the laminate of magnetic substrates of one aspect of the present invention is used in a part of or the whole the rotor or the stator comprising a soft magnetic material can be cited. As the rotor or the stator noted above, a rotor or a stator, wherein at least a part of the magnetic material(s) of the rotor or the stator is constituted of a laminate comprising an amorphous metal magnetic ribbon, and the laminate comprising the amorphous metal magnetic ribbon is formed by stacking layers of a heat resistant adhesive resin and layers of an amorphous metal magnetic ribbon alternately, can be used.

(Antenna)

Figure 2:
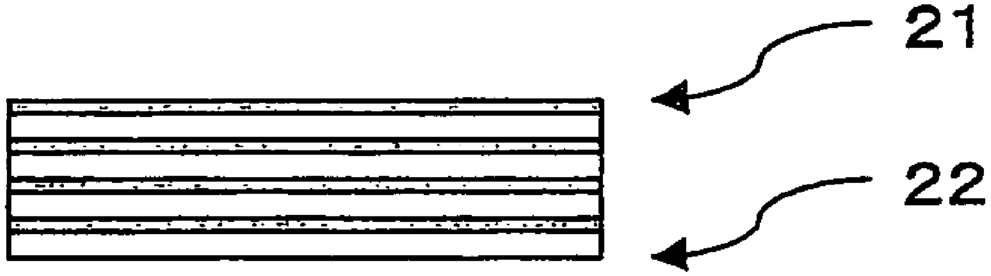
FIG. 2 is an example briefly showing a laminate of magnetic substrates formed by alternately laminating amorphous metal ribbons and heat resistant resin.
Figure 3:
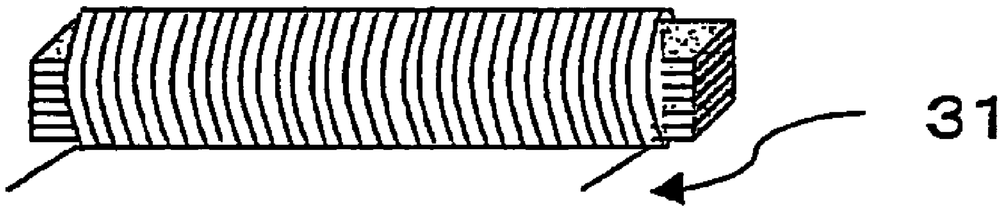
FIG. 3 is an example briefly showing an antenna, wherein a conductive wire is wound on the circumference of a laminate.

An example of the laminate for antenna of the present invention, wherein amorphous metal ribbons and heat resistant resin are laminated alternately, is shown in FIG. 1. As shown in FIG. 2, amorphous metal ribbons (21 in FIG. 2) and heat resistant resin (22 in FIG. 2) are laminated alternately in the laminate. An antenna is prepared by winding a coil of conducting wire (31 in FIG. 3) on the circumference of the laminate as shown in FIG. 3. In evaluating the antenna performance, L value, which is the inductance as an antenna coil, and Q value (Quality Factor) is used as alternative characteristics that represent conversion characteristics between electric waves and voltages. High L values and high Q values are generally preferable. Particularly for using in a thin type bar antenna, an antenna core having a high Q value is desired, since the L value is at a compromised level by the influence of the demagnetizing field caused by the shape effect. As such applications, it is used for transmission and reception of information of RFID, which is used in a transponder of security lock systems, ID cards, tags and so on, radio control watches and radio sets. So, the frequency used in these applications is in the range of from 1 kHz and 1 MHz.

As a material having a high Q value, which is an antenna property, an amorphous metal ribbon having a composition represented by the general formula:

$$(Co_{(1-c)}Fe_c)_{100-a-b}X_aY_b$$

is preferable.

(In the formula, X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 0.2$, $10 < a \leqq 35$ and $0 \leqq b \leqq 30$, and a and bare represented in terms of atomic %.) Although, substituting Co in the amorphous metal ribbon described above with Fe tends to increase the saturation magnetization of the amorphous metal, the smaller amount of the substitution with Fe is preferable from the view point of improving Q value. For this purpose, it is preferable that c satisfy the relationship, $0 \leqq c \leqq 0.2$. More preferably, c satisfies the relationship, $0 \leqq c \leqq 0.1$. The element X is an element that tends to be effective in reducing the crystallization speed for the purpose of non-crystallization in the process for producing the amorphous metal ribbon used in the present invention. If the amount of the element X is not higher than 10% by atom, it is not preferable as the non-crystallinity may deteriorate to partly contain crystalline metal. If the amount of the element X is higher than 35% by atom, it is not also preferable as the mechanical strength of the alloy ribbon may deteriorate, although amorphous structure can be obtained, and continuous ribbon may be difficult to be obtained. Therefore the amount of a, in other word, the amount of the element X, is preferably in the range of $10 < a \leqq 35$, and more preferably is in the range of $12 \leqq a \leqq 30$. The element Y tends to be effective in improving the corrosion resistance of the amorphous metal ribbon used in the present invention. The most effective elements among those are, Zr, Nb, Ti, Hf, Ta, W, Cr, Mo, V, Ni, P, Al, Pt, Rh, Ru, Sn, Sb, Cu, Mn an rare earth elements. If the added amount of the element Y is 30% or more, it is not preferable as it may occur that the ribbon becomes mechanically brittle, although it is effective in improving corrosion resistance. Therefore, it is preferable that $0 \leqq b \leqq 30$. More preferable range is $0 \leqq b \leqq 20$.

The magnetic substrates are laminated in an appropriate number of layers and used as a laminate. Each layer of the laminate can be the same type of magnetic substrate, or can be the different type of magnetic substrate.

The laminate is for example, press-punched out to form the shape of an antenna core in advance, and then used as a core. The one laminated after being processed by cutting or so on can be used, and the one processed to form the shape of a core by means of electric-discharge wire cutting, laser cutting processing, press punching, cutting using a rotary blade and so on after the laminate having an opportune shape is formed.

(Electric Motor)

In one aspect of the laminate of magnetic substrates of the present invention, it can be made to have an iron loss, W10/1000, defined in JIS C2550 of 15 W/kg or less, preferably 10 W/kg or less, a maximum magnetic flux density, Bs, of not less than 1.0 T and not more than 2.0 T, a tensile strength defined in JIS Z2241 of 500 MPa or more, more preferably 700 MPa or more and a relative magnetic permeability of 1,500 or more, preferably 2,500 or more. Such a material can be used in a rotor or a stator of an electric motor.

As a concrete example, the magnetic laminate of the present invention can be prepared by combining the following steps of from 1 to 5. More practically, the magnetic laminate can be prepared using the combination pattern 1 or the combination pattern 2.

Step 1: Step of preparing a magnetic substrate

Step 2: Step of processing for shape-forming

Step 3: Step of stacking

Step 4: Step of unification of laminate.

Step 5: Pressurized heat treatment using a press

Pattern 1: Step 1-Step 2-Step 3-Step 4-Step 5 (lamination is carried out after punching out the magnetic substrates) and Pattern 1: Step 1-Step 2-Step 3-Step 4-Step 2-Step 5 (punching out is carried out after the unification of the laminate) are practically preferable.

In the pattern 1, a resin is applied on an amorphous metal in the step of preparing a magnetic substrate (Step 1), the substrate is punched out in an intended shape in the step of processing for shape-forming (Step 2), and after Step 3 (step of stacking) and step 4 (step of unification of laminate), heat treatment for the purpose of improving magnetic properties are carried out in the pressurized heat treatment step using a press of Step 5.

Step 2 can be carried out only once after Step 1 as in Pattern 1, or the shape-forming of Step 2 can be carried out after a laminate is formed by carrying out the steps till Step 4 as in Pattern 2.

The steps will be explained below.

Step 1 (Step of Preparing a Magnetic Substrate)

The magnetic substrate of the present invention can be prepared according to the method, wherein a coating of liquid resin is formed on an amorphous metal ribbon from a web-roll of the amorphous metal ribbon using a coating facility such as a roll coater, and it is dried to form a heat resistant resin layer on the amorphous metal ribbon.

Step 2 (Step of Processing for Shape-Forming)

The step of processing for shape-forming of the present invention is defined as a processing, wherein a sheet or two or more sheets of the magnetic substrate(s) or the magnetic laminate is cut in the direction of the width to obtain a rectangular plate or a plate having the intended shape. The method for the processing for shape-forming in the step is selected from shearing off, punching out using a mold, photo-etching, punching out, a laser cutting, an electric-discharge wire cutting and so on. Shearing off is preferable for cutting in the direction of the width, and punching out using a mold is preferable for the cutting to obtain an intended arbitrary shape.

Step 3 (Step of Stacking)

Then, two or more sheets of the magnetic substrates processed to have rectangular or the intended shape is stacked in the direction of the thickness.

Step 4 (Step of Unification of Laminate)

As the method for the unification of the laminate of two or more sheets of the magnetic substrates, a method for unification of laminate, wherein the resin layer is melted using a heat press or a heat roll to adhere the interlayer between the metals, a method for unification of laminate, wherein swaging is carried out using a press, and a method, wherein the edge facet of the laminate is fusion bonded by laser heating to unify the laminate and so on can be used.

From the view point of realizing a material having a low magnetic loss by reducing the eddy-current loss caused by electric conduction between the layers, a method for unification of laminate by pressurizing and heating using a heat press or a heat roll is preferable. Stacked magnetic substrates of intended number are sandwiched with two sheets of metal flat plate. Although the temperature in the step of pressurizing varies depending on the types of the heat resistant resin layer formed on the amorphous metal ribbon, it is generally preferable to pressurize at a temperature around the temperature, which is higher than the glass transition temperature of the cured heat resistant resin and is where the resin is softened or turns to have a molten fluidity, to unify the amorphous metal ribbons to each other to form a laminate. After the resin of the interlayer between the amorphous metals are melted, amorphous metal ribbons are adhered to each other and unified by being cooled to the room temperature.

Step 5 (Pressurized Heat Treatment)

In order to relax the internal stress in the amorphous metal and elicit excellent magnetic properties, a heat treatment at from 300° C. to 500° C., which is necessary to elicit magnetic properties of the amorphous metal, is usually carried out on the laminate of magnetic substrates, which have been subjected to the step of unification of laminate.

An amorphous metal ribbon containing Fe as the main component is preferably used.

The main steps will be explained.

Cutting is carried out to obtain the intended shape using a method for shape-forming such as shearing off, punching out using a mold, photo-etching, punching out, laser cutting or electric-discharge wire cutting and so on.

Particularly, a laminate comprising from 1 to about 10 sheets of the magnetic substrate can be preferably processed by punching out using a mold. A rectangular solid laminate comprising tens or more of sheets of the magnetic substrate can be also preferably processed to form the intended shape using electric-discharge wire cutting method. In the electric-discharge wire cutting, by applying a conductive adhesive on the edge facet of the laminate to electrically connect the metal material in the layers and connecting a part of the applied conductive adhesive to the ground electrode of the electric-discharge wire processor, the electric discharge current is stabilized and the energy in the electric discharge step can be precisely controlled, thereby processed facets of the laminate having less interlayer fusion bond can be preferably obtained.

Then, two or more sheets of the magnetic substrates, which have been subjected to the shape-forming step, are stacked in the direction of the thickness and laminated. In this step, the sides on which the resin is applied are oriented in the same direction so that the resin layers and the metal layers are stacked alternately.

Then, the step of the laminate-unification is carried out. At first, stacked magnetic substrates of intended number are sandwiched with two sheets of flat mold. The block obtained by sandwiching the magnetic substrates can be further laminate-unified by being put into a frame for the purpose of preventing the slippage of the laminate shown in 411 of FIG. 4. The flat mold to be used for the sandwiching is preferably made of a metal having high thermal conductivity and high mechanical strength. For example, SUS304, SUS430, high-speed steel, pure iron, aluminum, copper and so on are preferable. It is preferable that the surface roughness of the flat mold is 1 μm or less and the both upper and lower side of the flat plate be parallel, so that the pressure can be applied on the amorphous metal evenly. More preferably, the surface of the flat metal plate is a mirror surface with the surface roughness of 0.1 μm or less.

Furthermore, as a device to apply the press-pressure evenly, a heat resistant elastic sheet having a thickness greater than the thickness tolerance of the laminate can be inserted between the intended number of magnetic substrates that have been stacked and the flat mold used for the sandwiching. In the step, the heat resistant elastic sheet absorbs the unevenness of the flat mold and the magnetic substrate so that it is possible to apply the pressure on the laminate of magnetic substrates evenly. In the heat resistant elastic sheet, if the sheet is made of a resin, the resin preferably has a glass transition temperature that is not less than the heat treatment temperature of the amorphous metal. As examples of the material for the heat resistant elastic sheet, polyimide resins, silicon-containing resins, ketone resins, polyamide resins, liquid crystal polymers, nitrile resins, thioether resins, polyester resins, arylate resins, sulfone resins, imide resins and amide-imide resins can be cited. Among these, high heat resistant resins, such as polyimide resins, sulfone resins and amide-imide resins, are preferably used. More preferably, aromatic polyimide resins are used.

The laminate-unification can be usually carried out by heating and pressurizing it by means of high frequency fusion bonding. Although the temperature in the pressurizing step varies depending on the type of the heat resistant resin, it is generally preferably to pressurize at a temperature around the temperature, which is higher than the glass transition temperature of the cured heat resistant resin and is where the resin is softened or turns to have a molten fluidity, to adhere to form a laminate. After the resin of the interlayer between the amorphous metals is melted, amorphous metal ribbons are adhered to each other and unified by being cooled.

EXAMPLES

Weight loss rate: Drying at 120° C. is carried out for 4 hr as a pretreatment. Then, the weight loss in being kept in a nitrogen atmosphere at 350° C. for 2 hr is determined using a differential thermal analyzer and thermogravimeter, DTA-TG (Shimadzu DT-40 series, DTG-40M).

Applied pressure: Pressure gauge value of the hydraulic press

Melt viscosity: The melt viscosity is measured with a Koka-type flow tester (Shimadzu CFT-500) using an orifice having a diameter of 0.1 cm and a length of 1 cm. The sample was extruded at a pressure of 10,000 kPa after being kept at a predetermined temperature for 5 min.

Tg: Measurement is carried out using a differential scanning calorimeter, DSC (Shimadzu DSC60), in a nitrogen flow at a heating rate of 10° C. per 10 min to determine the glass transition temperature.

Heat of fusion per unit weight: Measurement is carried out using a differential scanning calorimeter, DSC (Shimadzu DSC60), the heat of fusion owing to the melting of the crystals in the resin is calculated, and then the heat of fusion per unit weight is calculated by dividing it by the initial weight of the resin used in the measurement.

Logarithmic viscosity η: A resin is dissolved in a solvent capable of dissolving the resin (e.g. chloroform, 1-methyl-2-pyrrolidone, dimethylformamide, o-dichlorobenzene, cresol and so on) in a concentration of 0.5 g/100 ml, followed by the measurement at 35° C.

Q value: An LCR meter (4284A, manufactured by Hewlett-Packard) is used. The measurement voltage is set at 1V.

Ring for evaluating magnetic properties: Prepared by punching out magnetic substrates, wherein a resin layer is formed on a side of an amorphous metal ribbon, in a shape having an inside diameter of 25 mm and an outside diameter of 40 mm and stacking five sheets of them and then heat laminating them in a predetermined condition.

Relative magnetic permeability, μ: Measured in the conditions of 100 kHz of frequency, sine waveform and 5 mOe of maximum applied magnetic field using an impedance analyzer (YHP 4192 A).

Core loss, Pc: Measured in the condition of 100 kHz of frequency, sine waveform and 0.1 T of maximum magnetic flux density using a B-H analyzer (IWATSU SY-8216 or SY-8217).

Tensile strength: A method according to JIS K7127 or ASTM D638 is used when evaluating a tensile strength of a resin and a method according to JIS Z2241 (ISO 6892) is used when evaluating tensile strength of a metal. A specimen (defined in JIS Z 2201) is subjected to a heat treatment in a nitrogen atmosphere at 350° C. for 2 hr and cooled. Then, tensile strength is measured at 30° C. by Tensilone (KK Orientech UCT-5T) at 10 mm/min of the cross-head speed. In case of measuring a laminate of magnetic substrates, magnetic substrates, wherein a resin layer is formed on a side of an amorphous metal ribbon, are processed in a shape of the type 3 specimen. 20 Sheets of the specimens are stacked and heat laminated to prepare a laminate. The laminate is subjected to the measurement.

Example A1

As the amorphous metal ribbon, an amorphous metal ribbon METGLAS 2714A (product name) manufactured by Honeywell, which has a width of 50 mm, a thickness of 15 μm and composition of $CO_{66}Fe_4Ni_1(BSi)_{29}$ (% by atom) was used. The polyamic acid solution used contained a polyamic acid obtained by polycondensing 1,3-bis(3-aminophenoxy) benzene and 3,3',4,4'-biphenyl tetracarboxylic dianhydride in a ratio of 1:0.97 in dimethylacetamide solvent at room temperature, used dimethylacetamide as a diluting solution and had a viscosity measured with type E viscometer of about 0.3 Pa·s (25° C.).

The polyamic acid solution was applied on the whole area of a side of the ribbon, dried at 140° C., cured at 260° C., and then a magnetic substrate wherein a heat resistant resin (polyimide resin) having a thickness of about 6 μm was applied on a side of an amorphous metal ribbon was prepared. Meantime, a polyimide resin represented by the chemical formula (24) (Tg: 196° C.) was obtained by the curing.

(Formula 24)

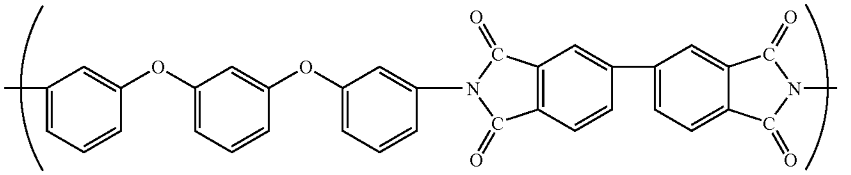

The substrates were stacked, and a laminate having a thickness of 7 mm was prepared using a heat press at 260° C. Then, the laminate was fixed in a fixture, subjected to a heat treatment at 400° C. for 1 hr, and then processed for shape-forming to obtain a laminate of 20×3.5 mm. Coated conducting wire of 0.1 mm Φ (was wound on the core for 200 turns, and Q value was measured at a frequency of 50 kHz.

The results are shown in Table A1.

Examples A2 to A5

Similar coils were prepared from similar laminates, wherein the amorphous metal ribbon used in Example A1 was replaced with amorphous metal ribbons having the following compositions.

$(CO_{55}Fe_{10}Ni_{35})_{78}Si_8B_{14}$ $CO_{70.5}Fe_{4.5}Si_{10}B_{15}$ $CO_{66.8}Fe_{4.5}Ni_{1.5}Nb_{2.2}Si_{10}B_{15}$ $CO_{69}Fe_4Ni_1Mo_2B_{12}Si_{12}$

The Q values were measured. The results are shown in Table 1.

Reference Examples A1 to A5

Similar coils were prepared from similar laminates, wherein the amorphous metal ribbon used in Example A1 was replaced with amorphous metal ribbons having the following compositions.

$(Fe_{30}Co_{70})_{78}\ Si_8B_{14}$ $(Fe_{95}Co_5)_{78}\ Si_8B_{14}$ $(Fe_{50}Co_{50})_{78}\ Si_8B_{14}$ $(Fe_{80}Co_{10}Ni_{10})_{78}\ Si_8B_{14}$ $Fe_{78}Si_9B_{13}$

The Q values were measured. The results are shown in Table A1.

TABLE A1

| Magnetic Core | Composition | Q value (50 kHz) |
|---|---|---|
| Example A1 | $Co_{66}Fe_4Ni_1(BSi)_{29}$ | 24 |
| Example A2 | $(Co_{55}Fe_{10}Ni_{35})_{78}Si_8B_{14}$ | 20 |
| Example A3 | $Co_{70.5}Fe_{4.5}Si_{10}B_{15}$ | 24 |
| Example A4 | $Co_{66.8}Fe_{4.5}Ni_{1.5}Nb_{2.2}Si_{10}B_{15}$ | 22 |
| Example A5 | $Co_{69}Fe_4Ni_1Mo_2B_{12}Si_{12}$ | 22 |
| Reference Example A1 | $(Fe_{30}Co_{70})_{78}Si_8B_{14}$ | 10 |
| Reference Example A2 | $(Fe_{95}Co_5)_{78}Si_8B_{14}$ | 4 |
| Reference Example A3 | $(Fe_{50}Co_{50})_{78}Si_8B_{14}$ | 8 |
| Reference Example A4 | $(Fe_{80}Co_{10}Ni_{10})_{78}Si_8B_{14}$ | 5 |
| Reference Example A5 | $Fe_{78}Si_9B_{13}$ | 7 |

Example A6

A polyethersulfone (PES, Tg: 225° C., Chemical Formula (14)) dissolved in dimethylacetamide was applied on the same amorphous metal ribbon of Example A1 and dried at 230° C. to prepare a magnetic substrate, wherein a heat resistant resin having a thickness of 6 μm is applied on a side of an amorphous metal ribbon. Using the substrates, laminates were prepared in the same manner as in Example A1 and a similar laminate was prepared. The Q value measured at a frequency of 50 kHz was 22.

Example A7

As the amorphous metal ribbon, an amorphous metal ribbon METGLAS 2714A (product name) manufactured by Honeywell, which has a width of 50 mm, a thickness of 15 μm and composition of $CO_{66}Fe_4Ni_1(BSi)_{29}$ (% by atom) was used. The same polyamic acid solution as that used in Example A1 was used as the heat resistant resin, applied on the amorphous metal ribbon, dried at 140° C., and then a precursor of a the polyimide resin having a thickness of 6 μm was applied on a side of the amorphous metal ribbon. The substrates were stacked to a thickness of 0.7 mm, and a laminate was prepared by adhering at 260° C. using a heat press to obtain a laminate. The laminate was subjected to a heat treatment at 400° C. for 1 hr and processed for shape-forming to obtain a magnetic core of 20×3.5 mm. Coated conducting wire of Φ 0.1 mm was wound on the core for 200 turns, and Q value was measured at a frequency of 50 kHz. The resin was applied on ribbons having the compositions in Examples A2 to A4 in the same manner and laminates were prepared. The Q value was 21 and excellent properties were obtained.

Example G1

As the amorphous metal ribbon, an amorphous metal ribbon METGLAS 2605S-2 (product name) manufactured by Honeywell, which has a width of 213 mm, a thickness of 25 μm and composition of $Fe_{78}Si_9B_{13}$ (% by atom) was used. A polyamic acid solution having a viscosity of 0.3 Pa·S was applied on the whole area of the both sides of the amorphous ribbon, the solvent was dried off at 150° C., a polyimide resin was formed at 250° C., and thereby a magnetic substrate, wherein a heat resistant resin having a thickness of 2 μm is applied on the both sides of the ribbon, was prepared. The heat resistant resin used was obtained as a polyimide having a main structural unit represented by the chemical formula (25) by, using a polyamic acid, which is a precursor of a polyimide, obtained from 3,3'-diaminodiphenyl ether, which is a diamine, and bis(3,4-dicarboxyphenyl)ether dianhydride, which is a tetracarboxylic acid dianhydride, applying the polyamic acid after dissolving it in dimethylacetamide as a solvent, and then heating it on the amorphous metal ribbon.

(Formula 25)

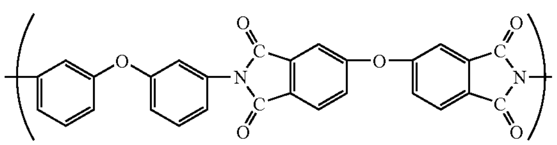

The magnetic substrates were punched out in a shape having an outside diameter of 50 mm and an inside diameter of 25 mm. 30 sheets of rings obtained above were stacked, thermo-compressed at 270° C. to fusion-bond the magnetic substrates and then a laminate was prepared. A heat treatment was further carried out while the laminate was fastened in a pressurizing jig at 400° C. for 2 hr. An alternating current hysteresis loop of the laminate after the heat treatment was observed at 10 kHz and an applied magnetic field of 0.1 T to obtain a coercive force of 0.2 Oe.

Example G2

The polyamic acid solution used in the above was replaced with a 15% solution obtained by using a polyethersulfone E2010 manufactured by Mitsui Chemicals, Inc. and dissolving the resin using a dimethylacetamide solvent. Except for that, the solution is applied on the both sides, the solvent was dried off, a laminate was prepared and a heat treatment was carried out in the same manner as in Example G1. An alternating current hysteresis loop of the laminate after the heat treatment was observed at 10 kHz to obtain a coercive force of 0.25 Oe.

Reference Example G1

A polyamic acid solution that is a precursor of the polyimide having a main structural unit represented by the chemical formula (19) was used instead of the polyamic acid solution used in Example G1. The solution was applied on a amorphous metal ribbon and the preparation was carried out in the same manner as in Example G1. The polyamide having a main structural unit represented by the formula was obtained on the amorphous metal. The preparation was carried out using the substrates in the same manner in Example G1 and a heat treatment was carried out to obtain a laminate, except that the temperature in the step of the laminate adhesion was 330° C. The Tg of the resin was 285° C., which is higher than the temperature range defined in the present invention. The alternating current coercive force of the laminate at 10 kHz was 0.4 Oe, which is a greater value in comparison with that in Example G1, and the loss was greater when actually used as a magnetic core.

TABLE G1

Table G1: Hc Values of Alternating Current B—H Loop of the Laminates (10 kHz, 0.1 T)

| | Applied Resin | Hc of Alternating Current B—H |
|---|---|---|
| Example G1 | Chemical Formula (25) | 0.2 Oe |
| Example G2 | Chemical Formula (14) | 0.25 Oe |
| Reference Example G1 | Chemical Formula (19) | 0.40 Oe |

Examples G3 to G5

As the amorphous metal ribbon, an amorphous metal ribbon METGLAS 2605S-2 (product name) manufactured by Honeywell, which has a width of 213 mm, a thickness of 25 μm and composition of $Fe_{78}Si_9B_{13}$ (% by atom) was used. A polyimide resin having a main structural unit represented by the chemical formula (27) was formed on the whole area of the both sides of the amorphous ribbon in the same manner in Example G1, and a magnetic substrate, wherein a heat resistant resin having a thickness of about 5 μm was applied on a side of the ribbon, was prepared.

24 sheets of the magnetic substrates were stacked and thermocompressed at 270° C. Then, a heat treatment was carried out while the laminate, which had been processed to form a shape of 5×20 mm, was fastened in a pressurizing jig at 400° C. for 2 hr. A heat cycle test of 500 cycles between −35° C. and 120° C. was carried out on the laminate after the heat treatment to find that a unified laminate without a delamination or so on was obtained.

Examples G4 to G15

Laminates were prepared in the same manner as in Example G3, except that polyamic acid solutions, which can be converted to the polyimides having main structural units represented by the chemical formulae (26) to (37) by heating on the amorphous metal ribbon after the application and contain dimethylacetamide solvent, were used instead of the polyamic acid solution of Example G3.

(Formula 26)

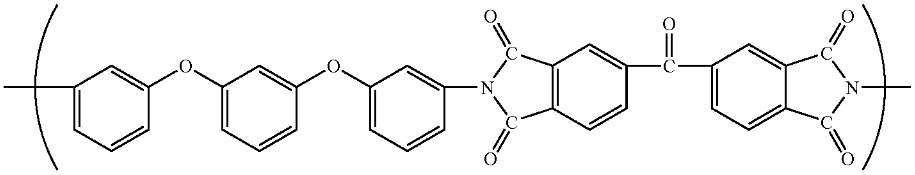

(Formula 27)

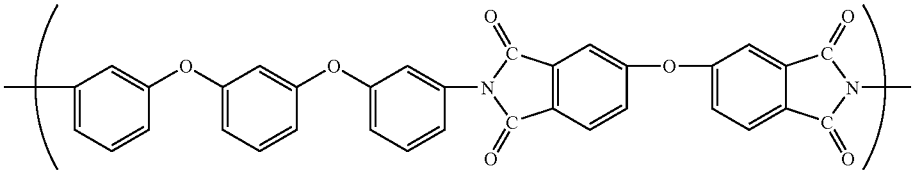

(Formula 28)

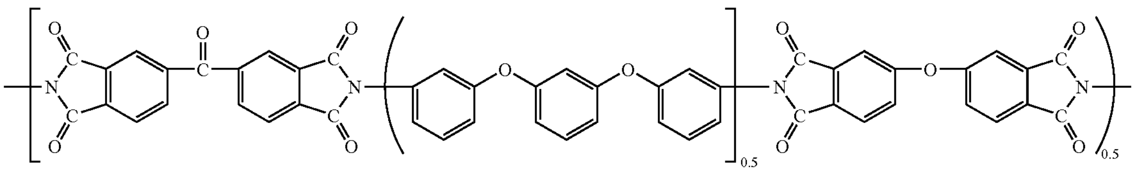

-continued
(Formula 29)
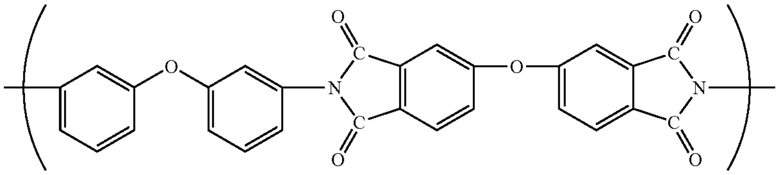
(Formula 30)
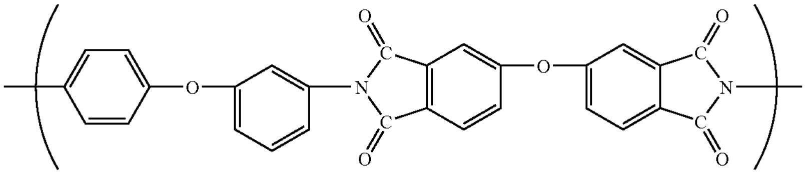
(Formula 31)
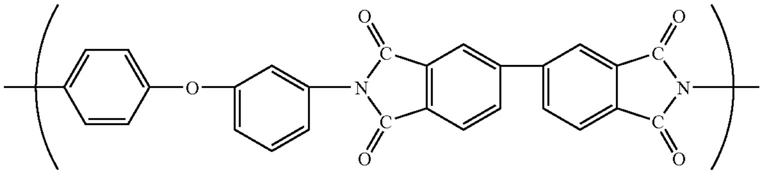
(Formula 32)
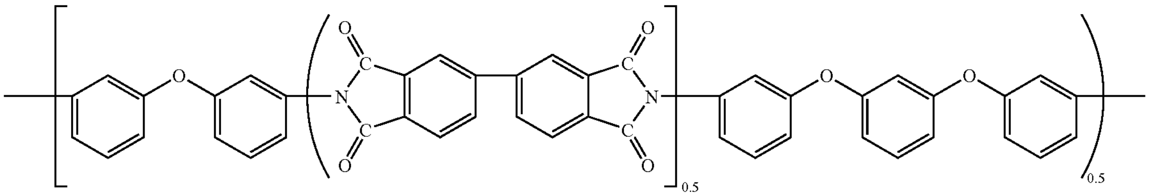
(Formula 33)
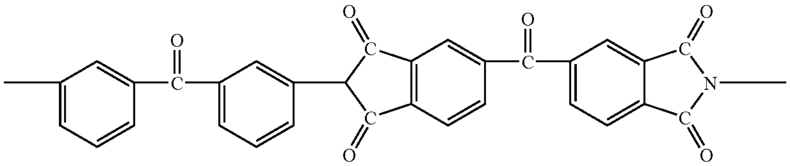
(Formula 34)
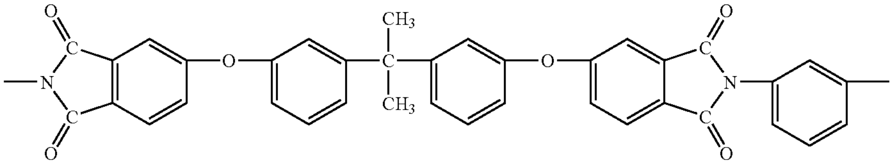
(Formula 35)
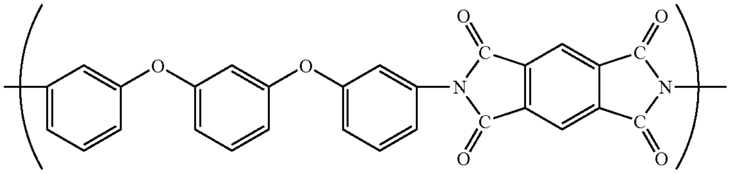
(Formula 36)
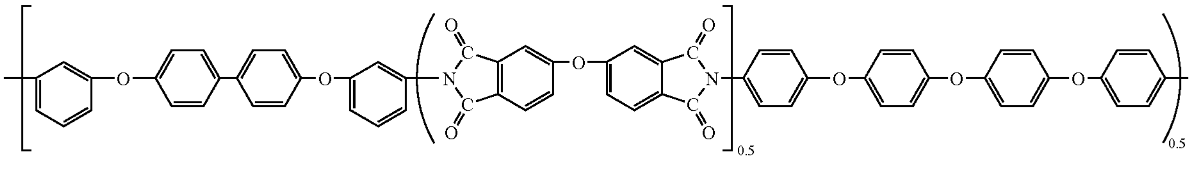

Examples G16, 17

Laminates were prepared in the same manner as in Example G3, except that a polyethersulfone, E2010, manufactured by Mitsui Chemicals, Inc. or a polysulfone, UDELP-3500, manufactured by Amoco Engineering was dissolved in a dimethylacetamide solvent to obtain a 15% solution and used instead of the polyamic acid solution used in Example G3, and heat treatments were carried out.

Example G18

A commercially available poly amide-imide resin (VYLOMAX HR14ET, manufactured by Toyobo Co., Ltd.) was used instead of the polyamic acid used in Example G3. The solution was applied, dried and resinified to prepare a substrate. A laminate was prepared in the same manner as in Example G3 and subjected to a heat treatment.

Heat cycle tests of 20 cycles between −30° C. and 120° C. and those of 500 cumulative cycles were carried out on the laminates of Examples G4 to G18 that had been subjected to the heat treatments. In every case, no delamination occurred and a unified laminate was obtained. Exceptionally, in Examples G12, 13 and 18, a delamination occurred in the test of 500 cycles at n=1, but each of them was micro delamination that does not cause a practical problem.

Reference Examples G2, G3

Laminates are prepared in the same manner as in Example G3, except that a polyamic acid solution, which is a precursor that can be converted to a polyimide having a main unit structure represented by the chemical formula (19) or (37) by being heated on an amorphous metal ribbon after being applied and is using dimethylacetamide as a solvent, is used instead of the polyamic acid solution used in the Example G3 and the temperature in the step of the laminate-adhesion was set at 330° C.

Reference Example G4

A polyphenylene sulfide (PPS, Chemical Formula (38)) is used instead of the polyamic acid solution used in the Example G3. Powder of the resin was applied on the ribbon, sandwiched with a TEFLON (registered trademark) sheet and adhered as a resin on a side of the ribbon by means of heat press. The substrate was subjected to a heat treatment in the same manner as in Example G3 to obtain a laminate, except that the temperature in the heat press step was set at 320° C.

(Formula 38)

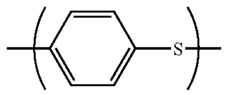

Reference Example G5

A laminate that had been subjected to a heat treatment was prepared in the same manner as in Reference Example 2 using a solution, wherein a polyesterimide resin having a main structural unit represented by the chemical formula (39) is dissolved in dimethylacetamide, instead of the polyamic acid solution used in Example G3.

(Formula 39)

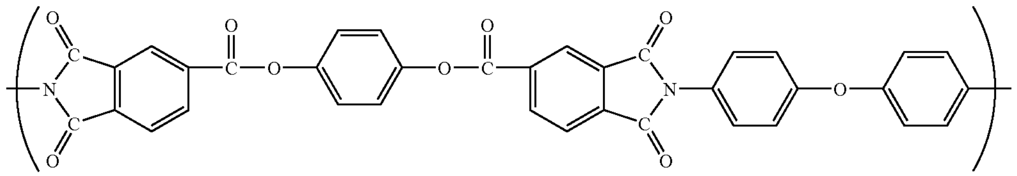

Reference Examples G2 to G5

Heat cycle tests of 20 cycles between −30° C. and 120° C. and those of 500 cumulative cycles were carried out on the laminates. It was revealed as a result of the test that, while no change or problem was observed in the laminates of Examples G3 to 18, the laminates of each Reference Example had a problem that the incidence of delamination, deformation such as increase in the thickness, blister and so on was high at the point of 20 cycles. The results are shown in Table G2. (The results of weight loss, tensile strength, Tg, temperature where the melt viscosity is 10,000 Poise and heat of fusion described in Table G2, are those measured separately of heat resistant resins used in each examples.)

(Formula 37)

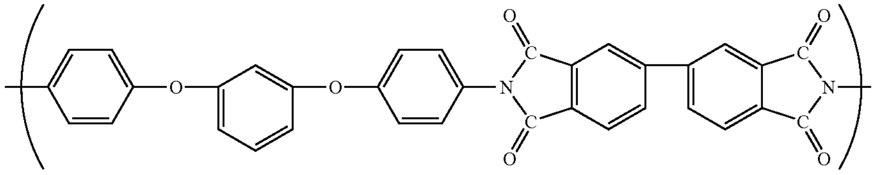

Example G19

As the amorphous metal ribbon, an amorphous metal ribbon METGLAS 2605S-2 (product name) manufactured by Honeywell, which has a width of 213 mm, a thickness of 25 μm and composition of $Fe_{78}Si_9B_{13}$ (% by atom) was used. A polyamic acid solution having a viscosity of 0.3 Pa·S was applied on the whole area of both sides of the amorphous ribbon, the solvent was dried off at 150° C., a polyimide resin was formed at 250° C., and thereby a magnetic substrate, wherein a heat resistant resin (polyimide resin) having a thickness of 2 μm is applied on both sides of the ribbon, was prepared. The heat resistant resin used was obtained as a polyimide having a main structural unit represented by the chemical formula (25) by, using a polyamic acid, which is a precursor of a polyimide, obtained from 3,3'-diaminodiphenyl ether, which is a diamine, and bis(3,4-dicarboxyphenyl) ether dianhydride, which is a tetracarboxylic acid dianhydride, applying the polyamic acid after dissolving it in dimethylacetamide as a solvent, and then heating it on the amorphous metal ribbon.

The magnetic substrates were punched out in a shape having an outside diameter of 40 mm and an inside diameter of 25 mm. 30 sheets of the rings obtained above were stacked and thermocompressed at 270° C. to fusion-bond the magnetic substrates and then a laminate were prepared. A heat treatment was further carried out while the laminate was fastened in a pressurizing jig with applied pressure of 3.0 MPa at 365° C. for 2 hr. An alternating current hysteresis loop of the laminate after the heat treatment was observed at 10 kHz and an applied magnetic field of 0.1 T to obtain the result of a coercive force of 0.1 Oe, which confirms excellent magnetic properties.

5 ring shaped sheets or 20 specimen shaped sheets were stacked in the same direction and laminate-adhesion and a heat treatment for the purpose of improving magnetic properties were carried out simultaneously using a heat press (Toyoseiki, Mini Test Press Type WCH) in such a condition that the applied pressure was 1 MPa, the temperature was 400° C. and the time period was 60 min. In order to carry out in a nitrogen atmosphere, nitrogen was flowed at a rate of 0.5 l/min using Bodyframe manufactured by Tanken Seal Seiko Co., Ltd. As a result of the measurement of magnetic properties, the relative magnetic permeability was 15,740 and the core loss was 10.7 W/kg, which were showing better performance than that of the sole amorphous metal ribbons treated in the same conditions. The tensile strength could not be measured.

Example B2

Measurement was carried out in the same manner as in Example B1 except that the applied pressure and the temperature were set at the conditions of Table B1. The results are shown in Table B1.

TABLE G2

Results of the Heat-Cycle Test, After the Heat Treatment on the Laminates

| | Chemical Formula | η inh | Weight Loss (%) | Tensile Strength (MPa) | Tg (° C.) | Temperature Where the Melt Viscosity is 10,000 Poise | Heat of Fusion (J/g) | m-Ratio | 20 Cycles | 500 Cycles |
|---|---|---|---|---|---|---|---|---|---|---|
| Example G3 | 24 | 0.55 | 0.22 | 100 | 205 | 305 | 0 | 50 | 0/20 | 0/20 |
| Example G4 | 26 | 0.62 | 0.15 | 110 | 186 | 310 | 0 | 60 | 0/20 | 0/20 |
| Example G5 | 27 | 0.54 | 0.15 | 100 | 168 | 300 | 0 | 60 | 0/20 | 0/20 |
| Example G6 | 28 | 0.55 | 0.15 | 110 | 191 | 305 | 0 | 60 | 0/20 | 0/20 |
| Example G7 | 29 | 0.59 | 0.2 | 120 | 233 | 320 | 0 | 50 | 0/20 | 0/20 |
| Example G8 | 30 | 0.61 | 0.1 | 100 | 196 | 305 | 0 | 60 | 0/20 | 0/20 |
| Example G9 | 24 | 0.6 | 0.25 | 110 | 247 | 330 | 0 | 25 | 0/20 | 0/20 |
| Example G10 | 31 | 0.52 | 0.1 | 110 | 219 | 320 | 0 | 25 | 0/20 | 0/20 |
| Example G11 | 32 | 0.56 | 0.15 | 100 | 215 | 310 | 0 | 55.6 | 0/20 | 0/20 |
| Example G12 | 33 | 0.55 | 0.2 | 100 | 221 | 310 | 0 | 75 | 0/20 | 1/20 |
| Example G13 | 34 | 0.61 | 0.15 | 110 | 201 | 330 | 0 | 16.7 | 0/20 | 1/20 |
| Example G14 | 35 | 0.56 | 0.2 | 120 | 239 | 335 | 0 | 50 | 0/20 | 0/20 |
| Example G15 | 36 | 0.55 | 0.26 | 100 | 217 | 370 | 0 | — | 0/20 | 0/20 |
| Example G16 | 24 | 0.58 | 0.1 | 90 | 225 | 350 | 0 | — | 0/20 | 0/20 |
| Example G17 | 15 | 0.63 | 0.3 | 120 | 190 | 320 | 0 | — | 0/20 | 0/20 |
| Example G18 | — | — | 0.3 | 85 | 250 | 340 | 0 | — | 0/20 | 1/20 |
| Reference Example G2 | 19 | 0.63 | 0.2 | 200 | 285 | 420 | 0 | — | 13/20 | 15/20 |
| Reference Example G3 | 37 | 0.55 | 0.2 | 150 | 190 | 390 | 35 | — | 12/20 | 15/20 |
| Reference Example G4 | 38 | — | 4 | 10 | 90 | 370 | 39 | — | 20/20 | 20/20 |
| Reference Example G5 | 39 | 0.56 | 1.5 | 20 | 180 | 250 | 0 | — | 12/20 | 17/20 |

Example B1

Amorphous metal ribbons of the same type as those in Example A1 was punched out in a ring shape for the purpose of measuring the relative magnetic permeability and the core loss and in a shape of the specimen defined in JIS regulation for the purpose of measuring the tensile strength.

TABLE B1

| | Pressurized Heat Treatment Conditions | | | Magnetic Properties | |
|---|---|---|---|---|---|
| | Pressure (MPa) | Temperature (° C.) | Time (min) | Relative Magnetic Permeabilit | Core Loss (W/kg) |
| Reference Example B'1 | | Untreated | | 7,280 | 25.4 |

TABLE B1-continued

| | Pressurized Heat Treatment Conditions | | | Magnetic Properties | |
|---|---|---|---|---|---|
| | Pressure (MPa) | Temperature (° C.) | Time (min) | Relative Magnetic Permeabilit | Core Loss (W/kg) |
| Example B1 | 1 | 400 | 60 | 15,740 | 10.7 |
| Example B2 | 5 | 400 | 60 | 13,450 | 11.5 |
| Reference Example B'2 | 0 | 400 | 60 | 10,130 | 12.6 |
| Reference Example B'3 | 120 | 400 | 60 | 9,800 | 25.1 |

Reference Example B'1

An amorphous metal ribbon METGLAS 2714A (element ratio: Co: Fe: Ni: Si: B=66:4:1:15:14) manufactured by Honeywell was punched out in a ring shape for the purpose of the measurement of relative magnetic permeability and core loss, and the relative magnetic permeability and the core loss were measured without any treatment. As a result, the relative magnetic permeability was 7,280 and the core loss was 25.4 W/kg. The tensile strength was 1,020 MPa. The results are shown in Table B2 and Table B3.

Reference Example B'2

An amorphous metal ribbon METGLAS 2714A (element ratio: Co: F: Ni: Si: B=66:4:1:15:14) manufactured by Honeywell was punched out in a ring shape for the purpose of the measurement of relative magnetic permeability and core loss. The ribbon was annealed in the conditions of non-pressurizing, temperature of 400° C. and time period of 60 min. In the heat treatment, a conventional tube type-heating furnace was used and nitrogen was flowed at a rate of 0.5 l/min in order to carry out the treatment in a nitrogen atmosphere. Because the ribbons were not magnetic substrates that have a resin layer formed on it, they were not adhered each other to form a laminate. The measurement was carried out on a stack of 5 ribbons. The results are shown in Table B1. The magnetic permeability was 10,130 and the core loss was 12.6 W/kg. As they were consisting only of amorphous metal ribbons, the ribbons obtained were brittle. As they needed to be handled carefully, the tensile strength could not be measured.

TABLE B2

| | Pressurized Heat Treatment Conditions | | | Properties | | |
|---|---|---|---|---|---|---|
| | Pressure (MPa) | Temperature (° C.) | Time (min) | Relative Magnetic Permeability | Core Loss (W/kg) | Tensile Strength (MPa) |
| Example B3 | 1 | 400 | 60 | 21,680 | 7.3 | 110 |
| Example B4 | 0.1 | 400 | 60 | 15,800 | 10.3 | 102 |
| Example B5 | 10 | 400 | 60 | 12,270 | 11.9 | 108 |
| Example B6 | 1 | 400 | 60 | 12,510 | 11.8 | 109 |
| Example B7 | 1 | 400 | 60 | 19,500 | 7.7 | 98 |
| Example B8 | 1 | 400 | 10 | 16,100 | 8.7 | 110 |
| Example B9 | 1 | 400 | 200 | 19,100 | 8.3 | 108 |
| Reference Example B1 | 0.005 | 400 | 60 | 9,800 | 13.3 | 15 |
| Reference Example B2 | 120 | 400 | 60 | 7,600 | 25.1 | 87 |
| Reference Example B3 | 1 | 280 | 60 | 9,000 | 22.5 | 102 |
| Reference Example B4 | 1 | 510 | 60 | 10,200 | 14.2 | 24 |
| Reference Example B5 | 1 | 400 | 0.5 | 8,300 | 19.1 | 25 |
| Reference Example B6 | 1 | 400 | 800 | 9,200 | 17 | 23 |

Reference Example B'3

Laminate-Adhesion and a heat treatment for the purpose of improving magnetic properties are carried out in the same manner as in Example B1, provided that the applied pressure was 120 MPa, the temperature was 400° C. and the time period was 60 min. As a result of the measurement of magnetic properties, the relative magnetic permeability was 9,800 and the core loss was 25.1 W/kg, which were showing better performance than that of the sole amorphous metal ribbons treated in the same conditions. The tensile strength could not be measured. The results are shown in Table B1.

TABLE B3

| | Laminate Adhesion Conditions | | | Pressurized Heat Treatment Conditions | | | Properties | | |
|---|---|---|---|---|---|---|---|---|---|
| | Pressure (MPa) | Temperature | Time (min) | Pressure (MPa) | Temperature | Time (min) | Relative Magnetic Permeability | Core Loss (W/kg) | Tensile Strength (MPa) |
| Reference Example B1 | | Untreated | | | Untreated | | 7,280 | 25.4 | 1,020 |
| Example B10 | 10 | 250 | 60 | 0 | 420 | 60 | 14,780 | 9.9 | 102 |

TABLE B3-continued

| | Laminate Adhesion Conditions | | | Pressurized Heat Treatment Conditions | | | Properties | | |
|---|---|---|---|---|---|---|---|---|---|
| | Pressure (MPa) | Temperature | Time (min) | Pressure (MPa) | Temperature | Time (min) | Relative Magnetic Permeability | Core Loss (W/kg) | Tensile Strength (MPa) |
| Example B11 | 0.1 | 250 | 60 | 0 | 420 | 60 | 15,020 | 9.8 | 98 |
| Example B12 | 200 | 250 | 60 | 0 | 420 | 60 | 13,880 | 10.8 | 107 |
| Example B13 | 10 | 250 | 60 | 0 | 420 | 60 | 14,740 | 9.9 | 110 |
| Example B14 | 10 | 250 | 60 | 0 | 400 | 60 | 12,070 | 10.6 | 107 |
| Example B15 | 10 | 250 | 60 | 1 | 400 | 60 | 21,680 | 7.3 | 107 |
| Reference Example B7 | 0.005 | 250 | 60 | 0 | 400 | 60 | 15,010 | 10 | 20 |
| Reference Example B8 | 600 | 250 | 60 | 0 | 400 | 60 | 11,450 | 13.8 | 78 |
| Reference Example B9 | 100 | 250 | 60 | 0 | 400 | 60 | 7,680 | 16.9 | 101 |
| Reference Example B10 | 10 | 250 | 60 | 0 | 400 | 60 | 14,870 | 10.1 | 18 |
| Reference Example B11 | 10 | 250 | 0.5 | 0 | 400 | 60 | 14,440 | 10.8 | 17 |

Example B3

A polyamic acid of the same type as in Example A1 was applied on a side of the same amorphous metal as in Example A1, and drying off of the solvent and thermal imidization were carried out. The magnetic substrate obtained had a width of 50 mm, an average thickness of the alloy layer of 16.5 μm and an average thickness of the imide resin layer of 4 μm. The substrates were punched out in a ring shape for the purpose of measuring the relative magnetic permeability and the core loss or in a shape of the specimen defined in JIS regulation for the purpose of measuring the tensile strength. Five ring shaped sheets or 20 specimen shaped sheets were stacked in the same direction and the laminate-adhesion and a heat treatment for the purpose of improving magnetic properties are carried out simultaneously using a heat press (Toyoseiki, Mini Test Press Type WCH) in such a condition that the applied pressure was 1 MPa, the temperature was 400° C. and the time period was 60 min. In order to carry out in a nitrogen atmosphere, nitrogen was flowed at a rate of 0.5 l/min using Bodyframe manufactured by Tanken Seal Seiko Co., Ltd. As a result of the measurement of magnetic properties, the relative magnetic permeability was 21,680 and the core loss was 7.3 W/kg, which mean better performance than that of the sole amorphous metal ribbons treated in the same conditions. The tensile strength was 110 MPa, which means excellent mechanical properties. The results are shown in Table B3.

Examples B4 to B9

The experiments were carried out in the same manner as in Example B3, provided the simultaneous laminate-adhesion and heat treatment for the purpose of improving magnetic properties were carried out according to the conditions shown in Table B2 and then the evaluations were carried out. The results are shown in Table B3.

Reference Examples B1 to B6

The experiments were carried out in the same manner as in Example B3. In the experiments, the simultaneous laminate-adhesion and heat treatment for the purpose of improving magnetic properties were carried out according to the conditions shown in Table B2 and then the evaluations were carried out. The results are shown in Table B3.

Example B10

The magnetic substrates of the Example B3 were punched out in a ring shape for the purpose of measuring the relative magnetic permeability and the core loss or in a shape of the specimen defined in JIS regulation for the purpose of measuring the tensile strength. Five ring shaped sheets or 20 specimen shaped sheets were stacked in the same direction and the laminate-adhesion and a heat treatment for the purpose of improving magnetic properties are carried out simultaneously using a heat press (Toyoseiki, Mini Test Press, Type WCH) in such a condition that the applied pressure was 10 MPa, the temperature was 250° C. and the time period was 30 min. In order to carry out in a nitrogen atmosphere, nitrogen was flowed at a rate of 0.5 l/min using Bodyframe manufactured by Tanken Seal Seiko Co., Ltd. After a cooling, another heat treatment was carried out in the conditions of non-pressurizing, temperature of 420° C. and time period of 60 min. In the heat treatment, a conventional tube type-heating furnace was used and nitrogen was flowed at a rate of 0.5 l/min in order to carry out the treatment in a nitrogen atmosphere. As a result of the measurement of magnetic properties, the relative magnetic permeability was 14,780 and the core loss was 9.9 W/kg, which mean better performance than that of the sole amorphous metal ribbons treated in the same conditions. The tensile strength was 102 MPa, which also means excellent mechanical properties. The results are shown in Table B3.

Examples B11 to B15

The experiments were carried out in the same manner as in Example B10, provided the laminate-adhesion and the subsequent heat treatment for the purpose of improving magnetic properties were carried out according to the conditions shown in Table B3 and then the evaluations were carried out. The results are shown in Table B3.

Reference Examples B7 to B11

The experiments were carried out in the same manner as in Example B10. In the experiments, the laminate-adhesion and the subsequent heat treatment for the purpose of improving magnetic properties were carried out according to the conditions shown in Table B2 and then the evaluations were carried out. The results are shown in Table B3.

Example C1

As the amorphous metal ribbon, an amorphous metal ribbon METGLAS 2714A (product name) manufactured by Honeywell, which has a width of 50 mm, a thickness of 15 μm and composition of $CO_{66}Fe_4Ni_1(BSi)_{29}$ (% by atom) was used. A polyamic acid solution having a viscosity of about 0.3

Pa·S measured with a type E viscometer was applied on the whole area of a side of the ribbon as a varnish using a gravure head having a outside diameter of 50 mm, drying is carried out at 140° C., curing was carried out at 260° C., and then a magnetic substrate wherein a polyimide resin (chemical formula (24)) having a thickness of about 6 μm was applied on a side of an amorphous metal ribbon was prepared.

The polyamic acid solution was obtained by polycondensing 3,3'-diaminodiphenyl ether and 3,3',4,4'-biphenyl tetracarboxylic dianhydride at a ratio of 1:0.98 in a dimethylacetamide solvent at room temperature and used being diluted with dimethylacetamide. 25 sheets of the substrate were stacked, and a laminate having a thickness of 0.7 mm was prepared using a heat press at 260° C. The laminate was processed for shape-forming with a dicing saw using a cutting blade having a thickness of 0.2 mm to prepare a laminated core of 20×2.5 mm.

Insulating adhesive film (manufactured by Nitto Denko Corp., type: No.360VL, film thickness: 25 μm) was adhered on the lateral faces except for the edge facet in the longitudinal direction, coated conducting wire of Φ 0.1 mm was wound on the core for 800 turns and the Q value and the L value were measured at a frequency of 60 kHz. An LCR meter (4284A, manufactured by Hewlett-Packard) was used for the measurement of Q value and L value. The measurement voltage was set at 1V. The Q value was high and the core had excellent properties. Furthermore, a laminate that has small unevenness and is superior in the flatness was obtained owing to the high applied pressure in the heat treatment process.

Example C2

Figure 4:
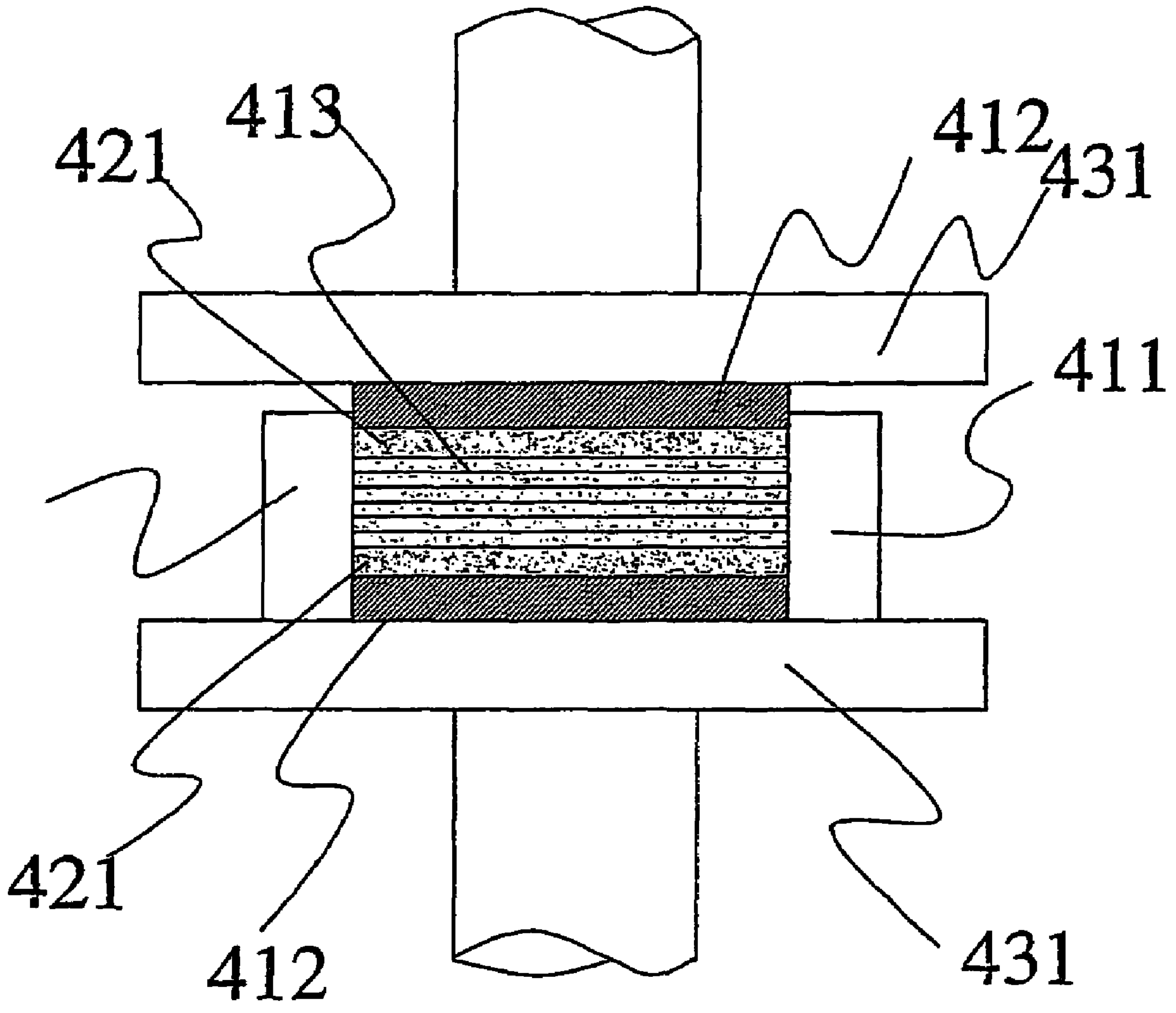
FIG. 4 is an example briefly showing a method for applying a pressure on magnetic substrates in the present invention.

A core obtained by preparing a laminate in the same manner as in Example C1 was subjected to a heat treatment using a heat press facility shown in FIG. 4 at a temperature of 400° C. under an applied pressure of 35 MPa for 1 hr. The laminate of amorphous metal ribbons were processed to the same shape as in Example C1 by means of press punching out processing, adhered with a insulating tape, wound with wire and then subjected to the measurement of Q value and L value. The measured values are shown in Table C1. The Q value was high and the core had excellent properties. Furthermore, a laminate that has small unevenness and is superior in the flatness was obtained owing to the high applied pressure in the heat treatment process.

Example C3

A core obtained by preparing a laminate in the same manner as in Example C1 was subjected to a heat treatment using a heat press facility shown in FIG. 4 at a temperature of 400° C. under an applied pressure of 20 MPa for 1 hr. The laminate of amorphous metal ribbons are processed to the same shape as in Example C1 by means of electric-discharge wire processing, adhered with a insulating tape, wound with wire and then subjected to the measurement of Q value and L value. The measured values are shown in Table C1. The Q value was high and the core had excellent properties. Furthermore, a laminate that has small unevenness and is superior in the flatness was obtained owing to the high applied pressure in the heat treatment process.

Examples C3 to C4

A polyamic acid of the same type as in Example A1, which can be converted to the heat resistant resin represented by the chemical formula (24), was applied on a side of an amorphous metal ribbon of the same type as in Example A1, and drying off of the solvent and thermal imidization were carried out by heating. Laminates were prepared in the same manner as in Example C1, provided the temperature and the applied pressure in the heat treatments were set at the conditions shown in Table C1. The results are shown in Table C1.

Reference Example C1

As the amorphous metal ribbon, an amorphous metal ribbon METGLAS 2714A (product name) manufactured by Honeywell, which has a width of about 50 mm, a thickness of about 15 μm and composition of $CO_{66}Fe_4Ni_1(BSi)_{29}$ (% by atom) was used. The ribbons were processed by cutting to a size of 20×2.5 mm, subjected to a heat treatment at 400° C. for 1 hr and impregnated with an epoxy resin to prepare a laminated core.

Insulating adhesive film (manufactured by Nitto Denko Corp., type: No.360VL, film thickness: 25 μm) was adhered on the lateral faces except for the edge facet in the longitudinal direction, coated conducting wire of Φ 0.1 mm was wound on the core for 800 turns and the Q value and the L value were measured at a frequency of 60 kHz. As a result the Q value was lower in comparison with the properties of Examples C1 to C3, which means the core had a higher loss in comparison with those of Examples C1 to C3.

Furthermore, the yields in the preparation deteriorated, owing to the cracks and chips of the ribbons during the handling, which occurred when the heat-treated ribbons were stacked. Also the surface roughness was greater than the Examples C1 to C3 and the morphological stability was not so rich, because sufficient pressure could not be applied in the impregnation and curing process, since the unification of the laminate was carried out in such a condition that the heat-treated ribbons were brittle.

Reference Example C2

As the amorphous metal ribbon, an amorphous metal ribbon METGLAS 2714A (product name) manufactured by Honeywell, which has a width of about 50 mm, a thickness of about 15 μm and composition of $CO_{66}Fe_4Ni_1(BSi)_{29}$ (% by atom) was used. Substrates, in which an epoxy resin was applied on the ribbon, were prepared. 25 sheets of the substrate were stacked, the laminate-adhesion was carried out at 150° C. and 0.1 MPa, and then a heat treatment was carried out at 200° C. to prepare a laminate. The laminate was shape-formed with a cutting blade having a thickness of 0.2 mm to obtain a laminate core of 20×2.5 mm. Wire was wound in the same manner as in Example C1 and Q value and L value were measured at a frequency of 60 kHz. As a result the Q value was lower in comparison with the properties of Examples C1 to C3. That means the core has a higher loss in comparison with those of Examples C1 to C3. Also the surface roughness was greater than the Examples C1 to C3 and the morphological stability was not so rich, because pressure was not applied in the heat treatment step after the laminate-adhesion.

Reference Examples C3 and C4

The preparation was carried out in the same manner as in Example C1. The applied pressure and the temperature of the heat treatment were set at the conditions shown in Table C1. The results are shown in Table C1. When the applied pressure was 0 or 500 MPa, the Q value was not so high and the results showed that the property was not so good.

TABLE C1

| Magnetic Core | Applied Pressure (MPa) | Temperature (° C.) | Q Value | L (mH) | Surface Property of the Laminate (Unevenness |
|---|---|---|---|---|---|
| Example C1 | 10 | 400 | 90 | 10 | ○ |
| Example C2 | 35 | 400 | 92 | 10 | ○ |
| Example C3 | 20 | 400 | 92 | 10 | ○ |
| Example C4 | 35 | 380 | 91 | 10 | ○ |
| Example C5 | 30 | 400 | 93 | 10 | ○ |
| Reference Example C1 | 0 | 400 | 65 | 10 | Δ |
| Reference Example C2 | 0.1 | 200 | 60 | 10 | Δ |
| Reference Example C3 | 0 | 400 | 65 | 10 | ○ |
| Reference Example C4 | 550 | 400 | 58 | 10 | ○ |

Example D1

As the amorphous metal ribbon, an amorphous metal ribbon METGLAS 2714A (product name) manufactured by Honeywell, which has a width of about 50 mm, a thickness of about 15 μm and composition of $CO_{66}Fe_4Ni_1(BSi)_{29}$ (% by atom) was used.

A polyamic acid solution having a viscosity of about 0.3 Pa·S measured with a type E viscometer was applied on the whole area of a side of the ribbon, drying was carried out at 140° C., curing was carried out at 260° C., and then a magnetic substrate wherein a polyimide resin having a thickness of about 6 μm was applied on a side of an amorphous metal ribbon was prepared.

As the polyamic acid solution used above, one that turns to have a main structural unit of the chemical formula (24) after the imidization was employed. As the solvent, dimethylacetamide was used to dilute. The polyamic acid was obtained by polycondensing 3,3'-diaminodiphenyl ether and 3,3',4,4'-biphenyl tetracarboxylic dianhydride at a ratio of 1:0.98 in a dimethylacetamide solvent at room temperature.

25 sheets of the substrate were stacked, and a laminate having a thickness of 0.55 mm was prepared using a heat press at 260° C. The laminate was subjected to a heat treatment at 400° C. for 1 hr while being fixed in a fixture and shape-formed to prepare a laminate of 25×4 mm.

Coated conducting wire of Φ 0.1 mm was wound on the core for 200 turns and a Q value was measured at a frequency of 60 kHz. An LCR meter (4284A, manufactured by Hewlett-Packard) was used for the measurement of the Q value. The measurement voltage was set at 1V.

Also, antenna cores of amorphous metal ribbon were prepared, wires were wound and Q values were measured in the same manner as in Example D1, provided that the polyimide resins of the chemical formulae (28), (31) and (34) were used.

Examples D2 to D4

Laminates were prepared in the conditions defined in Table D1 as in Example D1, wire was wound in the same manner and then Q value was measured.

Example D5

As the amorphous metal ribbon, an amorphous metal ribbon METGLAS 2714A (product name) manufactured by Honeywell, which has a width of about 50 mm, a thickness of about 15 μm and composition of $CO_{66}Fe_4Ni_1(BSi)_{29}$ (% by atom) was used. A polyamic acid solution, which is a precursor of a polyimide, that turns to be the chemical formula (19) after the imidization was used as a heat resistant resin, applied on the amorphous metal ribbon and dried at 140° C. After the precursor of the polyimide resin having a thickness of 6 μm was formed on a side of the amorphous metal ribbon, 25 sheets of the substrate were stacked and adhered using a heat press at 260° C. to prepare a laminate. The laminate was heat treated at 400° C. for 1 hr and then shape-formed to obtain a laminate magnetic core of 25×4 mm. The Q value was measured in the same manner as in Example D1.

Example D6

As the amorphous metal ribbon, an amorphous metal ribbon METGLAS 2714A (product name) manufactured by Honeywell, which has a width of about 50 mm, a thickness of about 15 μm and composition of $CO_{66}Fe_4Ni_1(BSi)_{29}$ (% by atom) was used. A solution in which a polyethersulfone, E2010, manufactured by Mitsui Chemicals, Inc. was dissolved using dimethylacetamide as a solvent, was used as a heat resistant resin, applied on the amorphous metal ribbon and dried at 230° C. to prepare a magnetic substrate, wherein the heat resistant resin having a thickness of about 6 μm was formed on a side of the amorphous metal ribbon.

The substrates were stacked, and a laminate having a thickness of 0.55 mm was prepared with a heat press at 260° C. The laminate was heat treated at 400° C. for 1 hr while being fixed in a fixture and then shape-formed to obtain a laminate of 25×4 mm. Coated conducting wire of Φ 0.1 mm was wound on the core for 200 turns. The Q value at the frequency of 50 kHz was 22 and an excellent property was obtained.

Reference Example D1

After a heat treatment, ribbons were sandwiched with TEFLON (registered trademark) sheets and impregnated with an epoxy resin. In the step of handling the heat-treated ribbons and in the step of pressurizing the TEFLON (registered trademark) sheets, many cracks were generated in the ribbons. Furthermore, the applied pressure of the press could not be increased, so the press was carried out at 100 g/$cm^2$ to obtain a thickness of 0.62 mm.

Reference Examples D2 and D3

An epoxy resin (Epoxy Resin 2287, manufactured by Three Bond Co., Ltd.) (Reference Example D2) or a silicone adhesive (Reference Example D3) was applied on a ribbon. A laminate obtained by stacking the ribbons and carrying out a curing while pressuring them at 150° C. It was fixed in a fixture and subjected to a heat treatment in the same manner as in Example D1. Cut-processing was carried out on the laminate after the heat treatment in the same manner as in Example D1. The adhesion strength was not so sufficient that the delamination of the ribbon, cracks and so on, were found.

Reference Example D4

An epoxy resin (Epoxy Resin 2287, manufactured by Three Bond Co., Ltd.) was applied on a ribbon. A laminate obtained by stacking the ribbons and carrying out a curing while pressurized them at 150° C. was fixed in a fixture and subjected to a heat treatment at 150° C. for 4 hr. Cut-processing was carried out on the laminate after the heat treatment in the same manner as in Example D1. The Q value was measured in the same manner as in Example D1.

TABLE D1

| Magnetic Core | Resin | Thickness (mm) | Q | Number of Laminated sheets | Heat Treatment Temperature | Handling Ability |
|---|---|---|---|---|---|---|
| Example D1 | Chemical Formula 30 | 0.55 | 31 | 25 | 400° C. | Good Workability without Cracks or Chippings |
| Example D2 | Chemical Formula 28 | 0.55 | 32 | 25 | 400° C. | Good Workability without Cracks or Chippings |
| Example D3 | Chemical Formula 31 | 0.55 | 32 | 25 | 400° C. | Good Workability without Cracks or Chippings |
| Example D4 | Chemical Formula 34 | 0.55 | 30 | 25 | 400° C. | Good Workability without Cracks or Chippings |
| Example D5 | Chemical Formula 26 | 0.55 | 30 | 25 | 400° C. | Good Workability without Cracks or Chippings |
| Example D6 | Polyethersulfone | 0.55 | 28 | 25 | 270° C. | Good Workability without Cracks or Chippings |
| Reference Example D1 | Epoxy Resin | 0.62 | 13 | 25 | 400° C. | Ribbon had Cracks and Chippings |
| Reference Example D2 | Epoxy Resin | 0.6 | 15 | 25 | 400° C. | Ribbon had Cracks and Chippings, Especially in Cut-processing |
| Reference Example D3 | Silicone Resin | 0.6 | 20 | 25 | 400° C. | Ribbon had Cracks and Chippings, Especially in Cut-processing |
| Reference Example D4 | Epoxy Resin | 0.58 | 22 | 25 | 200° C. | Good Workability without Cracks or Chippings |

Example E1

As the amorphous metal ribbon, an amorphous metal ribbon METGLAS 2605TCA (product name, manufactured by Honeywell), which has a width of about 170 mm, a thickness of about 25 μm and composition of $Fe_{78}Si_9B_{13}$ (% by atom) was used. A polyamic acid solution having a viscosity of 0.3 Pa·S was applied on the whole area of both sides of the ribbon, the solvent was dried off at 150° C., a polyimide resin was formed at 250° C., and thereby a magnetic substrate, wherein a polyimide resin (25) having a thickness of about 2 μm is applied on the both sides of the ribbon, was prepared. The heat resistant resin used was obtained as a polyimide having a main structural unit represented by the chemical formula (25) by, using a polyamic acid, which is a precursor of the polyimide, obtained from 3,3'-diaminodiphenyl ether, which is a diamine, and bis(3,4-dicarboxyphenyl)ether dianhydride, which is a tetracarboxylic acid dianhydride, applying the polyamic acid after dissolving it in a dimethylacetamide solvent and then heating it on the amorphous metal ribbon.

Figure 5:
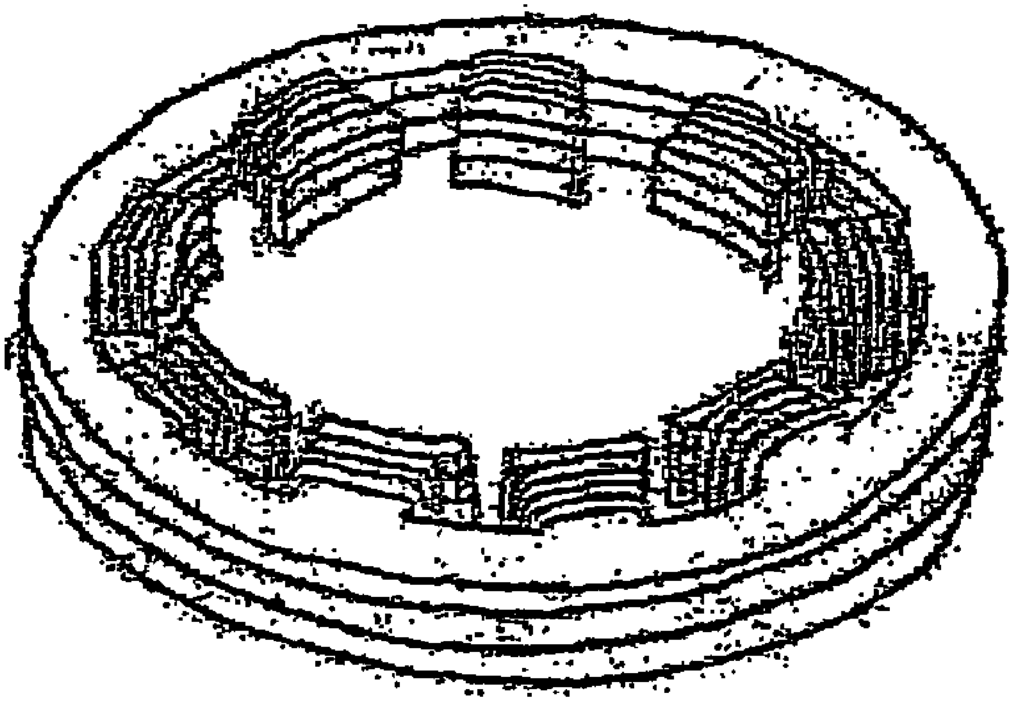
FIG. 5 is an example briefly showing a stator for an electric motor using the laminate of magnetic substrates of the present invention.

For the purpose of preparing a stator for an electric motor having a shape shown in FIG. 5, ring-like sheets having an outside diameter of 50 mm and inside diameter of 40 mm was punched out from the magnetic substrate. 200 of the sheets were laminated and thermocompressed at 270° C. to fusion-bond the resin layers of the magnetic substrates to prepare a laminate. As a result, the thickness was 5.5 mm and the lamination factor was 91%.

The lamination factor was calculated according to the equation defined below.

(Lamination Factor (%))=(((Thickness of the Amorphous Metal Ribbon)×(Number of Ribbons Laminated))(Thickness of the Laminate after the Lamination))×100

A heat treatment was further carried out while the laminate was fastened in a pressurizing jig at 350° C. for 2 hr. No delamination or warpage was observed after the heat treatment and the lamination factor was kept at 91%. Rings correspond to a core size according to JIS H7153 (Method for testing high frequency core loss of an amorphous metal magnetic core) (outside diameter: 50 mm, inside diameter: 40 mm) were cut out using scissors, and a ring, wherein 200 of the rings were laminated, were prepared in the same process for the stator for an electric motor described above. An iron loss was determined from the B-H hysteresis loop measured when an alternating magnetic field of 1 T and 400 Hz was applied. As a result, the iron loss was 3.3 W/kg, which is from a half to one third of the iron loss of silicon steel plates that have been conventionally used for an electric motor. It was confirmed that low loss and excellent magnetic properties were realized.

Example E2

A heat resistant resin was applied on an amorphous metal ribbon in the same manner as in Example E1. Then, 200 of the sheets cut from this in a length of 10 cm by shearing off were stacked and unified to form a laminate by thermocompression at 270° C. A heat treatment was carried out while the laminate was fastened in a pressurizing jig at 350° C. for 2 hr. The laminate was processed to form a ring-like shape of a stator for an electric motor having an outside diameter of 50 mm and inside diameter of 40 mm (FIG. 5) using a electric-discharge wire cutter.

Besides the above, for the purpose of measuring the iron loss, rings having a core size according to JIS H7153 (Method for testing high frequency core loss of an amorphous metal magnetic core) (outside diameter: 50 mm, inside diameter: 40 mm) were cut out using scissors, and a ring, wherein 200 of the rings were laminated, was prepared in the same manner as in Example E1. The iron loss was determined from a B-H hysteresis loop measured when an alternating magnetic field of 1 T and 400 Hz was applied. As a result, the iron loss was 3.5 W/kg, which is from a half to one third of the iron loss of silicon steel plates that have been conventionally used for an electric motor. It was confirmed that low loss and excellent magnetic properties were realized.

Reference Example E1

Laminates having a shape of a stator (outside diameter: 50 mm, inside diameter: 40 mm(25 μm×200 sheets)) that had been heat-treated in a nitrogen atmosphere at 400° C. for 2 hr were prepared in the same manner as in Example E1 except that solutions, wherein an epoxy resin, a bisphenol-A type epoxy resin, a partially saponified montanic ester wax, a modified polyester resin or a phenolic butyral resin was dissolved in dimethylacetamide was used instead of the polyamic acid solution used in Example E1.

The absence or presence of deformation such as delamination or breaking off and lamination factor were evaluated after the heat treatment in a nitrogen atmosphere at 400° C. for 2 hr. Furthermore, the iron loss was measured using the ring-like shaped sample.

The results are shown in Table E1. In cases of using an epoxy resin, a bisphenol-A type epoxy resin, a partially saponified montanic ester wax, a modified polyester resin or a phenolic butyral, thermal decomposition at 400° C. in 2 hr was significant and deformations such as delamination or increase in the thickness occurred in many cases. As a result, the lamination factor, which was 90% before the heat treatment, decreased to about 80% after the heat treatment in cases of the resins other than the polyimide of Example E1. The delamination in the interlayer makes it difficult to keep the mechanical strength against the stress which occurs in the rotational operation and is considered not to be practical when used in an electric motor or an electric generator.

For the purpose of evaluating the magnetic properties of the transformer, a relative magnetic permeability was calculated from the inductance value measured using 4192 A manufactured by Hewlett-Packard and an iron loss was measured using a BH analyzer 8217 manufactured by Iwatsu Test Instruments Corporation.

As a result, the iron loss was 8 W/kg at a frequency of 1 kHz and a maximum magnetic flux density of 1 T. The relative magnetic permeability was 1,500.

TABLE E1

| Resin | Before the Heat Treatment | After the Heat Treatment | Lamination Factor After the | Iron Loss (W/kg) (*3) | Comprehensive Evaluation |
|---|---|---|---|---|---|
| Epoxy Resin | Present | Present | 85% | 3.6 | x |
| Bis-Phenol A Type Epoxy Resin | Present | Present | 84% | 3.5 | x |
| Partially Saponificated Montanic Ester Wax | Present | Present | 80% | 3.3 | x |
| Modified Polyester Resin | Present | Present | 85% | 3.4 | x |
| Phenolic Butyral Resin | Present | Present | 83% | 3.6 | x |
| Polyimide (25) | Present | Absent | 91% | 3.3 | ○ |

(*1) Presence of Crack or Chipping in Press-punching
(*2) Presence of Delamination or Deformation
(*3) 400 Hz, 1.0 T
In the table,
"○" denotes "good" and
"x" denotes "poor".

Example F1

The present invention is explained using an example of a toroidal-shaped inductor comprising the laminate of magnetic substrates of the present invention.

Constituent materials and preparation process of the inductor of the present invention are shown below. First, as the amorphous metal ribbon, an amorphous metal ribbon METGLAS 2605S2 (product name, manufactured by Honeywell), which has a width of about 140 mm, a thickness of about 25 μm and composition of $Fe_{78}B_{13}Si_9$ (% by atom) was used. A polyamic acid solution having a viscosity of 0.3 Pa·S measured with a type-E viscometer was applied on the whole area of a side of the amorphous metal ribbon using a gravure coater, the solvent, DMAC (dimethylacetamide), was dried off at 140° C., curing was carried out at 260° C., and thereby a heat resistant resin (polyimide resin) having a thickness of about 4 μm was formed on a side of the amorphous metal ribbon. As the polyamic acid solution used above, one that turns to have a main structural unit of the chemical formula (24) after the imidization was employed. As the solvent, dimethylacetamide was used to dilute. The polyamic acid was obtained by polycondensing 3,3'-diaminodiphenyl ether and bis(3,4-dicarboxyphenyl)ether dianhydride at a ratio of 1:0.98 in a dimethylacetamide solvent at room temperature.

Figure 7:
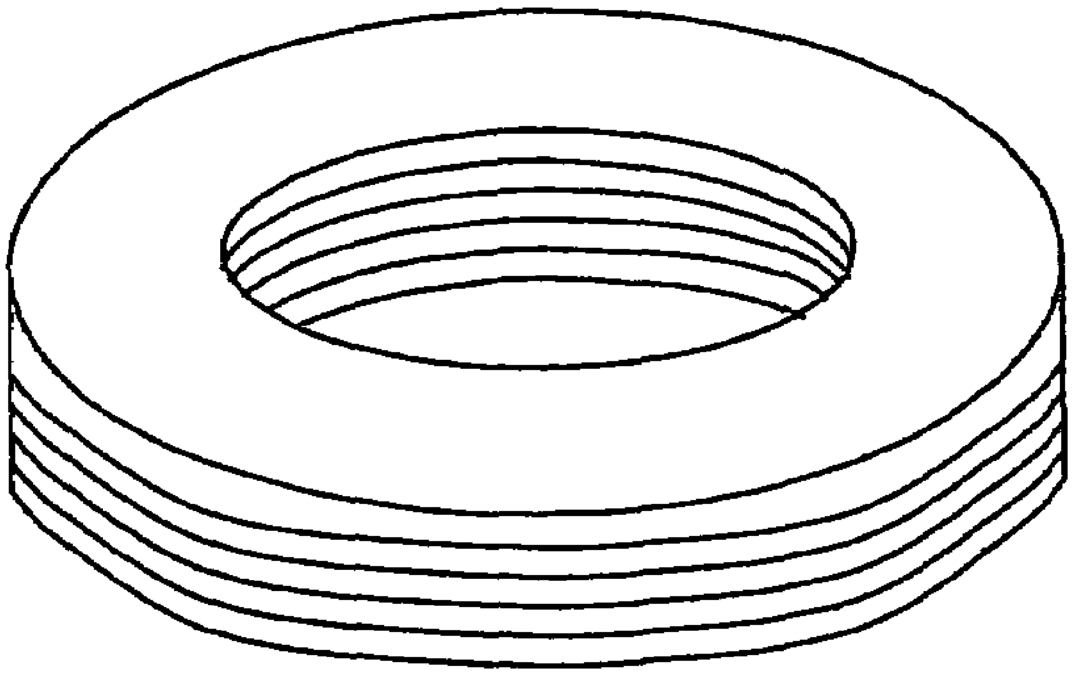
FIG. 7 is an example briefly showing a toroidal-shaped inductor using the laminate of magnetic substrates of the present invention.

The substrate was punched out using punching press with a mold in a toroidal-shape having an outside diameter of 40 mm and an inside diameter of 25 mm, and 500 of the substrates ware stacked to form a toroidal laminate as shown in FIG. 7. Then the laminate-unification was carried out using a heat press as shown in FIG. 4 in an atmospheric air at 260° C. and 5 MPa for 30 min to obtain a laminate having a thickness of 14.5 mm. Furthermore, pressurized heat treatment was carried out in an atmospheric air at a temperature of 365° C. and an applied pressure of 1.5 MPa for 2 hr in order to elicit magnetic properties.

Furthermore, in a method according to JIS Z2214, a specimen for a tensile strength test having a width of 12.5 mm and a length of 150 mm was prepared in the same process. The tensile strength was 700 MPa. It was confirmed that the strength that is sufficient for the applications such as a rotor of a high-speed rotation motor or so on was displayed.

Furthermore, according to the method defined in JIS C2550, lamination factor was measured. As a result, The lamination factor was 87%, which is practically sufficient for the applications such as an electric motor.

Example F2

A Case Wherein a Heat Resistant Elastic Layer was Formed in the Step of Press The same type of substrates as in Example F1 was used, and 500 sheets of the same toroidal shape was stacked. In the Example, the laminated 500 sheets were sandwiched with heat resistant elastic sheets, which were obtained by laminating 10 polyimide films (UPILEX, manufactured by UBE Industries, Ltd.) having a thickness of 100 μm, further sandwiched with mirror surfaced sheets made of SUS304 having a thickness of 1 cm and a size of 10 cm square, and unified by heat pressing using the structure shown in FIG. 4.

The unification of the laminate was carried out in an atmospheric air at 260° C. and 5 MPa for 30 min to prepare a laminate having a thickness of 14.5 mm. The laminate was further heated and pressurized to elicit the magnetic properties at a temperature of 365° C. under an applied pressure of 1.5 MPa for 2 hr. For the purpose of comparing the heat resistant elastic sheet in Example F1 with Example E2, the toroidal cores described above were prepared in N=20.

For the purpose of evaluating the magnetic properties of the transformer, the relative magnetic permeability was calculated from the inductance value measured using 4192A manufactured by Hewlett-Packard and the iron loss was measured using a BH analyzer SY-8217 manufactured by Iwatsu Test Instruments Corporation. As a result, the iron loss was 10 W/kg at a frequency of 1 kHz and a maximum magnetic flux density of 1 T. The relative magnetic permeability was 1,500.

Furthermore, in a method according to JIS Z2214, a specimen for a tensile strength test having a width of 12.5 mm and a length of 150 mm was prepared in the same laminate preparing process. The tensile strength was 700 MPa. It was confirmed that the strength that is sufficient for the applications such as a rotor of a high-speed rotation motor or so on was displayed. The fluctuations (maximum values and minimum values) in the measured values are shown in Table F2 below. Samples prepared by being sandwiched with the heat resistant elastic sheets were measured for the magnetic properties. As a result, it is confirmed that they had little fluctuations.

The lamination factor was measured in the same manner as in Example F1. As a result, The lamination factor was 87%, which is practically sufficient for the applications such as an electric motor.

Example F3

Electric Motor

Figure 6:
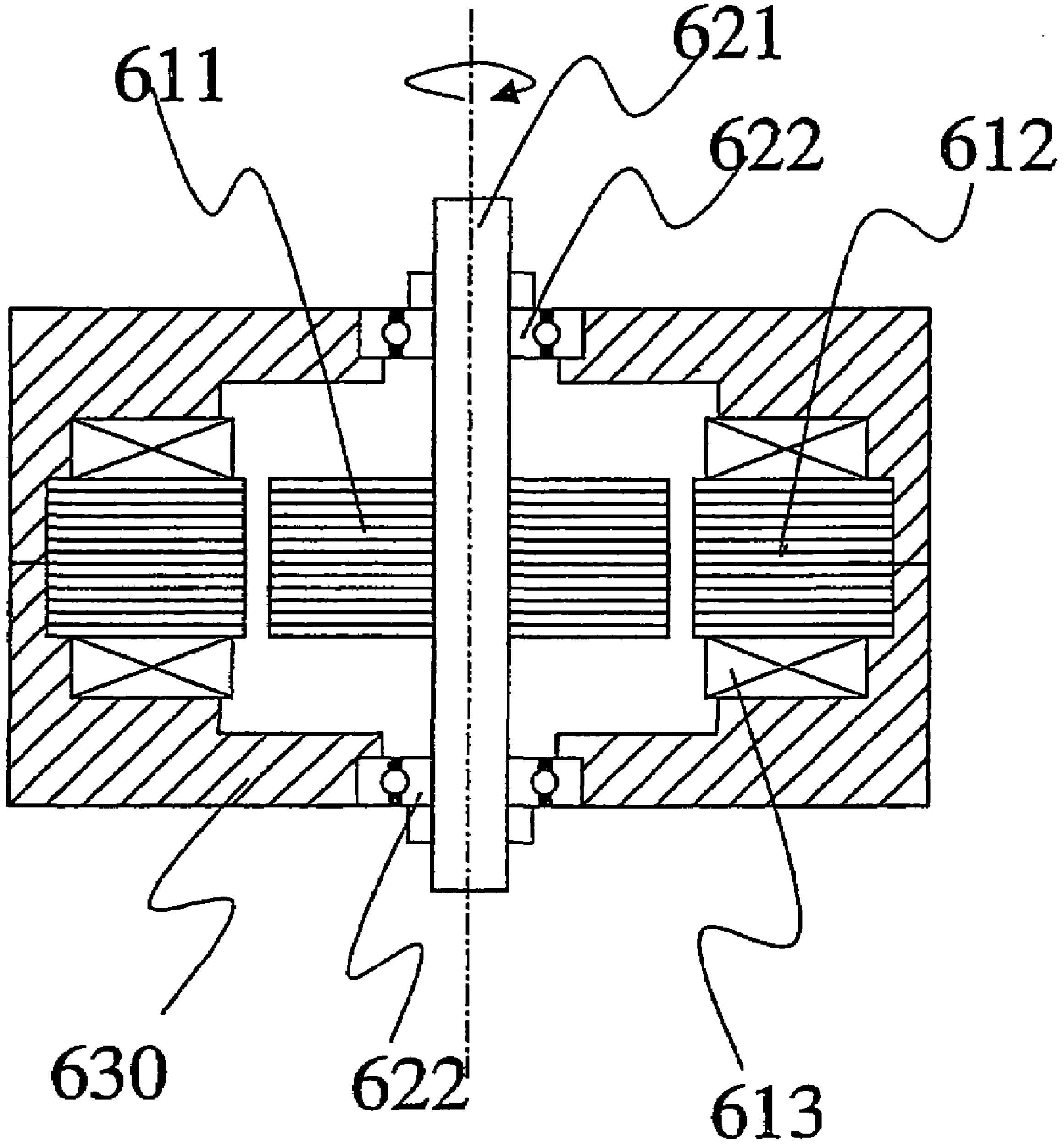
FIG. 6 is an example briefly showing a synchronous reluctance motor using the laminate of magnetic substrates of the present invention.

The same type of magnetic substrates as in Example F1 were used and processed using punching press with a mold to a rotor-shape and a stator-shape. 1,000 sheets of the magnetic substrates processed to the shape were laminated and unified using the same types of materials and processes for the toroidal core of Example F1 and heat-treated in an atmospheric air at 365° C. for 2 hr. A rotor and a stator of an electric motor comprising a magnetic laminate having a thickness of 30 mm and a diameter of 100 mm were prepared and a synchronous reluctance motor having the constitution shown in FIG. 6 was further prepared. The constitutions of the rotor and the stator were shown in FIG. 6. Motor performance of the electric motor of the invention was measured. The results are shown in Table F1. As a result of the measurement, the maximum frequency and the output power was about 2.0 times in comparison with the magnetic materials of earlier filed inventions. The motor efficiency ((mechanical output energy/electrical input energy)×100) was improved by 2%.

Example F4

Electric Motor

The same type of magnetic substrates as in Example F1 were prepared, provided that a polyimide resin represented by the chemical formula (24) was used as the resin to be applied.

The process for preparing the polyimide resin is as follows. A polyamic acid obtained by polycondensing 1,3-bis(3-aminophenoxy)benzene and 3,3',4,4'-biphenyl tetracarboxylic dianhydride at a ratio of 1:0.97 in dimethylacetamide solvent at room temperature is used. As the diluting liquid, dimethylacetamide was used. The polyamic acid solution was applied on the whole area of a side of the ribbon, dried at 140° C. and then cured at 260° C. to obtain the resin. A magnetic substrates, wherein a heat resistant resin (polyimide resin) represented by the chemical formula (24) having a thickness of 4 μm was formed on a side of an amorphous metal ribbon, was prepared.

The magnetic substrates were processed using punching press with a mold to a rotor-shape or a stator-shape. 1,000 of the magnetic substrates processed to the shape were laminated and unified using the same types of materials and processes for the toroidal core of Example F1 and heat-treated in an atmospheric air at 365° C. for 2 hr. A rotor and a stator of an electric motor having the same shape and constitution as those of Example F3 and comprising a magnetic laminate having a thickness of 30 mm and a diameter of 100 mm were prepared and a synchronous reluctance motor having the constitution shown in FIG. 6 was further prepared. The constitution of the rotor and the stator was shown in FIG. 6. Motor performance of the electric motor of the invention was measured. The results are shown in Table F3. As a result of the measurement, like Example F3, the maximum frequency and the output power was about 2 times in comparison with the magnetic materials of earlier filed inventions. The motor efficiency ((mechanical output energy/electrical input energy)×100) was improved by 2%.

Reference Example F1

High Pressure

In the Reference example, a magnetic substrate using an amorphous metal ribbon and a heat resistant resin of the same type as in Example F1 was used. The substrate was punched out using a punching press with a mold in a toroidal-shape having an outside diameter of 40 mm and an inside diameter of 25 mm, and 500 of the substrates were stacked keeping the ribbons in the same direction. Then the laminate-unification was carried out using a heat press in an atmospheric air at 260° C. and 5 MPa for 30 min to obtain a laminate having a thickness of 14.5 mm. Furthermore, pressurized heat treatment was carried out in an atmospheric air at a temperature of 365° C. and an applied of 20 MPa for 2 hr in order to elicit magnetic properties.

For the purpose of evaluating the magnetic properties, the mechanical strength and the lamination factor of the transformer, at first, the relative magnetic permeability and the iron loss were measured in the same manner as in Example F1. As a result, the relative magnetic permeability was 800, which was lower than that of Example F1 by 50%. Furthermore, the iron loss at a frequency of 1 kHz and a maximum magnetic flux density of 1 T was 17 W/kg, which means the loss was several times larger than that of Example F1. Then a specimen for tensile strength test was prepared in the same manner as in Example F1 and the tensile strength was measured. The result is shown in Table F1 below. The tensile strength was 700 MPa. It was revealed that it has a tensile strength at the same level as that of Example F1.

Lamination factor was measured in the same manner as in Example F1. As a result, the lamination factor was 87%, which does not cause practical problems in the applications such as an electric motor.

TABLE F1

Copmarison of Pressure in Heat Treatment

| | Heat Treatment Temperature (° C.) | Applied Pressure (MPa) | Presence of Heat Resistant Elastic Sheet | Relative Magnetic Premeability | Iron Loss (W/kg) Frequency: 1 kHz Magnetic Flux | Mechanical Strength (MPa) | Lamination Factor | Evaluation |
|---|---|---|---|---|---|---|---|---|
| Example F1 | 365 | 3 | Absent | 1,500 | 8 | 700 | 87% | ○ |
| Reference Example F1 | 365 | 20 | Absent | 800 | 17 | 700 | 87% | Δ |
| Reference Example F2 | 365 | None | Absent | 1,500 | 11 | 300 | 78% | Δ |

In the table,
"○" denotes "good" and
"Δ" denotes "fair".

Reference Example F2

Low Pressure

In Reference Example F2, a magnetic substrate using an amorphous metal ribbon and a heat resistant resin of the same type as in Example F1 was used. The substrate was punched out using a punching press with a mold in a toroidal-shape having an outside diameter of 40 mm and an inside diameter of 25 mm, and 500 of the substrates were stacked keeping the ribbons in the same direction. Then the laminate-unification was carried out using a heat press in an atmospheric air at 260° C. and 5 MPa for 30 min to obtain a laminate having a thickness of 14.5 mm. Furthermore, a pressurized heat treatment was carried out in an atmospheric air at a temperature of 365° C. and an atmospheric pressure without pressurizing for 2 hr in order to elicit magnetic properties.

The magnetic properties, the mechanical strength and the lamination factor of the transformer were evaluated.

At first the relative magnetic permeability and the iron loss were measured in the same manner as in Example F1. As a result, the iron loss at a frequency of 1 kHz and a maximum magnetic flux density of 1 T was 11 W/kg and the relative magnetic permeability was 1,500, which were in almost the same level as those of Example F1. Then a specimen for tensile strength test was prepared and the tensile strength was measured in the same manner as in Example F1. As a result the tensile strength was 300 MPa, which had decreased to about a half of that of Example F1.

Lamination factor was measured in the same manner as in Example F1. As a result, The lamination factor was 78%, which has significantly decreased in comparison with that of Example F1. Furthermore, as a result of a visual check of the interlayer, blisters, warpage and so on were generated in the interlayer and vacancies were formed in the laminate. Presumably, the tensile strength deteriorated because mechanically weak segments, such as the vacancies, had been locally generated.

TABLE F2

Comparison of the Effect of Heat Resistant Elastic Sheet

| | Heat Treatment Temperature (° C.) | Applied Pressure (MPa) | Presence of Heat Resistant Elastic Sheet | Relative Magnetic Permeability (N = 20) | Iron Loss (W/kg) Frequency: 1 kHz Magnetic Flux Density: 1 T | Mechanical Strength (MPa) | Evaluation |
|---|---|---|---|---|---|---|---|
| Example F1 | 365 | 3 | Absent | 1,500 ± 300 | 10 ± 1 | 700 | ○ |
| Example F2 | 365 | 3 | Present | 1,500 ± 100 | 10 ± 0.5 | 700 | ◎ |

In the table,
"◎" denotes "excellent" and
"○" denotes "good".

Reference Example F3

Electric Motor

An electric motor was prepared using the same magnetic laminate as that shown in Reference Example 2 for a rotor and a stator of an electric motor having the same structure as that of Example F1. The motor performance was evaluated in the same manner as in Example F1. The results of the comparison with Example F3 are shown in Table F3 below. The electric motor was broken at a frequency of 10,000 rpm owing to the low mechanical strength, and it was revealed that achieving a high output power was not easy compared to Example F1 to F4.

TABLE F3

Comparison of the Motors Using the Magnetic Laminate of the Present Invention

| | Iron Loss (W/kg) Frequency: 1 kHz Magnetic Flux | Relative Magnetic Permeability | Motor Efficiency (%) | Maximum Frequency (rpm) | Output Power (kW) | Evaluation |
|---|---|---|---|---|---|---|
| Example F3 | 8 | 1,500 | 93 | 14,000 | 4 | ○ |
| Example F4 | 7.9 | 1,600 | 93 | 14,000 | 4 | ○ |
| Reference Example F3 | 11 | 1,500 | 91 | 10,000 | 2 | Δ |

In the table,
"○" denotes "good" and
"Δ" denotes "fair".

INDUSTRIAL APPLICABILITY

Because the magnetic substrate of the present invention and the laminate thereof have both excellent magnetic properties and excellent mechanical strength, they can be used for a member or a part of various types of applied magnetic products such as, inductors, choke coils, high frequency transformers, low frequency transformers, reactors, pulse transformers, step-up transformers, noise filters, transformers for a voltage inverter, magnetic impedance devices, magnetostrictive oscillators, magnetic sensors, magnetic heads, electromagnetic shields, shield connectors, shield packages, electromagnetic absorbers, electric motors, cores for an electric generator, cores for an antenna, magnetic discs, magnetic conveyor systems, magnets, electromagnetic solenoids, cores for an actuator, and print circuit boards.

Particularly, it can be applied in devices that convert an electric wave to an electric signal, such as antennas for an radio control watch, antennas for RFID, antennas for an automotive immobilizer, radio sets and miniature antenna for a mobile device, from the view points of low-profile, miniaturization, energy conservation and so on. Furthermore, it can be used in electric motors such as electric motors having a DC brush, brushless motors, stepping motors, AC induction motors, AC synchronous motors, rotors and stators used in an electric motor or an electric generator, and so on.

Such magnetic substrates and laminates thereof are realized by heat treating an amorphous metal ribbon under a pressurized condition.

The invention claimed is:

1. A magnetic substrate comprising a heat resistant resin and/or a precursor thereof applied on at least a part of a side or on at least a part of both sides of an amorphous metal ribbon represented by the general formula:

$$(Co_{(1-c)}Fe_c)_{100-a-b}X_aY_b$$

wherein X represents at least one species of element selected from the group consisting of Si, B, C and Ge, Y represents at least one species of element selected from the group consisting of Zr, Nb, Ti, Hf, Ta, W, Cr, Mo, V, Ni, P, Al, Pt, Rh, Ru, Sn, Sb, Cu, Mn and rare earth elements, c, a and b respectively satisfy $0 \leqq c \leqq 1.0$, $10 < a \leqq 35$ and $0 \leqq b \leqq 30$, and a and b are represented in terms of atomic %;

and the heat resistant resin comprises a resin that satisfies the following characteristics:

(1) the weight loss rate owing to the thermal decomposition in a thermal history of 2 hr in a nitrogen atmosphere at 350° C. is 1% by weight or less;

(2) the tensile strength after a thermal history of 2 hr in a nitrogen atmosphere at 350° C. is 30 MPa or more;

(3) the glass transition temperature is from 120° C. to 250° C.

(4) the temperature at which the melt viscosity is 1,000 Pa·s or less is not lower than 250° C. and not higher than 400° C.; and (5) the heat of fusion owning to crystals in the resin, which has been cooled from 400° C. to 120° C. at a rate of 0.5° C./min is 10 J/g or less.

2. The magnetic substrate of claim 1, wherein c in the said general formula satisfies:

$$0 \leqq c \leqq 0.2.$$

3. The magnetic substrate of claim 1, wherein the heat resistant resin comprising a resin that satisfies the following characteristic:

(5) the heat of fusion owning to crystals in the resin, which has been cooled from 400° C. to 120° C. at a rate of 0.5° C./min is 10 J/g or less.

4. The magnetic substrate of claim 2, wherein the heat resistant resin comprising a resin that satisfies the following characteristic:

(5) the heat of fusion owning to crystals in the resin, which has been cooled from 400° C. to 120° C. at a rate of 0.5° C./min is 10 J/g or less.

5. The magnetic substrate of claim 1, wherein c in the said general formula satisfies:

$$0.3 \leqq c \leqq 1.0.$$

6. The magnetic substrate of claim 5, wherein the heat resistant resin comprising a resin that satisfies the following characteristic:

(5) the heat of fusion owning to crystals in the resin, which has been cooled from 400° C. to 120° C. at a rate of 0.5° C./min is 10 J/g or less.

7. A laminate comprising the magnetic substrate of claim 1.

8. The laminate of claim 7, wherein c in the general formula satisfies $0 \leqq c \leqq 0.3$, the laminate of amorphous metal ribbon has a relative magnetic permeability, p, of 12,000 or more and a core loss, Pc, of 12 W/kg or less, which are measured in a closed magnetic path at a frequency of 100 kHz, and a tensile strength of 30 MPa or more.

9. The laminate of claim 7, wherein the iron loss, maximum magnetic flux density and tensile strength satisfy the following requirements:

(1) the iron loss W10/1000 is 15 W/kg or less;

(2) the maximum magnetic flux density, Bs, is not less than 1.0 T and not more than 2.0 T; and (3) tensile strength is 500 MPa or more.

10. An applied magnetic part comprising the magnetic substrate and/or the laminate of magnetic substrates defined in claim 1.

11. An applied magnetic part comprising the magnetic substrate and/or the laminate of magnetic substrates defined in claim 2.

12. An applied magnetic part comprising the magnetic substrate and/or the laminate of magnetic substrates defined in claim 5.
13. The magnetic substrate of claim 3, wherein the heat resistant resin having a repeat unit represented by one of the following chemical formulae (15), (24) and (26) to (36)
(15)
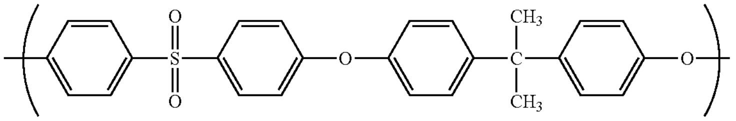
(24)
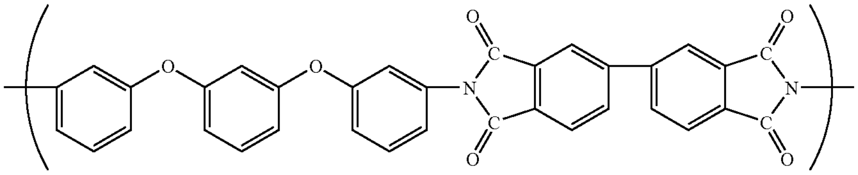
(26)
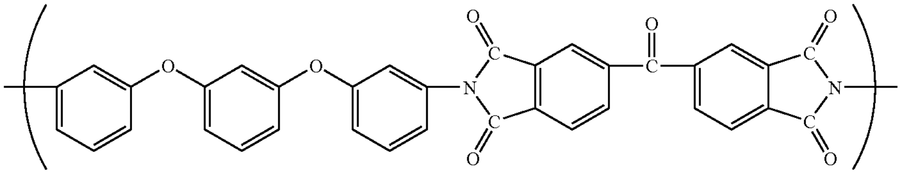
(27)
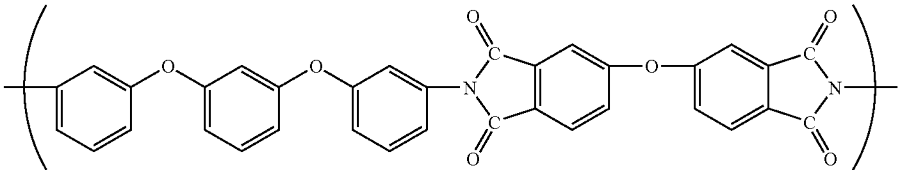
(28)
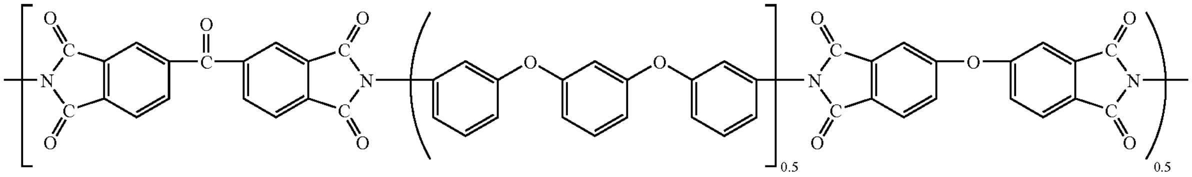
(29)
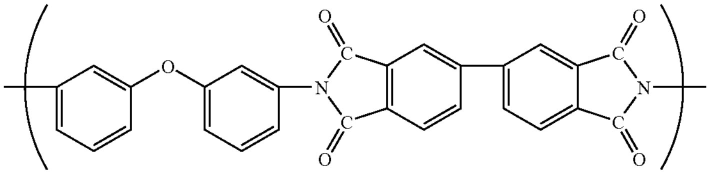
(30)
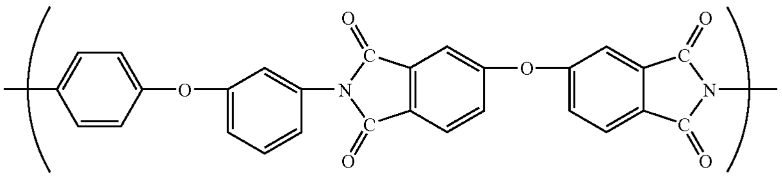

-continued
(31)
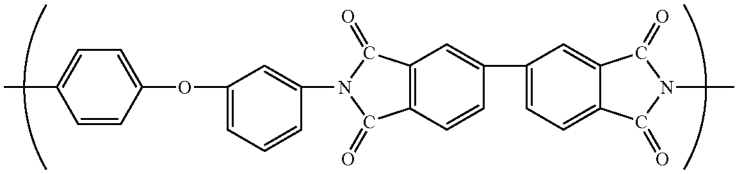
(32)
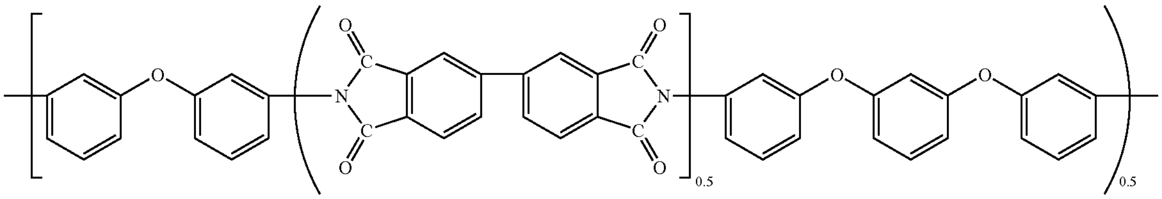
(33)
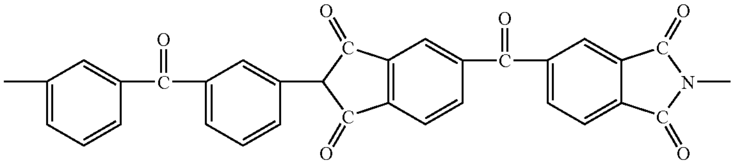
(34)
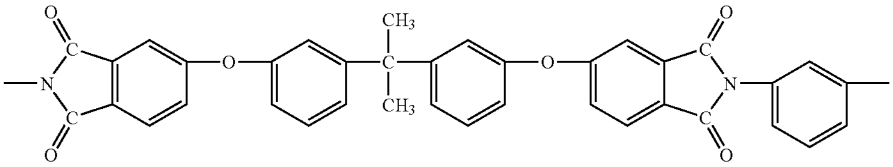
(35)
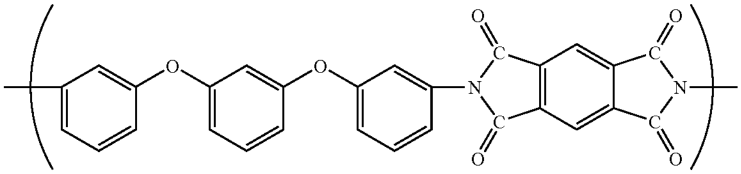
(36)
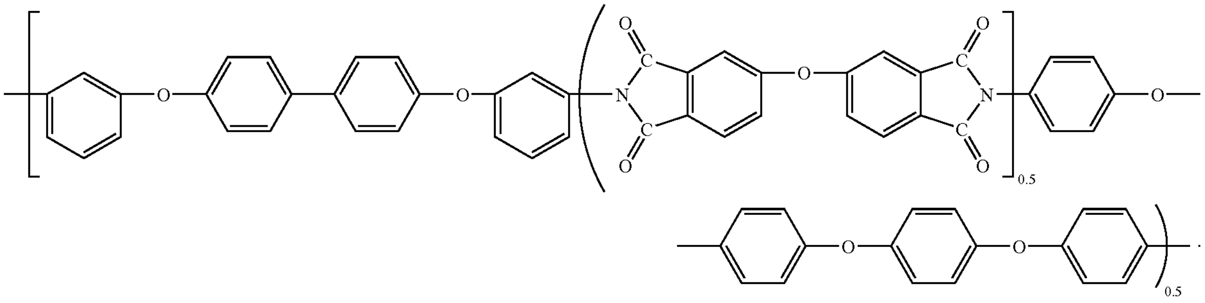
14. The magnetic substrate of claim 4, wherein the heat resistant resin having a repeat unit represented by one of the following chemical formulae (15), (24) and (26) to (36)
(15)
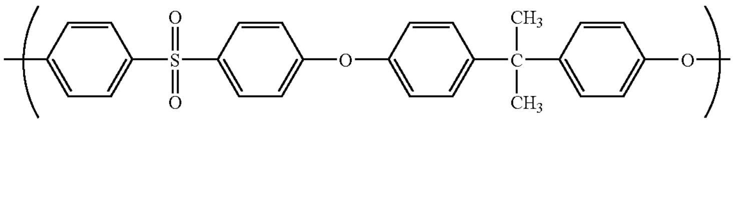

-continued
(24)
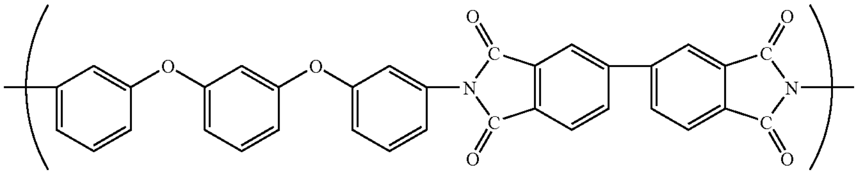
(26)
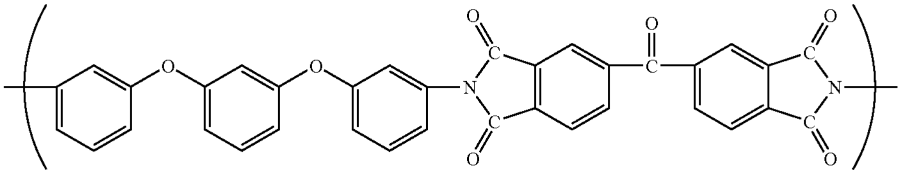
(27)
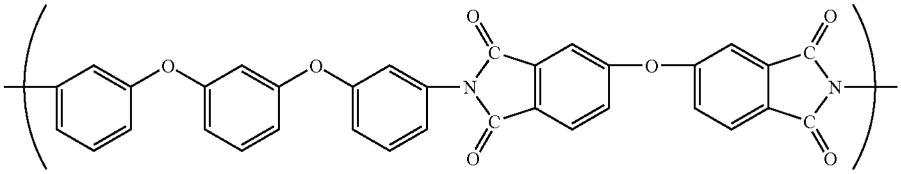
(28)
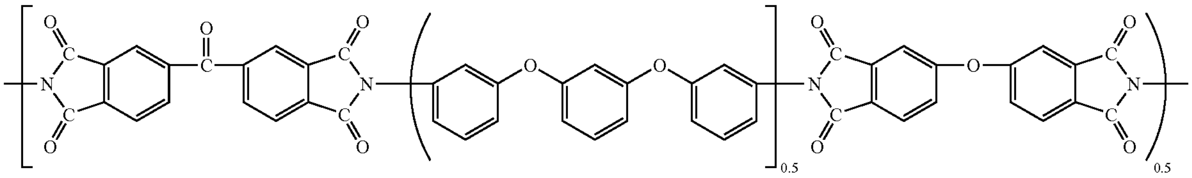
(29)
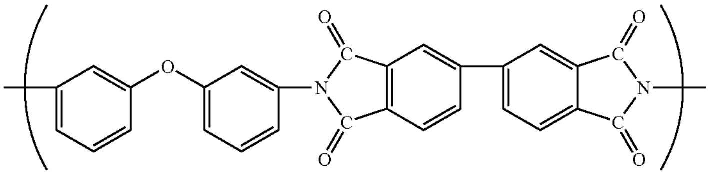
(30)
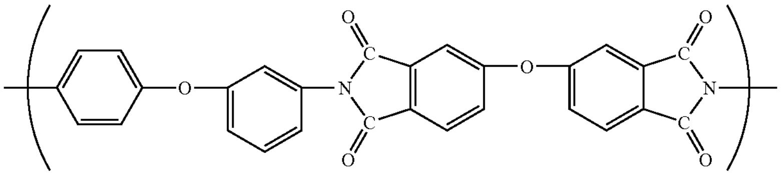
(31)
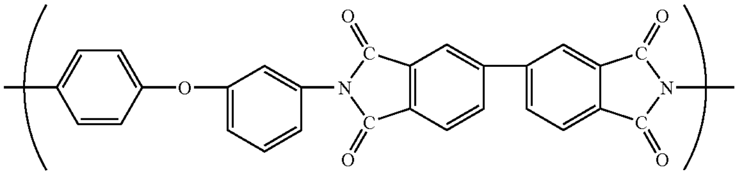
(32)
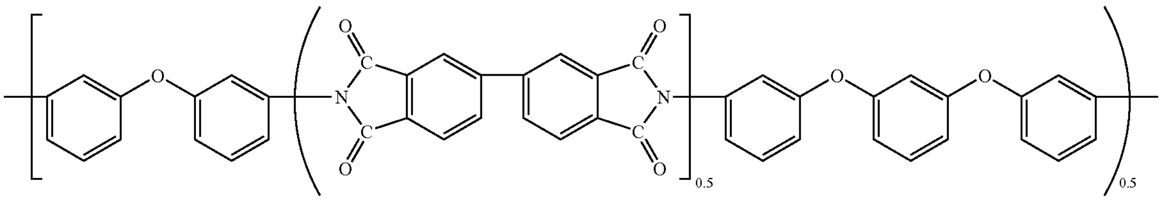

-continued
(33)
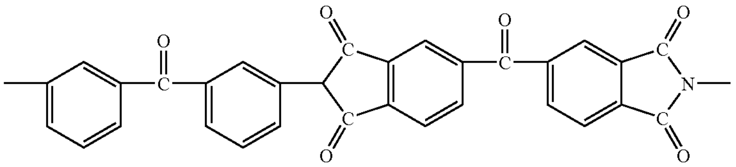
(34)
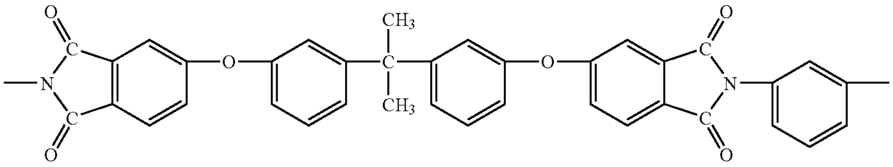
(35)
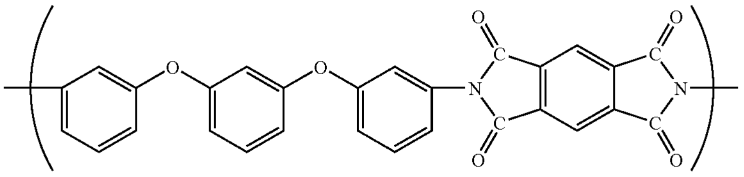
(36)
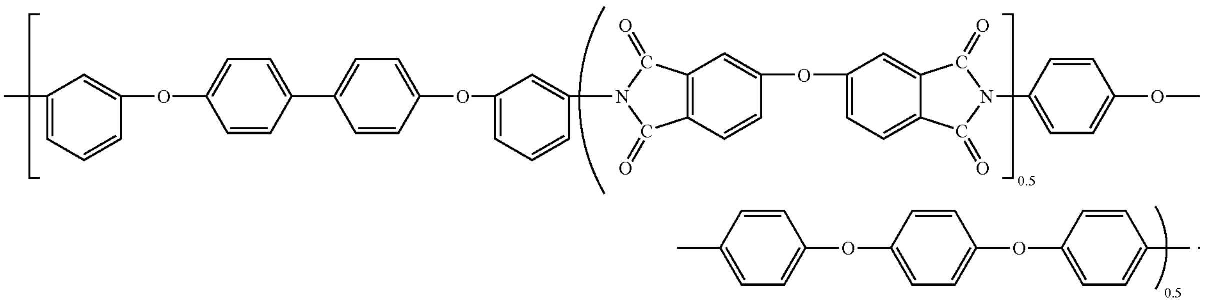
15. The magnetic substrate of claim 6, wherein the heat resistant resin having a repeat unit represented by one of the following chemical formulae (15), (24) and (26) to (36)
(15)
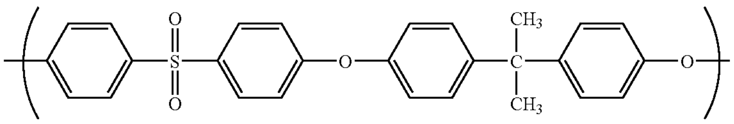
(24)
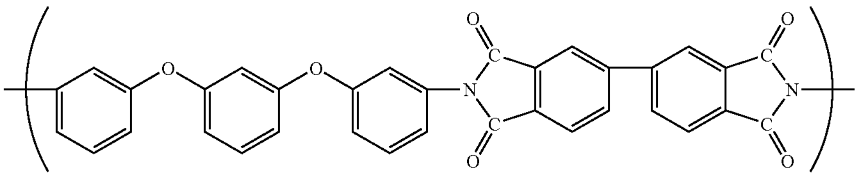
(26)
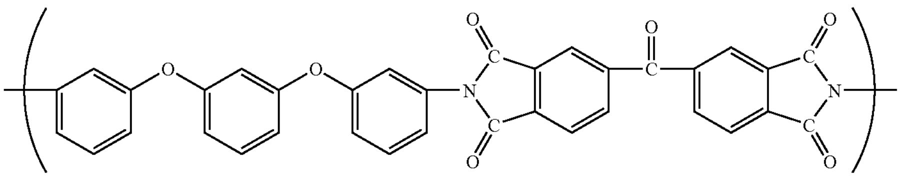

-continued
(27)
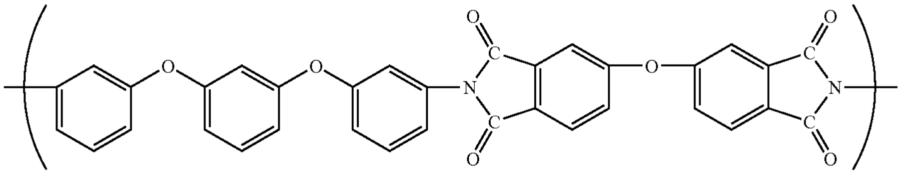
(28)
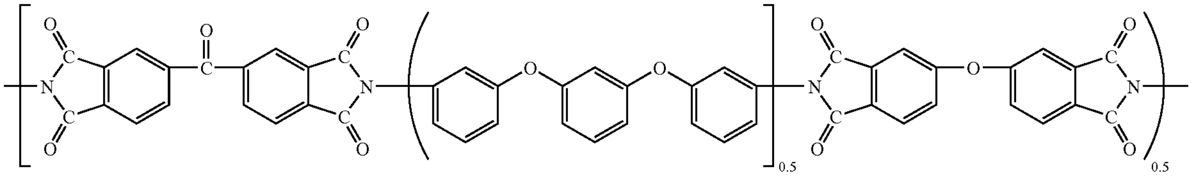
(29)
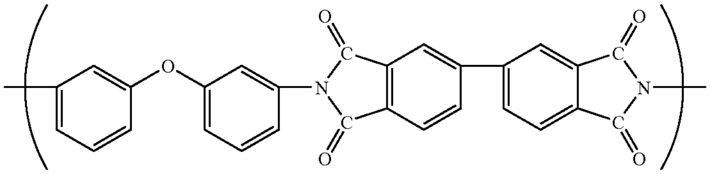
(30)
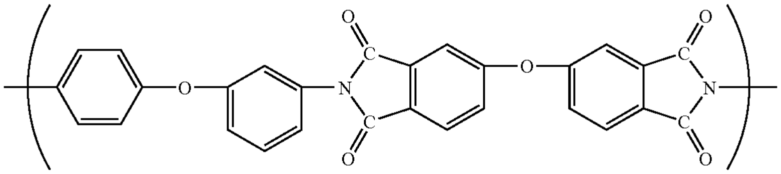
(31)
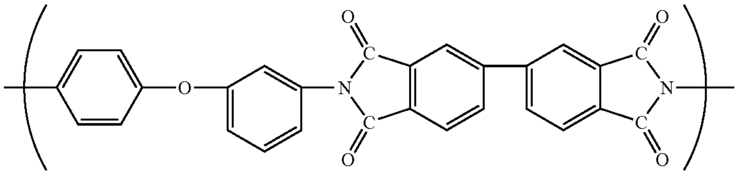
(32)
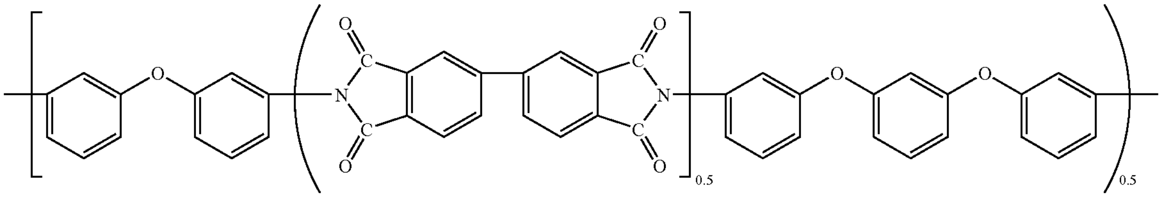
(33)
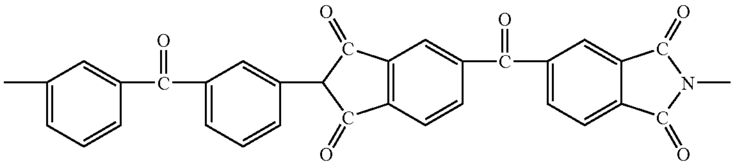
(34)
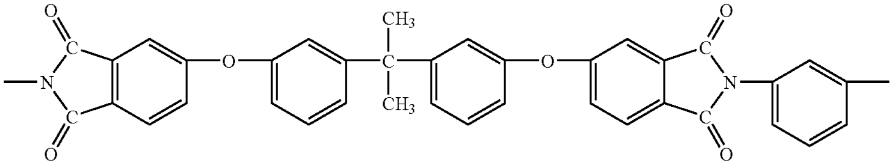

-continued
(35)
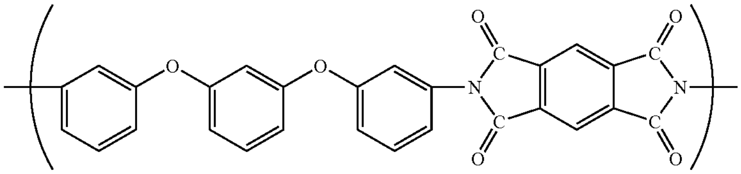
(36)
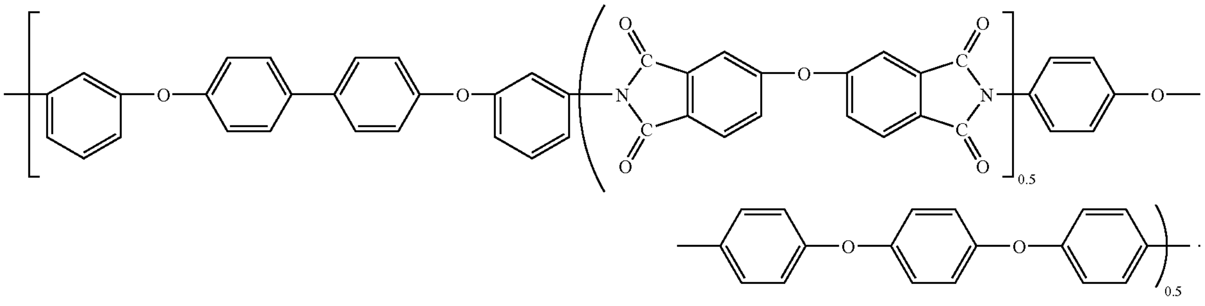
* * * * *